(12) United States Patent
Chan

(10) Patent No.: US 11,093,285 B2
(45) Date of Patent: *Aug. 17, 2021

(54) COMPRESSION TECHNIQUES FOR ENCODING STACK TRACE INFORMATION

(71) Applicant: Oracle International Corporation, Redwood Shores, CA (US)

(72) Inventor: Eric S. Chan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,254

(22) Filed: Oct. 30, 2019

(65) Prior Publication Data

US 2020/0065144 A1    Feb. 27, 2020

Related U.S. Application Data

(63) Continuation of application No. 15/588,523, filed on May 5, 2017, now Pat. No. 10,467,123.

(Continued)

(51) Int. Cl.
*G06F 9/44* (2018.01)
*G06F 9/50* (2006.01)
(Continued)

(52) U.S. Cl.
CPC .............. *G06F 9/50* (2013.01); *G06F 3/0629* (2013.01); *G06F 3/0631* (2013.01);
(Continued)

(58) Field of Classification Search
None
See application file for complete search history.

(56) References Cited

U.S. PATENT DOCUMENTS 4,969,091 A    11/1990 Muller
5,928,369 A    7/1999 Keyser et al.
(Continued)

FOREIGN PATENT DOCUMENTS

CN    201000563 Y    1/2008
CN    101263499 A    9/2008
(Continued)

OTHER PUBLICATIONS

U.S. Appl. No. 12/109,133, Final Office Action dated May 18, 2017, 18 pages.

(Continued)

*Primary Examiner* — Wei Y Zhen
*Assistant Examiner* — Lanny N Ung
(74) *Attorney, Agent, or Firm* — Kilpatrick Townsend & Stockton LLP

(57) ABSTRACT

Embodiments provide a thread classification method that represents stack traces in a compact form using classification signatures. Some embodiments can receive a stack trace that includes a sequence of stack frames. Some embodiments may generate, based on the sequence of stack frames, a trace signature that represents the set. Some embodiments may receive one or more subsequent stack traces. For each of the one or more subsequent stack traces, some embodiments may determine whether a subsequent trace signature has been generated to represent the sequence of stack frames included within the subsequent stack trace. If not, some embodiments may generate, based on the trace signature and other subsequent trace signatures that were generated based on the trace signature, the subsequent trace signature to represent the subsequent sequence of stack frames.

20 Claims, 17 Drawing Sheets

Related U.S. Application Data

(60) Provisional application No. 62/333,786, filed on May 9, 2016, provisional application No. 62/333,798, filed on May 9, 2016, provisional application No. 62/333,804, filed on May 9, 2016, provisional application No. 62/333,811, filed on May 9, 2016, provisional application No. 62/333,809, filed on May 9, 2016, provisional application No. 62/340,256, filed on May 23, 2016.

(51) Int. Cl.
*G06F 11/34* (2006.01)
*G06F 9/30* (2018.01)
*G06F 3/06* (2006.01)
*G06F 11/30* (2006.01)
*G06F 12/02* (2006.01)
*G06F 11/36* (2006.01)
*G06F 17/18* (2006.01)

(52) U.S. Cl.
CPC .......... *G06F 9/30058* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5055* (2013.01); *G06F 9/5083* (2013.01); *G06F 11/3037* (2013.01); *G06F 11/3409* (2013.01); *G06F 11/3442* (2013.01); *G06F 11/3452* (2013.01); *G06F 11/3466* (2013.01); *G06F 11/36* (2013.01); *G06F 11/3612* (2013.01); *G06F 12/023* (2013.01); *G06F 17/18* (2013.01); *G06F 11/3471* (2013.01); *G06F 2201/86* (2013.01)

(56) References Cited

U.S. PATENT DOCUMENTS

| | | | |
|---|---|---|---|
| 6,167,535 A | 12/2000 | Foote et al. | |
| 6,560,773 B1 | 5/2003 | Alexander, III et al. | |
| 6,670,897 B1 * | 12/2003 | Lin | H03M 7/3084 341/65 |
| 6,751,789 B1 | 6/2004 | Berry et al. | |
| 6,968,557 B1 | 11/2005 | Zhang et al. | |
| 7,100,079 B2 | 8/2006 | Gross et al. | |
| 7,257,657 B2 | 8/2007 | DeWitt, Jr. et al. | |
| 7,526,682 B1 | 4/2009 | Chacko et al. | |
| 7,685,575 B1 | 3/2010 | Fareed | |
| 7,703,087 B1 | 4/2010 | Prakash | |
| 7,735,074 B2 | 6/2010 | Lobo et al. | |
| 7,779,054 B1 | 8/2010 | Printezis et al. | |
| 7,926,071 B2 | 4/2011 | Stephens et al. | |
| 7,962,437 B2 | 6/2011 | Brandenburg et al. | |
| 7,991,961 B1 | 8/2011 | Tsai et al. | |
| 8,156,378 B1 | 4/2012 | Suit | |
| 8,185,781 B2 | 5/2012 | Chen et al. | |
| 8,266,190 B2 | 9/2012 | Johnson | |
| 8,464,255 B2 | 6/2013 | Nathuji et al. | |
| 8,499,066 B1 | 7/2013 | Zhang et al. | |
| 8,566,795 B2 | 10/2013 | DeWitt, Jr. et al. | |
| 8,683,483 B2 | 3/2014 | Hohensee | |
| 8,719,791 B1 | 5/2014 | Macpherson et al. | |
| 8,775,769 B2 | 7/2014 | Li et al. | |
| 8,832,490 B2 | 9/2014 | Malnati | |
| 8,978,022 B2 | 3/2015 | Kalogeropulos et al. | |
| 8,990,546 B2 | 3/2015 | Wilson | |
| 8,990,792 B2 | 3/2015 | Gorelkina | |
| 9,003,377 B2 | 4/2015 | Gafter et al. | |
| 9,009,539 B1 * | 4/2015 | Kompotis | G06F 11/079 714/38.1 |
| 9,058,421 B2 | 6/2015 | Xu et al. | |
| 9,104,563 B2 | 8/2015 | Taskov | |
| 9,122,602 B1 | 9/2015 | Jewell et al. | |
| 9,146,862 B2 | 9/2015 | Bobroff et al. | |
| 9,210,181 B1 | 12/2015 | Nandy et al. | |
| 9,330,119 B2 | 5/2016 | Chan et al. | |
| 9,354,890 B1 | 5/2016 | Kang | |
| 9,396,030 B2 | 7/2016 | Kuang et al. | |
| 9,471,225 B2 | 10/2016 | Bobroff et al. | |
| 9,495,395 B2 | 11/2016 | Chan et al. | |
| 9,600,394 B2 | 3/2017 | Salunke et al. | |
| 9,692,662 B2 | 6/2017 | Chan et al. | |
| 9,720,823 B2 | 8/2017 | Urmanov et al. | |
| 9,940,579 B2 | 4/2018 | Sun et al. | |
| 10,025,650 B2 | 7/2018 | Beard et al. | |
| 10,205,640 B2 | 2/2019 | Chan et al. | |
| 10,248,561 B2 | 4/2019 | Garvey et al. | |
| 10,333,798 B2 | 6/2019 | Chan et al. | |
| 10,417,111 B2 | 9/2019 | Chan | |
| 10,467,123 B2 | 11/2019 | Chan | |
| 10,534,643 B2 | 1/2020 | Chan | |
| 2001/0044856 A1 | 11/2001 | Agesen et al. | |
| 2003/0005414 A1 | 1/2003 | Elliott et al. | |
| 2003/0028741 A1 | 2/2003 | Sokolov et al. | |
| 2003/0097617 A1 | 5/2003 | Goeller et al. | |
| 2004/0054991 A1 | 3/2004 | Harres | |
| 2004/0085316 A1 | 5/2004 | Malik | |
| 2004/0111708 A1 | 6/2004 | Calder et al. | |
| 2004/0189703 A1 | 9/2004 | Zhang et al. | |
| 2004/0193662 A1 | 9/2004 | Garthwaite | |
| 2005/0091644 A1 | 4/2005 | Chilimbi | |
| 2005/0240641 A1 | 10/2005 | Kimura et al. | |
| 2005/0273567 A1 | 12/2005 | Blandy | |
| 2006/0122965 A1 | 6/2006 | Adams et al. | |
| 2006/0168475 A1 | 7/2006 | Segers et al. | |
| 2006/0173877 A1 | 8/2006 | Findeisen et al. | |
| 2006/0206885 A1 | 9/2006 | Seidman et al. | |
| 2006/0218543 A1 | 9/2006 | Boger | |
| 2006/0230087 A1 | 10/2006 | Andreasson | |
| 2007/0027942 A1 | 2/2007 | Trotter | |
| 2007/0055914 A1 | 3/2007 | Chandwani et al. | |
| 2007/0067758 A1 | 3/2007 | Findeisen et al. | |
| 2007/0136402 A1 | 6/2007 | Grose et al. | |
| 2007/0168915 A1 | 7/2007 | Fabbio et al. | |
| 2007/0174839 A1 | 7/2007 | Takahashi et al. | |
| 2007/0220513 A1 | 9/2007 | Hwang | |
| 2007/0234296 A1 | 10/2007 | Zorn et al. | |
| 2008/0040674 A1 | 2/2008 | Gupta | |
| 2008/0046673 A1 | 2/2008 | Hwang | |
| 2008/0091448 A1 | 4/2008 | Niheu et al. | |
| 2008/0148180 A1 | 6/2008 | Liu et al. | |
| 2008/0222074 A1 | 9/2008 | Lieberwirth et al. | |
| 2008/0270945 A1 | 10/2008 | Abhyanker | |
| 2008/0295108 A1 | 11/2008 | Ogasawara et al. | |
| 2008/0301501 A1 | 12/2008 | Grant et al. | |
| 2008/0301504 A1 | 12/2008 | Chen et al. | |
| 2009/0037687 A1 | 2/2009 | Li et al. | |
| 2009/0070776 A1 | 3/2009 | Dahlstedt | |
| 2009/0083349 A1 | 3/2009 | Johnson | |
| 2009/0106178 A1 | 4/2009 | Chu | |
| 2009/0106603 A1 | 4/2009 | Dilman et al. | |
| 2009/0132457 A1 | 5/2009 | Brandenburg et al. | |
| 2009/0177692 A1 | 7/2009 | Chagoly et al. | |
| 2009/0234899 A1 | 9/2009 | Kramer | |
| 2009/0306920 A1 | 12/2009 | Zwinger et al. | |
| 2009/0313508 A1 | 12/2009 | Yan et al. | |
| 2009/0320021 A1 | 12/2009 | Pan et al. | |
| 2010/0094592 A1 | 4/2010 | Cherkasova et al. | |
| 2010/0094992 A1 | 4/2010 | Cherkasova et al. | |
| 2010/0153925 A1 | 6/2010 | Klein | |
| 2010/0185499 A1 | 7/2010 | Dwarakanath et al. | |
| 2010/0229156 A1 | 9/2010 | Fink et al. | |
| 2010/0235815 A1 | 9/2010 | Maybee et al. | |
| 2010/0262858 A1 | 10/2010 | Chen et al. | |
| 2010/0318836 A1 | 12/2010 | Ness et al. | |
| 2010/0324869 A1 | 12/2010 | Cherkasova et al. | |
| 2011/0016357 A1 | 1/2011 | Tsvetkov | |
| 2011/0067007 A1 | 3/2011 | Zamarreno | |
| 2011/0107050 A1 | 5/2011 | Vengerov | |
| 2011/0161048 A1 | 6/2011 | Sodem et al. | |

(56) References Cited

U.S. PATENT DOCUMENTS

| | | | |
|---|---|---|---|
| 2011/0258604 A1* | 10/2011 | Drukman | G06F 11/3636 717/125 |
| 2011/0270795 A1 | 11/2011 | Smith et al. | |
| 2011/0276949 A1 | 11/2011 | Otenko | |
| 2011/0283266 A1 | 11/2011 | Gallagher et al. | |
| 2011/0320586 A1 | 12/2011 | Maltz et al. | |
| 2011/0320682 A1 | 12/2011 | McDougall et al. | |
| 2012/0054331 A1 | 3/2012 | Dagan | |
| 2012/0054554 A1 | 3/2012 | Dagan | |
| 2012/0096153 A1 | 4/2012 | Weiser et al. | |
| 2012/0144374 A1 | 6/2012 | Gallagher et al. | |
| 2012/0159449 A1 | 6/2012 | Arnold et al. | |
| 2012/0185732 A1 | 7/2012 | Sankar et al. | |
| 2012/0185735 A1 | 7/2012 | Sambamurthy et al. | |
| 2012/0185736 A1 | 7/2012 | Sambamurthy et al. | |
| 2012/0197626 A1 | 8/2012 | Kejariwal et al. | |
| 2012/0197733 A1 | 8/2012 | Skomoroch et al. | |
| 2012/0278793 A1 | 11/2012 | Jalan et al. | |
| 2012/0278813 A1 | 11/2012 | Stephens et al. | |
| 2013/0013953 A1 | 1/2013 | Eck et al. | |
| 2013/0041644 A1 | 2/2013 | Cremonesi et al. | |
| 2013/0042154 A1 | 2/2013 | Agarwal et al. | |
| 2013/0066866 A1 | 3/2013 | Chan et al. | |
| 2013/0132778 A1 | 5/2013 | Dagan | |
| 2013/0185718 A1 | 7/2013 | S M et al. | |
| 2013/0204948 A1 | 8/2013 | Zeyliger et al. | |
| 2013/0212438 A1 | 8/2013 | Moyer | |
| 2013/0263116 A1 | 10/2013 | Haupt et al. | |
| 2014/0143759 A1 | 5/2014 | Neichev et al. | |
| 2014/0236965 A1 | 8/2014 | Yarmus | |
| 2014/0282454 A1 | 9/2014 | Bai et al. | |
| 2014/0310235 A1* | 10/2014 | Chan | G06F 11/3003 707/603 |
| 2014/0310285 A1 | 10/2014 | Chan et al. | |
| 2014/0310714 A1 | 10/2014 | Chan et al. | |
| 2014/0351233 A1 | 11/2014 | Crupi et al. | |
| 2015/0026428 A1 | 1/2015 | Bobroff et al. | |
| 2015/0026429 A1 | 1/2015 | Bobroff et al. | |
| 2015/0058605 A1 | 2/2015 | Madampath | |
| 2015/0106794 A1 | 4/2015 | Rhee et al. | |
| 2015/0234869 A1 | 8/2015 | Chan et al. | |
| 2015/0254330 A1 | 9/2015 | Chan et al. | |
| 2016/0041848 A1 | 2/2016 | Li et al. | |
| 2016/0070633 A1 | 3/2016 | Abraham et al. | |
| 2016/0098341 A1 | 4/2016 | Pho et al. | |
| 2016/0124672 A1 | 5/2016 | Qiu et al. | |
| 2016/0132302 A1 | 5/2016 | Gschwind et al. | |
| 2016/0149937 A1* | 5/2016 | Katmor | H04L 63/0236 726/23 |
| 2016/0371170 A1 | 12/2016 | Salunke et al. | |
| 2016/0371180 A1 | 12/2016 | Urmanov et al. | |
| 2016/0371181 A1 | 12/2016 | Garvey et al. | |
| 2017/0012834 A1 | 1/2017 | Chan et al. | |
| 2017/0052730 A1 | 2/2017 | Bobroff et al. | |
| 2017/0083498 A1 | 3/2017 | Cudich et al. | |
| 2017/0255544 A1 | 9/2017 | Plate et al. | |
| 2017/0322861 A1 | 11/2017 | Chan | |
| 2017/0322877 A1 | 11/2017 | Chan | |
| 2017/0337085 A1 | 11/2017 | Chan | |
| 2018/0074854 A1 | 3/2018 | Chan | |

FOREIGN PATENT DOCUMENTS

| | | |
|---|---|---|
| CN | 101630285 A | 1/2010 |
| CN | 105144112 B | 12/2015 |
| CN | 105190564 A | 12/2015 |
| CN | 105144112 A | 3/2018 |
| EP | 1696351 A | 8/2006 |
| EP | 2984567 A1 | 2/2016 |
| EP | 2984568 A1 | 2/2016 |
| EP | 2984568 B1 | 9/2017 |
| JP | 11327951 A | 11/1999 |
| JP | 2007286811 A | 11/2007 |
| JP | 2009211654 A | 9/2009 |
| JP | 2010122825 A | 6/2010 |
| JP | 2010198579 A | 9/2010 |
| JP | 2011154483 A | 8/2011 |
| JP | 2011192097 A | 9/2011 |
| JP | 2013229064 A | 11/2013 |
| JP | 2016517984 A | 6/2016 |
| JP | 2016518660 A | 6/2016 |
| JP | 6457489 B2 | 12/2018 |
| WO | 2014168981 A1 | 10/2014 |
| WO | 2014169056 A1 | 10/2014 |
| WO | 2016153790 A1 | 9/2016 |
| WO | 2017196743 A1 | 11/2017 |
| WO | 2017196746 A1 | 11/2017 |
| WO | 2017196748 A1 | 11/2017 |
| WO | 2017196749 A1 | 11/2017 |

OTHER PUBLICATIONS

U.S. Appl. No. 14/109,546, Final Office Action dated Sep. 21, 2016, 17 pages.

U.S. Appl. No. 14/109,546, Final Office Action dated Nov. 3, 2017, 21 pages.

U.S. Appl. No. 14/109,546, Non-Final Office Action dated Feb. 22, 2017, 21 pages.

U.S. Appl. No. 14/109,546, Non-Final Office Action dated Mar. 29, 2018, 22 pages.

U.S. Appl. No. 14/109,546, Non-Final Office Action dated Mar. 14, 2016, 23 pages.

U.S. Appl. No. 14/109,546, Notice of Allowance dated Sep. 18, 2018, 12 pages.

U.S. Appl. No. 14/109,578, Non-Final Office Action dated Feb. 1, 2016, 16 pages.

U.S. Appl. No. 14/109,578, Notice of Allowance dated Jun. 23, 2016, 9 pages.

U.S. Appl. No. 14/109,651, Non-Final Office Action dated Aug. 25, 2015, 15 pages.

U.S. Appl. No. 14/109,651, Notice of Allowance dated Jan. 5, 2016, 8 pages.

U.S. Appl. No. 14/665,171, Final Office Action dated Sep. 5, 2017, 20 pages.

U.S. Appl. No. 14/665,171, Non-Final Office Action dated May 4, 2017, 20 pages.

U.S. Appl. No. 14/743,805, Non-Final Office Action dated Dec. 30, 2016, 16 pages.

U.S. Appl. No. 14/743,805, Notice of Allowance dated Apr. 4, 2017, 6 pages.

U.S. Appl. No. 14/743,817, Non-Final Office Action dated Sep. 25, 2017, 11 pages.

U.S. Appl. No. 14/743,847, Notice of Allowance dated Nov. 17, 2016, 10 pages.

U.S. Appl. No. 15/275,035, Corrected Notice of Allowability dated Apr. 11, 2017, 2 pages.

U.S. Appl. No. 15/275,035, Notice of Allowance dated Feb. 9, 2017, 24 pages.

U.S. Appl. No. 15/588,521, Non-Final Office Action dated Oct. 17, 2018, 21 pages.

U.S. Appl. No. 15/588,521, Notice of Allowance dated Apr. 26, 2019, 21 pages.

U.S. Appl. No. 15/588,531, Final Office Action dated Apr. 19, 2019, 15 pages.

U.S. Appl. No. 15/588,531, Non-Final Office Action dated Dec. 27, 2018, 13 pages.

Chan et al., "Situation Aware Computing for Big Data", IEEE International Conference on Big Data, XP032717409, Oct. 27, 2014, pp. 1-6.

Chinese Patent Application No. 201480020584.7, Notice of Decision to Grant dated Nov. 29, 2017, 2 pages.

Chinese Patent Application No. 201480020584.7, Office Action dated May 8, 2017, 13 pages.

Chinese Patent Application No. 201480020730.6, Notice of Decision to Grant dated Jan. 12, 2018, 2 pages.

Chinese Patent Application No. 201480020730.6, Office Action dated Jul. 3, 2017, 13 pages.

(56) References Cited

OTHER PUBLICATIONS

European Patent Application No. 14724270.5, Notice of Decision to Grant dated Aug. 10, 2017, 3 pages.
Gawlick et al., "Fine Grain Provenance Using Temporal Databases", Available online at https://www.usenix.org/legacy/event/tapp11/tech/final_files/Gawlick.pdf, May 24, 2011, 4 pages.
Gawlick, "Mastering Situation Awareness: The Next Frontier?", 7th Biennial Conference on Innovative Data Systems Research (CIDR '15) Jan. 4-7, 2015, 1 page.
Guerra et al., "An Integrated Data Management Approach to Manage Health Care Data", Datenbanken und Informationssysteme, (DBIS), Jan. 1, 2011, pp. 596-605.
Hwang et al., "How to Analyze Verbosegc Trace with IBM Pattern Modeling and Analysis Tool for IBM Java Garbage Collector", IBM Pattern Modeling and Analysis Tool Architect/ Developer Available Online at: http://www-01.ibm.com/support/docview.wss?uid=swg27007240&aid=1, 2017, pp. 1-67.
Japanese Patent Application No. 2016-507618, Notice of Decision to Grant dated Nov. 27, 2018, 6 pages.
Japanese Patent Application No. 2016-507618, Office Action dated Apr. 10, 2018, 4 pages.
Liu et al., "KIDS—A Model for Developing Evolutionary Database Applications", Proceedings of the International Conference on Data Technologies and Applications,, Jul. 1, 2012, pp. 129-134.
International Patent Application No. PCT/US2012/033385, International Search Report and Written Opinion dated Dec. 12, 2012, 6 pages.
International Patent Application No. PCT/US2012/033530, International Search Report and Written Opinion dated Jul. 31, 2012, 9 pages.
International Patent Application No. PCT/US2014/033385, International Preliminary Report on Patentability dated Jul. 17, 2015, 7 pages.
International Patent Application No. PCT/US2014/033385, International Search Report and Written Opinion dated Jul. 17, 2014, 10 pages.
International Patent Application No. PCT/US2014/033385, Written Opinion dated Apr. 29, 2015, 6 pages.
International Patent Application No. PCT/US2014/033530, International Preliminary Report on Patentability dated Jul. 13, 2015, 6 pages.
International Patent Application No. PCT/US2014/033530, International Search Report and Written Opinion dated Jul. 17, 2014, 10 pages.
International Patent Application No. PCT/US2014/033530, Written Opinion dated Apr. 10, 2015, 4 pages.
International Patent Application No. PCT/US2016/021642, International Preliminary Report on Patentability dated Jun. 20, 2017, 10 pages.
International Patent Application No. PCT/US2016/021642, International Search Report and Written Opinion dated Jun. 6, 2016, 16 pages.
International Patent Application No. PCT/US2016/021642, Written Opinion dated Mar. 24, 2017, 6 pages.
International Patent Application No. PCT/US2017/031586, International Preliminary Report on Patentability dated Nov. 22, 2018, 8 pages.
International Patent Application No. PCT/US2017/031586, International Search Report and Written Opinion dated Aug. 4, 2017, 11 pages.
International Patent Application No. PCT/US2017/031589, International Preliminary Report on Patentability dated Nov. 22, 2018, 7 pages.
International Patent Application No. PCT/US2017/031589, International Search Report and Written Opinion dated Aug. 4, 2017, 10 pages.
International Patent Application No. PCT/US2017/031593, International Preliminary Report on Patentability dated Nov. 22, 2018, 8 pages.
International Patent Application No. PCT/US2017/031593, International Search Report and Written Opinion dated Aug. 7, 2017, 12 pages.
International Patent Application No. PCT/US2017/031594, International Preliminary Report on Patentability dated Nov. 22, 2018, 8 pages.
International Patent Application No. PCT/US2017/031594, International Search Report and Written Opinion dated Aug. 3, 2017, 11 pages.
Peralta, "Probabilistic Error Detection and Diagnosis in Large-Scale Distributed Applications", Purdue University Dec. 2012, pp. 1-199.
Sun et al., "Solving Memory Problems in WebSphere Applications", Available Online at: https://www.ibm.com/developerworks/websphere/library/techarticles/0706_sun/0706_sun.html, Jun. 27, 2007, 21 pages.
Wegiel et al., "Dynamic Prediction of Collection Yield for Managed Runtimes", Association for Computing Machinery, vol. 44, No. 3, Mar. 7, 2009, pp. 289-300.
U.S. Appl. No. 14/109,546, Corrected Notice of Allowability dated Nov. 26, 2018, 3 pages.
U.S. Appl. No. 14/109,546, Corrected Notice of Allowance dated Dec. 28, 2018, 2 pages.
U.S. Appl. No. 14/705,304, Notice of Allowability dated Mar. 13, 2019, 2 pages.
U.S. Appl. No. 14/705,304, Notice of Allowability dated May 17, 2019, 2 pages.
U.S. Appl. No. 14/705,304, Notice of Allowability dated Feb. 26, 2019, 3 pages.
U.S. Appl. No. 14/705,304, Notice of Allowance dated Feb. 7, 2019, 9 pages.
U.S. Appl. No. 14/743,817, Final Office Action dated Jun. 6, 2018, 12 pages.
U.S. Appl. No. 14/743,817, Notice of Allowance dated Nov. 7, 2018, 10 pages.
U.S. Appl. No. 15/588,523, First Action Interview Office Action Summary dated Sep. 27, 2018, 6 pages.
U.S. Appl. No. 15/588,523, First Action Interview Pilot Program Pre-Interview Communication dated Jun. 5, 2018, 5 pages.
U.S. Appl. No. 15/588,523, Notice of Allowance dated Feb. 11, 2019, 8 pages.
U.S. Appl. No. 15/588,523, Notice of Allowance dated Jun. 19, 2019, 8 pages.
U.S. Appl. No. 15/588,526, Final Office Action dated Jan. 15, 2021, 26 pages.
U.S. Appl. No. 15/588,526, Non-Final Office Action dated Jun. 12, 2020, 27 pages.
U.S. Appl. No. 15/588,531, Notice of Allowance dated Aug. 23, 2019, 8 pages
European Application No. EP14724263.0, Office Action dated Jan. 9, 2020, 8 pages.
Indian Application No. IN5370/CHENP/2015, First Examination Report dated Aug. 7, 2020, 7 pages.
Japanese Patent Application No. 2018-558656, Office Action dated May 18, 2021, 4 pages.
Japanese Patent Application No. 2018-558661, Office Action dated May 25, 2021, 6 pages.
Japanese Patent Application No. 2018-558658, Office Action dated May 25, 2021, 6 pages.

* cited by examiner

COMPRESSION TECHNIQUES FOR ENCODING STACK TRACE INFORMATION

CROSS-REFERENCES TO RELATED APPLICATIONS

The present application is a continuation of U.S. patent application Ser. No. 15/588,523, filed May 5, 2017, entitled "Compression Techniques for Encoding Stack Trace Information," which claims the benefit and priority under 35 U.S.C. 119(e) of U.S. Provisional Application No. 62/333,786, filed May 9, 2016, entitled "Correlation of Thread Intensity and Heap Usage to Identify Heap-Hoarding Stack Traces," U.S. Provisional Application No. 62/333,798, filed May 9, 2016, entitled "Memory Usage Determination Techniques," U.S. Provisional Application No. 62/333,804, filed May 9, 2016, entitled "Compression Techniques for Encoding Stack Traces Information," U.S. Provisional Application No. 62/333,811, filed May 9, 2016, entitled "Correlation of Stack Segment Intensity in Emergent Relationships," U.S. Provisional Application No. 62/333,809, filed May 9, 2016, entitled "Systems and Methods of Stack Trace Analysis," and U.S. Provisional Application No. 62/340,256, filed May 23, 2016, entitled "Characterization of Segments of Time-Series," the entire contents of which are incorporated herein by reference for all purposes.

The present application is related to the following concurrently filed applications, the entire contents of which are incorporated herein by reference for all purposes:

(1) U.S. Non-Provisional application Ser. No. 15/588,531, entitled "CORRELATION OF THREAD INTENSITY AND HEAP USAGE TO IDENTIFY HEAP-HOARDING STACK TRACES" filed May 5, 2017; and (2) U.S. Non-Provisional application Ser. No. 15/588,526, entitled "MEMORY USAGE DETERMINATION TECHNIQUES" filed May 5, 2017.

(3) U.S. Non-Provisional application Ser. No. 15/588,521, entitled "CORRELATION OF STACK SEGMENT INTENSITY IN EMERGENT RELATIONSHIPS" filed May 5, 2017.

BACKGROUND

In general, cloud service providers maintain operational resources to meet service level agreements (SLA) with customers. The providers continuously monitor the performance metrics of the cloud services they provide to ensure the services' conformance to SLAs. However, because available tools may lack the capability to predict or detect impending SLA violations, the operational resources may be unable to circumvent the violations. Additionally, because the tools may lack the capability to diagnose the root causes of SLA violations, the operations may take longer to resolve such violations when they do occur. As a result, the customer experience may be adversely affected.

Furthermore, such SLAs might require that data be analyzed systematically and actionable information in the data be acted upon proactively to avoid SLA violations and also to determine whether the agreement is being satisfied. Following the service level agreements and other requirements can be very burdensome, and can grow more burdensome with the passage of time.

For obtaining the capabilities mentioned above, what is needed are techniques that represent the system using high-level state models that are easily updated based on low-level events of the system and system measurements. With regards to obtaining metrics on low-level events, one can instrument application programs underlying the system to collect the exact measurements of the events. In such an approach, however, the instrumentation itself can affect the measurements. This problem can be more pronounced when the execution time of the instrumentation code around a method dominates the execution time of the method itself (e.g., if the invocation count of the method is high).

BRIEF SUMMARY

Certain techniques are disclosed for classifying threads based on stack traces obtained from series of thread dumps. Some embodiments may classify a stack trace with a tuple of labeled binary trees through a synthesis and analysis process.

One embodiment is directed to a method. The method can include: receiving, by a computer, a stack trace including a sequence of stack frames; generating, based at least in part on the sequence of stack frames, a trace signature that represents the sequence of stack frames; receiving, by the computer, one or more subsequent stack traces; and for each of the one or more subsequent stack traces: determining whether a subsequent trace signature has been generated to represent a subsequent sequence of stack frames included by the subsequent stack trace; and if the subsequent trace signature has not been generated, generating, based at least in part on the trace signature and other subsequent trace signatures that were generated based on the trace signature, the subsequent trace signature to represent the subsequent sequence of stack frames.

BRIEF DESCRIPTION OF THE DRAWINGS

Illustrative embodiments are described in detail below in reference to the following drawing figures.

Figure 1:
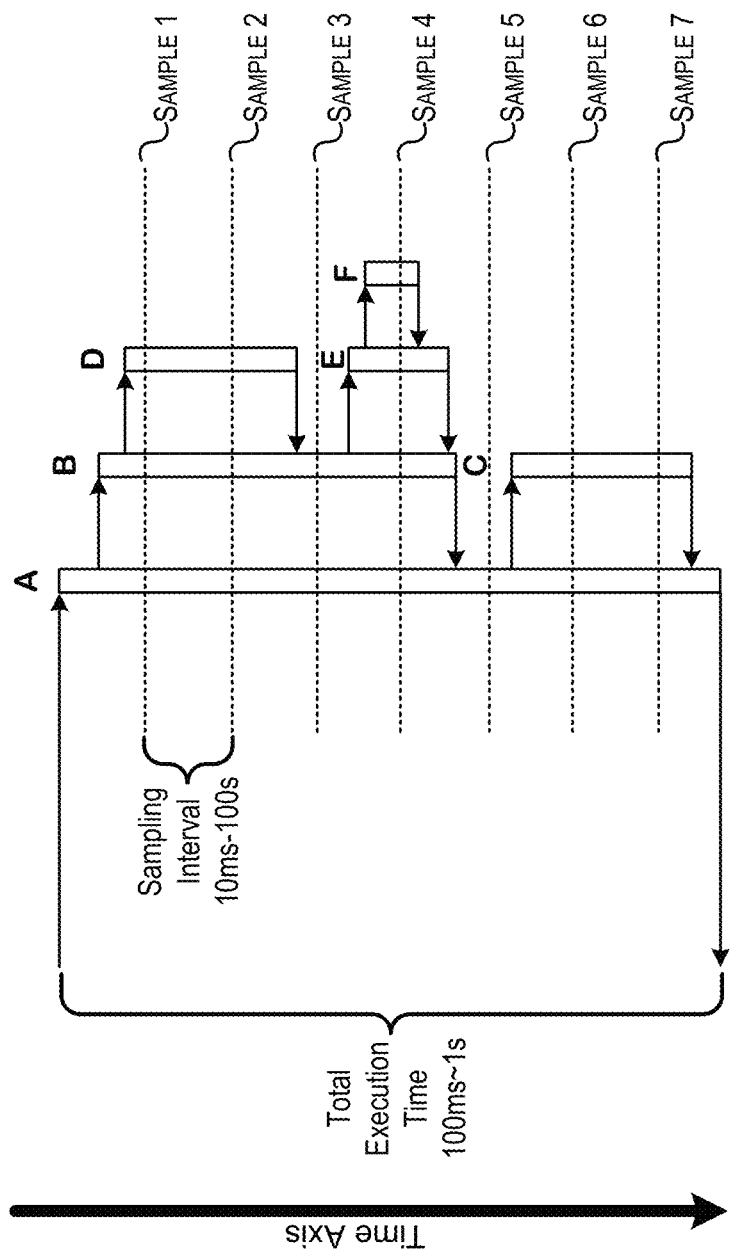
FIG. 1 depicts an exemplary runtime profiling of a single thread over a period of time at a relatively high frequency sampling rate.

The patent or application file contains at least one drawing executed in color. Copies of this patent or patent application publication with color drawings will be provided by the Office upon request and payment of the necessary fee.

DETAILED DESCRIPTION

I. Overview

In the following description, for the purposes of explanation, specific details are set forth in order to provide a thorough understanding of embodiments of the disclosure. However, it will be apparent that various embodiments may be practiced without these specific details. The figures and description are not intended to be restrictive.

The present disclosure relates generally to using heap usage statistics and thread intensity statistics to identify code blocks within a multi-threaded process (e.g., an application program) for potential optimization and to forecast future heap usage and/or thread intensity. Thread intensity statistics may be used to track the response, load, and resource usage of the process without instrumenting the process's underlying code or using code injection. In particular, the intensity of a thread's type or a stack segment's type may refer to a statistical measure of the "hotness" of the code blocks being executed by the thread or referenced by the stack segment. The hotness of a code block can be quantified by volume of execution (e.g., the number of invocations of the code block multiplied by the execution time of the code block). Hotter code blocks have a higher number of invocations and/or longer response times.

By analyzing a series of thread dumps taken from a process at regular or irregular time intervals, some embodiments may provide a statistical sampling solution that is (1) low-overhead, (2) non-intrusive, (3) provides always-on monitoring, and (4) avoids the problem of instrumentation code dominating the execution time of the code being instrumented (i.e., the Heisenberg problem).

Some embodiments may classify threads and stack segments based on intensity statistics. By monitoring stack traces of individual threads included in thread dumps received from an software execution environment (e.g., a virtual machine), a monitoring process can classify the threads based on the contents of their stack traces into one or more thread classes. As more stack traces are analyzed, some embodiments may observe the bifurcation of thread classes into sub-classes and eventually build a hierarchy of thread classes. For example, if a stack segment (A) is observed to be a component of a stack segment (A, B, D), one could say that the thread type (A, B, D) is a sub-class of thread type (A). One could also say that thread type (A, C) is a sub-class of thread type (A). The thread type (A) includes sub-classes (A, B, D) and (A, C) in the sense that the aggregate of intensity statistics corresponding to (A, B, D) and (A, C) can be represented by the intensity statistics corresponding to (A). Additionally, some embodiments may travel (e.g., traversing a tree or graph) down the thread class hierarchy to observe how the intensity of a particular thread class can be proportionally attributed to the intensities of one or more sub-classes of the thread class. For example, the thread intensity of (A) can be proportionally attributed to the thread intensities of (A, B, D) and (A, C). In other embodiments, each stack trace may be represented as a binary tree.

Some embodiments can provide one or more sequential filters to estimate the measure, rate of change, acceleration, seasonal factor, and residual. Techniques to represent separate seasonal indices for multiple periods (e.g., a weekday period and a weekend period) and to normalize the seasonal factors for the multiple periods may be performed by such embodiments. In particular, some embodiments may represent a separate sequence of seasonal indices for each of the multiple periods. For example, the multiple periods may include a weekday period, a weekend period, an end-of-quarter period, or individual holiday periods. In estimating seasonal indices for multiple periods, some embodiments may also (1) renormalize the seasonal indices to provide a common scale and a common reference level across all periods and (2) fit a smooth-spline across adjacent periods to provide smooth transitions between the cycles of a period or between the cycles of two adjacent periods. By renormalization, the seasonal factors across the multiple periods can have a common scale.

Some embodiments may correlate trends between intensity statistics of various classes of threads and heap usage statistics to identify classes of threads whose intensity statistics have a high degree of correlation with high heap usage. There is a high probability of finding inefficient heap memory usage among classes of threads whose intensity statistics are highly correlated with the high heap usage in the software execution environment. Once the classes of threads are identified, code associated with the classes of threads may investigated and/or optimized.

Some embodiments may construct and maintain models (e.g., univariate, multivariate) of the multi-threaded environment (e.g., virtual machine) executing the process, where the models include seasonal trends, linear trends, and first-order non-linear trends for the intensities of each thread class. Such models may be used to obtain seasonally adjusted long term forecasts on the trend of the system's performance.

By (1) dynamically classifying threads and observing how the intensities of sub-classes of thread classes contribute to an aggregate intensity of the thread class and (2) observing how closely various classes of threads are correlated with detected periods of high heap usage, some embodiments may facilitate the detection and observation of performance glitches within cloud service provisioning systems. Because even minor performance glitches often reveal issues within the process that can result in SLA violations, enabling service providers to detect and address performance glitches may substantially reduce the risk of such violations.

II. Runtime Profiling of Threads

Figure 2:
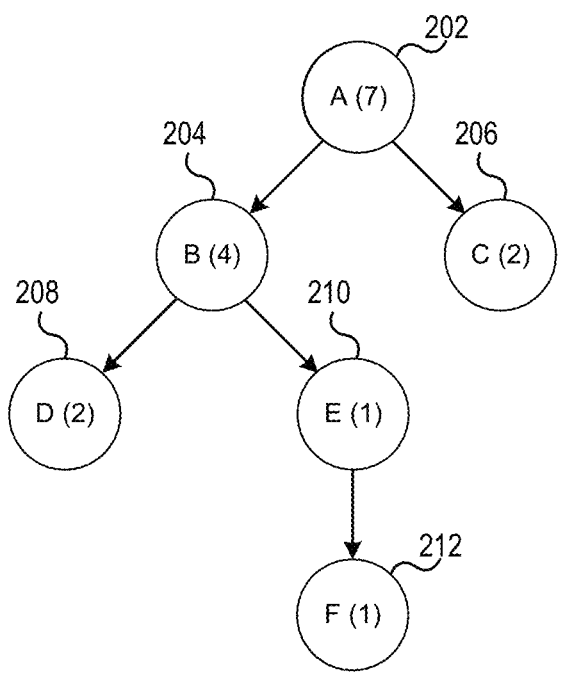
FIG. 2 depicts an exemplary calling context tree.

FIGS. 1-2 depict techniques of profiling a running thread to determine how long various stack segments are present on the thread's call stack in relation to one another. FIG. 1 depicts an exemplary runtime profiling of a single thread 100 over a period of time at a relatively high frequency sampling rate. In some cases, certain techniques may utilize a runtime profiler to take multiple stack trace samples of a thread to construct a calling context tree 200 shown in FIG. 2. If the sampling interval employed by the runtime profiler is relatively short compared to the thread's execution time, the observation count (i.e., call count) statistics for each calling context of the thread can be used to accurately estimate and/or represent the execution time of the calling context relative to the sampling interval.

For example, as shown in FIG. 1, the total execution time of the thread 100 may be between 100 milliseconds and one second while the sampling interval is between 10 milliseconds and 100 milliseconds. During the thread's execution, different calling contexts may be present within the thread's stack depending on which methods are invoked by the thread. The thread may begin its execution by invoking a set of methods that correspond to stack segment A.

It should be noted that a stack segment corresponds to a set of one or more stack frames that are linearly connected. Stack frames that are linearly connected are always observed together within stack traces and thus have the same intensity statistics. Thus, stack segment A may correspond to a plurality of stack frames such as stack frames a1, a2, and a3. Sampling a thread may result in a stack trace that describes an entire calling context of the sampled thread in a list of stack frames. If some of the listed stack frames are linearly connected, those stack frames may be conceptually grouped into a stack segment. As a result, a stack trace may include one or more stack segments, with each stack segment including one or more stack frames.

As the thread continues its execution, code associated with stack segment A may cause the thread to invoke a set of methods that correspond to stack segment B. Next, code associated with stack segment B may cause the thread to invoke yet another set of methods that correspond to stack segment D. After a short period of time, the runtime profiler may take sample 1 of the thread 100, resulting in a first stack trace. From the first stack trace, the runtime profiler may determine that stack segments A, B, and D were on the stack at the time of the sampling. After a sampling interval, the runtime profiler may take another sample 2 of the thread, resulting in a second stack trace. From the second stack trace, the runtime profiler may determine that stack segments A, B, and D were on the stack. As the thread continues to execute, the methods associated with stack segment D may return, resulting in the stack frames corresponding to stack segment D being popped off the stack. Next, the runtime profiler may take another sample 3 of the thread, resulting in a third stack trace. From the third stack trace, the runtime profiler may determine that stack segments A and B were on the stack.

As the thread executes, stack segment B invokes stack segment E, which invokes stack segment F. Next, taking sample 4 results in a fourth stack trace indicating that stack segments A, B, E, and F were on the stack. Stack segments F, E, and B return one after another. Next, taking sample 5 results in a fifth stack trace indicating that only stack segment A is on the stack. Stack segment A causes stack segment C to be pushed onto the stack. Before stack segment C returns, samples 6 and 7 are taken, resulting in a sixth stack trace and a seventh stack trace that both indicate that stack segments A and C are on the stack. Eventually, stack segment C returns, leaving only stack segment A on the stack. When the methods associated with stack segment A return, the thread finishes executing.

As shown in FIG. 2, calling context tree 200 depicts the execution times of stack segments A-F relative to the sampling interval. Node 202 indicates that stack segment A was observed in all of the seven samples. Node 204 indicates that stack segment B was observed in four of the seven samples. Node 206 indicates that stack segment C was observed in two of the seven samples. Node 208 indicates that stack segment D was observed in two of the seven samples. Node 210 indicates that stack segment E was observed in one of the seven samples. Node 212 indicates that stack segment F was observed in one of the seven samples. Because the total execution time of thread 100 is approximately ten times the duration of the sampling interval, the observation count for each stack segment may be closely correlated with the stack segment's execution time. For example, because stack segment B was observed four times, it may be inferred that the relative execution time of stack segment B is at least four times the sampling interval.

In some cases, the environment where the thread 100 executes (i.e., the software execution environment) may correspond to a virtual machine (e.g., a Hotspot Java Virtual Machine (JVM)) where a thread dump is taken once per sampling interval. Before the virtual machine takes a thread dump, it may signal all executing threads (e.g., thread 100) to pause at safepoints. This safepoint mechanism may be similar to the one used by a garbage collector to pause threads prior to executing a full garbage collection. Note that a thread running in kernel mode (e.g., running/blocking on I/O operation) may not pause at a safepoint until the thread returns out of kernel mode (e.g., back to JVM mode).

It should be noted however, that invoking the safepoint mechanism at a high frequency rate may result in substantial overhead. Thus, runtime profiling techniques that rely on a high sampling rate may be more appropriate for development or testing environments rather than production environments.

To reduce overhead, some embodiments employ system models to compensate for a reduced sampling rate. For example, some embodiments may track the intensities of threads of a multi-threaded process and sample only threads with intensities exceeding a threshold that determines latency. One advantage with embodiments that employ reduced samplings rates or adaptive samplings rates is that threads running in kernel mode are less likely to be paused at safepoints. Other methods of reducing overhead may involve lengthening the sampling interval to be commensurate with the intensity of the threads being sampled. For instance, while a one minute sampling interval may result in negligible overhead within a production environment, the one minute sampling interval may be short enough for deriving the relative execution time of threads and their component stack segments in the production environment. Thus, some embodiments may provide an always-on performance monitoring solution for production systems that exhibit stationary mean-ergodicity or cyclo-stationary mean ergodicity for satisfying the assumptions of Little's formula. In such embodiments, the always-on performance monitoring solution may be embodied in a monitoring process (i.e., a control system) that periodically samples threads executing within one or more virtual machines of the production system.

III. Classifying Threads

Various embodiments provide techniques for sequentially analyzing a series of thread dump samples taken from one or more virtual machines (e.g., JVMs) to identify thread classes and to track intensity statistics pertaining to the thread classes. For example, during the execution of one or more multi-threaded processes within a virtual machine, the control system may periodically take a thread dump of the virtual machine. The thread dump may result in a stack trace for each thread that is executing in the virtual machine. For each stack trace that is received, the control system may analyze text contained in the stack trace to classify the associated thread and to update intensity statistics tracked for all thread classes based on the stack trace.

In addition to classifying threads, embodiments may classify new stack segments whenever they emerge at branch points along previously classified stack segments. When the control system observes the first stack trace before any thread classes have been discovered, the control system may consider the entire sequence of stack frames within the stack trace to be linearly connected because the entire sequence of stack frames have only appeared together so far. In response, the control system may initialize a thread class to classify the entire stack trace (i.e., the entire sequence of stack frames). As the control system observes subsequent stack traces that include varying sequences of stack frames, the control system can initialize additional thread classes to classify each unique permutation of stack frames. In some cases, the control system may observe a stack trace that does not share any stack frames (i.e., have any stack frames in common) with previously observed stack traces. In response, the control system may initialize a separate thread class to classify the new stack trace in its entirety.

More commonly however, the control system can observe a stack trace that shares one or more stack frames with previously observed stack traces. Returning to FIG. 1 for example, suppose the first stack trace observed by the control system is {(A, B, D)} (i.e., the stack trace in sample 1 or sample 2) where the stack trace contains the stack frames included in stack segments A, B, and D. The control system may initialize a thread class {(A, B, D)} to classify all threads that are observed to contain the stack frames included in stack segments A, B, and D. Next, suppose the second stack trace observed by the control system is {(A, C)} (i.e., the stack trace in sample 6 or sample 7). In this regard, the control system may determine that while the first and second stack traces are different, the first and second stack traces share all of the stack frames included in stack segment A, which results in a branch point at stack segment A. In response, the control system may initialize a thread class {(A, C)} to classify all threads that contain stack segments A and C on their call stacks.

It should be noted that because the stack frames in stack segment A has been observed separately from the stack frames in stack segment (B, D), the stack segments A and (B, D) are no longer considered by the control system to be linearly connected. Yet, the control system still considers the stack frames in stack segment A to be linearly connected and the stack frames in stack segment (B, D) to be linearly connected. In this regard, the control system may initialize several thread segment components of thread class {(A, B, D)} and thread class {(A, C)} to classify the new stack segments formed by the newly discovered branch point. In particular, the control system may initialize a thread segment (A), a thread segment (B, D), and a thread segment (C), where the thread segments (A) and (B, D) are components of the thread class {(A, B, D)} and the thread segments (A) and (C) are components of the thread class {(A, C)}.

Some embodiments may use classification signatures to represent stack traces and stack segments. In particular, trace signatures can be used to represent stack traces of a particular thread class and segment signatures can be used to represent stack segments of a particular thread segment. Each trace signature may correspond to a tuple of labeled binary trees that is built up via a synthesis and analysis process. Meanwhile, each segment signature of a thread segment may correspond to a node in the tuple that corresponds to the thread class of which the thread segment is a component of. Later on in the analysis process, the tuples may be used like a parse tree (e.g., as part of a production grammar) to recognize incoming stack traces.

Returning to the above example, subsequent to the observation of the first stack trace but prior to the observation of the second stack trace, the thread class {(A, B, D)} may correspond to a tuple of a single binary tree. Because the entire sequence of frames within the first stack trace is considered to be a single stack segment, the single binary tree may include a single root node that represents the stack segment (A, B, D). Subsequent to the observation of the second stack trace, tuple may still include just a single binary tree. However, the binary tree may now include three separate nodes: a root node that represents the stack segment (A, B, D), a first child node of the root node that represents the stack segment (A), and a second child node of the root node that represents the stack segment (B, D). The process of synthesizing trace signatures and segment signatures are discussed in further detail below with reference to FIGS. 4-6.

Each node in a binary tree may be uniquely identified by a label or an identifier, which may be referred to as a compact code. In some embodiments, a thread of a particular thread class may be represented by the one or more compact codes that identify each top-ranked node of the tuple that corresponds to the thread class. In a fashion similar to Huffman coding or other entropy coding schemes, some embodiments may associate shorter tuples to thread classes that are more popular (i.e., have a higher thread intensity) and/or are discovered first. As a result, more common types of threads can be compactly represented by shorter sequences of compact codes. In some embodiments, this may be ensured by first analyzing the probability distribution of stack traces in an offline analysis (i.e., offline processing) and feeding the stack traces to the control system in descending order of frequency.

In embodiments that do not rely on offline analysis, the control system may receive stack traces in sequence with thread dumps that are taken periodically from the one or more virtual machines (i.e., online processing).

The order in which different types of stack traces are observed may be affected by the intensity of each type of stack trace. In other words, stack traces with higher intensities are statistically more likely to be observed earlier in the sequence. Thus, such embodiments may assume that (1) the thread intensity of a particular thread class represents the associated stack trace's probability of occurrence and (2) stack traces associated with higher intensity thread classes are often observed before stack traces associated with lower intensity thread classes. In this regard, the control system will naturally derive the most compact representation for the highest intensity threads. Thus, by relying on thread intensity statistics rather than on offline processing, some embodiments can provide an optimal compression algorithm for stack traces observed in response to a series of thread dumps.

A. Seasonality of Thread Intensity

Some embodiments can estimate, for each thread class that is identified, the seasonal trend for the thread class's intensity. As mentioned above, the intensity of a thread class or a thread segment may refer to a statistical measure of the "hotness" of the code blocks being referenced by the associated stack trace or stack segment. The hotness of a code block can be quantified by the number of invocations of the code block times the execution time of the code block. A single raw thread intensity measure for a thread class may be the count of the number of threads of that thread class in a particular thread dump. An average thread intensity measure per thread dump can correspond to the traffic intensity, offered load, or queue length of the thread type. For mean-ergodic processes, Little's formula can relate the expected intensity $\hat{\rho}$ (the expected number of arrivals during a sampling interval corresponding to the expected response time $\hat{\tau}$) to the expected response time $\hat{\tau}$ and the arrival rate $\lambda$, as shown below:

$$\hat{\rho}=\lambda\hat{\tau}$$

In some embodiments, the seasonal trending process may use variable filter parameters to account for irregular sampling intervals (e.g., sampling heap usage and/or taking thread dumps) and to overcome the Cauchy Distribution Problem. The process can also support sequentially filtering multiple types of periods (e.g., weekday periods, weekend periods, and holiday periods) with varying lengths (e.g., 1 day, 2 days). Furthermore, the process can adjust, according to seasonality, the rate at which thread dumps are taken to reduce overhead while maintaining a particular confidence level for the thread intensity statistics that are determined based on the thread dumps. In some cases, adjusting the thread dump rate may also minimize the volume of thread dump data that needs to be transported over a network (e.g., LAN, the Internet) to other machines (e.g., Big Data repository) for offline processing.

In some embodiments, the seasonal trending process may partition weekday periods (i.e., 24 hour periods) into 96 fifteen minute intervals, which results in 96 seasonal indices (i.e., seasons) for each weekday period. The process may partition weekend periods (i.e., 48 hour periods) into 192 fifteen minute intervals, which results in 192 seasonal indices for each weekend period. Upon receiving a data set of a particular length (e.g., a time series recording thread dumps or heap usage over 10 days, which includes one or two weekends), the process can apply multi-period trending filters to weekday periods and weekend periods separately in order to separate out seasonal patterns observed over single weekdays and seasonal patterns observed over entire weekends, resulting in a set of 96 seasonal factors for the 96 seasonal indices of each weekday and a set of 192 seasonal factors for the 192 seasonal indices of each weekend. The process may then renormalize the weekday seasonal factors and the weekend seasonal factors so that a seasonal factor of '1' represents a common reference level for both weekday periods and weekend periods.

It should be noted that if a seasonal factor larger than one is assigned to a seasonal index, that seasonal index has a higher than average value in comparison to the rest of the period. On the other hand, if a seasonal factor smaller than one is assigned to a seasonal index, that seasonal index has a lower than average value in comparison to the rest of the period. For example, if the seasonal factor for the thread intensity of a particular thread class for the seasonal index that corresponds to the 9 AM-9:15 interval is 1.3, the average thread intensity of that particular thread class during the 9 AM-9:15 AM interval is 30% higher than the average thread intensity of that particular thread class throughout an entire weekday.

In some embodiments, the seasonal trending process may separate out holidays (e.g., Labor Day, Christmas Day) as separate periods that repeat with a frequency of once every 12 months while weekday periods repeat every 24 hours and weekend periods repeat every 5 or 7 days. The set of seasonal factors for such holiday periods may be renormalized together with those of weekday periods and weekend periods so that the seasonal factor 1 represents a common reference level for all periods. Other frequencies for each period may be appropriate, as desired. As examples, holidays may be separated at a frequency of every 6 months or the like while weekday may be periods repeat every 12 hours or the like.

In some embodiments, determining and tracking intensity statistics may further include forecasting future values and the rate of change. However, the sampling interval can be irregular or even become arbitrarily close to zero. In cases where the sampling interval becomes arbitrarily close to zero, the rate of change may become a random variable of the Cauchy Distribution, whose mean and standard deviation are undefined. To overcome the Cauchy Distribution problem with regards to determining seasonal trends with adaptive sampling intervals, some embodiments may employ various adaptions of Holt's Double Exponential Filter, Winter's Triple Exponential Filter, Wright's Extension for Irregular Time Intervals, Hanzak's Adjustment Factor for time-close intervals, outlier detection, and clipping with adaptive scaling of outlier cutoff. The five sets of exponential filters can be sequentially applied to the data set to estimate sets of seasonal factors for weekday periods and weekend periods.

B. Classification Signatures and Compression Scheme

Certain embodiments can assign a variable length sequence of compact codes to the stack traces of threads where the length of sequence depends on the intensity of the threads. An exemplary stack trace is presented below:

```
oracle.jdbc.driver.T4CCallableStatement.executeForRows(T4CCallableStatement.java:991)
oracle.jdbc.driver.OracleStatement.doExecuteWithTimeout(OracleStatement.java:1285)
...
oracle.mds.core.MetadataObject.getBaseMO(MetadataObject.java:1048)
oracle.mds.core.MDSSession.getBaseMO(MDSSession.java:2769)
oracle.mds.core.MDSSession.getMetadataObject(MDSSession.java:1188)
...
oracle.adf.model.servlet.ADFBindingFilter.doFilter(ADFBindingFilter.java:150)
...
oracle.apps.setup.taskListManager.ui.customization.CustomizationFilter.doFilter(CustomizationFi
   lter.java:46)
...
weblogic.servlet.internal.WebAppServletContext.securedExecute(WebAppServletContext.java:22
   09)
weblogic.servlet.internalServletRequestImpl.run(ServletRequestImpl.java:1457)
...
weblogic.work.ExecuteThread.execute(ExecuteThread.java:250)
weblogic.work.ExecuteThread.run(ExecuteThread.java:213)
```

In the exemplary stack trace, the stack frame "oracle mds core MetadataObject getBaseMO" below the Java Database Connectivity (JDBC) driver stack segment (i.e., the two stack frames each including "oracle.jdbc.driver . . . ") indicates that the Meta Data Service (MDS) library invokes the JDBC operations that correspond to the JDBC stack segment. The stack frame "oracle adf model servlet ADF-BindingFilter doFilter" below the MDS library stack segment (i.e., the three stack frames each including "oracle.mds . . . ") indicates that the MDS operations are invoked by an Application Development Framework (ADF) operation. As shown by the WebLogic stack segment (i.e., the four stack frames each including "weblogic . . . ") at the bottom of the stack trace, the ADF operation is invoked through a Hypertext Transfer Protocol (HTTP) Servlet request.

As an example, a two-level Huffman coding scheme can be used to encode and compress the above stack trace, resulting in a sequence of compact codes that represents the exemplary stack trace. In the first level, compression tools (e.g., gzip) can detect substrings within the stack trace such as "ServletRequestImpl.java" and "weblogic.servlet.internal.ServletRequestImpl.run" and derive Huffman codes for the substrings according to how frequently those substrings occur in the stack trace. To increase the compression ratio, more frequently occurring substrings may be assigned shorter Huffman codes. After the first level of compression, the compressed stack trace may include, as metadata, an encoding dictionary that can be used to restore the substrings from the Huffman codes.

The second level may involve applying another level of compression to the compressed stack trace by replacing stack segments of the stack trace with segment signatures. The steps of applying the second level of compression are discussed in further detail below with respect to FIGS. 4-6.

C. Exemplary Data Structures

Classification signatures may be represented in memory via one or more object types. In particular, some embodiments may use a ThreadClassificationInfo object to represent the classification signature of a thread class (i.e., a trace signature), a SegmentInfo object to represent the classification signature of a thread segment (i.e., a segment signature), a StackFrameInfo object to represent each element in a linearly connected stack frames within stack segments, and a SeasonalTrendInfo object to encapsulate and track intensity statistics for a thread class or a thread segment.

Exemplary class/interface definitions that define ThreadClassificationInfo objects, SegmentInfo objects, StackFrameInfo objects, and SeasonalTrendInfo objects are provided below:

```
public class ThreadClassificationInfo {
    long id;
    String name;
    short numOfOccur;
    short totalNumberOfOccur;
    short numOfStackFrames;
    short numOfCoalescedSegments;
    List<SegmentInfo> segments;
    SeasonalTrendInfo trend;
}
public class SegmentInfo extends SegmentInfo {
    long id;
    String name;
    String dimension;
    short numOfOccur;
    short totalNumOfOccur;
    List<StackFrameInfo> elements;
    SegmentInfo firstSegment;
    SegmentInfo secondSegment;
    StackSegmentInfo coalescingSegment;
    Set<StackSegmentInfo> predecessors;
    Set<StackSegmentInfo> successors;
    SeasonalTrendInfo trend;
    Set<ThreadClassInfo> partOfThreadClasses;
}
public class StackFrameInfo {
    long id;
    String name;
    short numOfOccur;
    short totalNumOfOccur;
    Set<StackFrameInfo> predecessors;
    Set<StackFrameInfo> successors;
    StackSegmentInfo coalescingSegment;
    String classMethodLineNumber;
}
public class SeasonalTrendInfo {
    List<long>      posixTimestampOfMeasurement;
    List<short>     rawMeasure;
    List<double>    rawDeseasonalizedMeasure;
    List<double>    smoothedMeasure;
    List<double>    smoothedDeseasonalizedMeasure;
    double          measureFilterConstant;
    List<double>    measureWeightFactor;
    List<double>    measureFilterParameter;
    List<double>    rawGrowthRate;
    List<double>    smoothedGrowthRate;
    double          rateFilterConstant;
    List<double>    rateWeightFactor;
    List<double>    rateFilterParameter;
    List<double>    rawGrowthRateAcceleration;
    List<double>    smoothedGrowthRateAcceleration;
    double          accelerationFilterConstant;
    List<double>    accelerationWeightFactor;
    List<double>    accelerationFilterParameter;
    List<double>    rawWeekdaySeasonalFactor;
    List<double>    rawWeekendSeasonalFactor;
    List<double>    smoothedWeekdaySeasonalFactor;
    List<double>    smoothedWeekendSeasonalFactor;
    double          seasonalFactorFilterConstant;
    List<double>    seasonalIndexWeightFactor;
    List<double>    seasonalIndexFilterParameter;
    List<double>    errorResidual;
    List<double>    smoothedErrorResidual;
    List<double>    smoothedAbsoluteErrorResidual;
    List<double>    normalizedResidual;
    List<double>    normalizedResidualCutoff;
    double          errorResidualFilterConstant;
    List<double>    errorResidualWeightFactor;
    List<double>    errorResidualFilterParameter;
    List<double>    localGrowthRateForecast;
    List<double>    oneStepIntensityForecast;
    List<double>    multiStepIntensityForecast;
    short           forecastHorizon;
    double[96]      weekdaySeasonalFactor;
    double[192]     weekendSeasonalFactor;
}
```

As can be seen in the above definitions, each ThreadClassificationInfo object, SegmentInfo object, and StackFrameInfo object includes a unique identifier (i.e., id), a name, a counter that tracks the number of times an object of the same type (e.g., same thread class, same thread segment, same type of stack frame) was observed in the latest thread dump (i.e., numOfOccur), and another counter that tracks the number of times an object of the same type was observed in all thread dumps.

A ThreadClassificationInfo object can include a list of SegmentInfo objects and a SeasonalTrendInfo object. In this regard, the ThreadClassificationInfo may correspond to a tuple of binary trees while the list of SegmentInfo objects corresponds to the nodes making up the binary trees. The SeasonalTrendInfo object may record intensity statistics (e.g., a filter state) that pertain to the thread class represented by the ThreadClassificationInfo object.

A SegmentInfo object can include a list of StackFrameInfo objects, a first child SegmentInfo object (i.e., firstSegment), a second child SegmentInfo object (i.e., secondSegment), a coalescing (i.e., parent) SegmentInfo object (i.e., coalescingSegment), a list of preceding sibling SegmentInfo objects (i.e., predecessors), a list of succeeding sibling SegmentInfo objects (i.e., successors), and a SeasonalTrendInfo object. In this regard, the SegmentInfo object may correspond to a stack segment. If the SegmentInfo object corresponds to a leaf node, the list of StackFrameInfo objects may correspond to the linearly connected stack frames included in the stack segment. If the SegmentInfo object borders a branch point, the sibling SegmentInfo objects may correspond to stack segments on the opposite side of the branch point while the coalescing SegmentInfo object may correspond to a parent stack segment that includes both the stack segment and a sibling stack segment. If the SegmentInfo object does not correspond to a leaf node, the child SegmentInfo objects may correspond to sub-segments of the stack segment that were created when a branch point was discovered in the stack segment. The SeasonalTrendInfo object, may record intensity statistics pertaining to the thread segment represented by the SegmentInfo object.

Some embodiments may classify a stack segment of a stack trace by associating a list of StackFrameInfo objects that are observed together with a single SegmentInfo node. In other words, the SegmentInfo node is the coalescing node of each of the StackFrameInfo objects of the stack segment. Each StackFrameInfo object may have a single coalescing SegmentInfo node. When a branch point is detected somewhere along the linearly connected StackFrameInfo objects of a SegmentInfo node, some embodiments may create two new SegmentInfo nodes and split the linearly connected StackFrameInfo objects into two sets of linearly connected StackFrameInfo objects among the new SegmentInfo nodes. It can then reconnect the two StackFrameInfo objects through a branch point.

Each of the new SegmentInfo nodes become the coalescing node of the StackFrameInfo objects in its part of the segment. Certain embodiments can update the coalescingSegment of the StackFrameInfo objects correspondingly so that each StackFrameInfo object refers to the correct coalescing SegmentInfo node. The two new SegmentInfo nodes are represented as a left sibling node and a right sibling node. The two new SegmentInfo nodes also become children of the original SegmentInfo node, which in turn becomes their parent. The parent SegmentInfo node can become the coalescing node of the two new SegmentInfo nodes.

The process of splitting stack segments in response to discovered branch points can result in a binary tree structure composed of SegmentInfo nodes. This splitting process can be seen as bifurcation of a thread class (i.e., a class of stack traces) into thread sub-classes. Some embodiments can continually split the stack segments into smaller stack segments as the intensities of the individual stack frames in the stack segments diverge over time, thereby enabling one to drill-down a thread class hierarchy to observe how the intensity of a thread class can be proportionally attributed to the intensities of thread sub-classes.

In some embodiments, the SegmentInfo nodes in the interior of the binary tree are parent nodes whose StackFrameInfo objects are not all linearly connected because some stack frames are connected through branch points. In contrast, the StackFrameInfo objects of the leaf SegmentInfo nodes can be linearly connected. Within a SegmentInfo node, the linearly connected or branch-point connected StackFrameInfo objects can be oriented as a stack with a bottom StackFrameInfo and a top StackFrameInfo. By convention, the top StackFrameInfo object in the left sibling SegmentInfo node can be connected to the bottom StackFrameInfo object of the right sibling SegmentInfo node through a branch point.

Each SegmentInfo node may include a SeasonalTrendInfo object to track the intensity statistics of the thread (sub-) class represented by the SegmentInfo node. When splitting a SegmentInfo node into two new children SegmentInfo nodes, some embodiments can clone the SeasonalTrendInfo object of the SegmentInfo node into two new SeasonalTrendInfo objects and set one SeasonalTrendInfo object in each of the children SegmentInfo nodes.

Some embodiments provide the ability to replicate the filter state of a parent SegmentInfo node to new child SegmentInfo nodes through the splitting process. In doing so, some embodiments can continuously track the ratio of the intensity statistics among the parent and sibling SegmentInfo nodes. In particular, the intensity statistics of the children SegmentInfo nodes are each initially the same as that of the parent SegmentInfo node. However, as new samples are obtained, the intensity statistics of the children SegmentInfo nodes may begin to diverge from that of the parent and from each other. The filter states of the new stack segments begin to deviate from each other and the filter state of the original stack segment as the filter states of the new stack segments are separately updated.

In some cases, intensity statistics among parent and sibling SegmentInfo nodes can converge to a ratio over time. Some embodiments can apply the parent-child and sibling relationships among the SegmentInfo nodes to define correlation models for multivariate state estimation techniques. In particular, if the process is stationary, the ratio of the intensity statistics among the related SegmentInfo nodes may converge to a stationary state. In particular, if a process is strict-sense or wide-sense stationary, the first and second moments of the joint probability distributions of intensity statistics among related SegmentInfo nodes, which may include the mean, variance, auto-covariance, and cross-covariance of the related SegmentInfo nodes may not vary with respect to time. Thus, the ratio of intensity statistics among the parent and sibling SegmentInfo nodes can be expected to converge over time. Thus, by continuously tracking the intensity statistics of the sibling SegmentInfo nodes through branch points and determining that the ratio of intensity statistics among the parent and sibling SegmentInfo nodes converge over time, some embodiments can use the ratios to define correlation models for multivariate state estimation techniques. The resulting models can be used for anomaly detection and generating predictions.

A StackFrameInfo object can include a one or more preceding StackFrameInfo objects and/or one or more succeeding StackFrameInfo objects (i.e., predecessors and successors), a coalescing SegmentInfo object (i.e., coalescingSegment), and information that identifies code referenced by the StackFrameInfo object (i.e., classMethodLineNumber). If the StackFrameInfo object is not adjacent to a branch point, the StackFrameInfo object can be linearly connected to a single predecessor stack frame and a single successor stack frame. The StackFrameInfo object can refer to the containing SegmentInfo object by the member variable coalescingSegment.

When it comes time to process the latest thread dump, the member variable numOfOccur for every ThreadClassificationInfo object, SegmentInfo object, and StackFrameInfo object can be reset to 0. Each stack trace obtained from the thread dump may be parsed from the bottom to the top of the stack trace. After applying the first level of the Huffman coding scheme to compress the stack trace, each line of the stack trace may be parsed into a StackFrameInfo object. After parsing the list of StackFrameInfo objects into a list of SegmentInfo objects, some embodiments may attempt to match the list of SegmentInfo objects to a ThreadClassificationInfo object that contains a matching list of SegmentInfo objects. If such a ThreadClassificationInfo object does not exist, some embodiments may register a new ThreadClassificationInfo object to represent the list of SegmentInfo objects. Afterwards, some embodiments may then update the numOfOccur and totalNumOfOccur member variables of the matching/new ThreadClassificationInfo object and each SegmentInfo object and StackFrameInfo object in the matching/new ThreadClassificationInfo object. Note that if a SegmentInfo node is a leaf level node, the numOfOccur member variable of the node will be equivalent to that of each StackFrameInfo element in the SegmentInfo node.

Next, some embodiments can update intensity statistical measures encapsulated in associated SeasonalTrendInfo objects. In particular, some embodiments may update the rawMeasure member variables in each SeasonalTrendInfo object by setting the rawMeasure to the numOfOccur member variable of the containing ThreadClassificationInfo object or SegmentInfo object. Note that in some embodiments, the rawMeasure may only be updated every N thread dumps, in which case the rawMeasure of a SeasonalTrendInfo object is set to the corresponding numOfOccur divided by N. In some embodiments, such embodiments may update the rawMeasure member variable of a SeasonalTrendInfo object only when the numOfOccur member variable of the associated ThreadClassificationInfo object or the associated SegmentInfo object is not zero. If the numOfOccur member variable is not zero, then the rawMeasure of the SeasonalTrendInfo object is set to the value of numOfOccur divided by N, where N is the number of thread dumps since the last update of rawMeasure. In such embodiments, the method treats the case of when the numOfOccur is zero as if no measurement is available. In this regard, when no measurement is available, the rawMeasure is not updated. Stated another way, such embodiments track the number of thread dumps since the last update of the rawMeasure 'N'. The thread intensity measurements may correspond to an irregular time series. It should be noted that exponential filters for irregular time intervals (e.g., Holt's Double Exponential and Winter's Triple Exponential Filter, disclosed above) can effectively filter the rawMeasure to get a de-seasonalized measure and a seasonal factor from a set of measurements taken at irregular time intervals.

It should be noted that each SeasonalTrendInfo object can include time-series data generated by five sets of exponential filters being applied to each of the following statistical measurements: the raw measure of thread intensity, the rate at which the thread intensity is increasing or decreasing, the acceleration or deceleration of the rate, the seasonal factor for the thread intensity, and the residual component. Within a SeasonalTrendInfo object, the states of the five sets of exponential filters for the variables, the filter constants, filter parameter adjustment weight factors (to adjust for irregular time intervals between samples), and filter parameters can be represented by the time-series data.

D. Exemplary Generation of Classification Signatures

Figure 3:
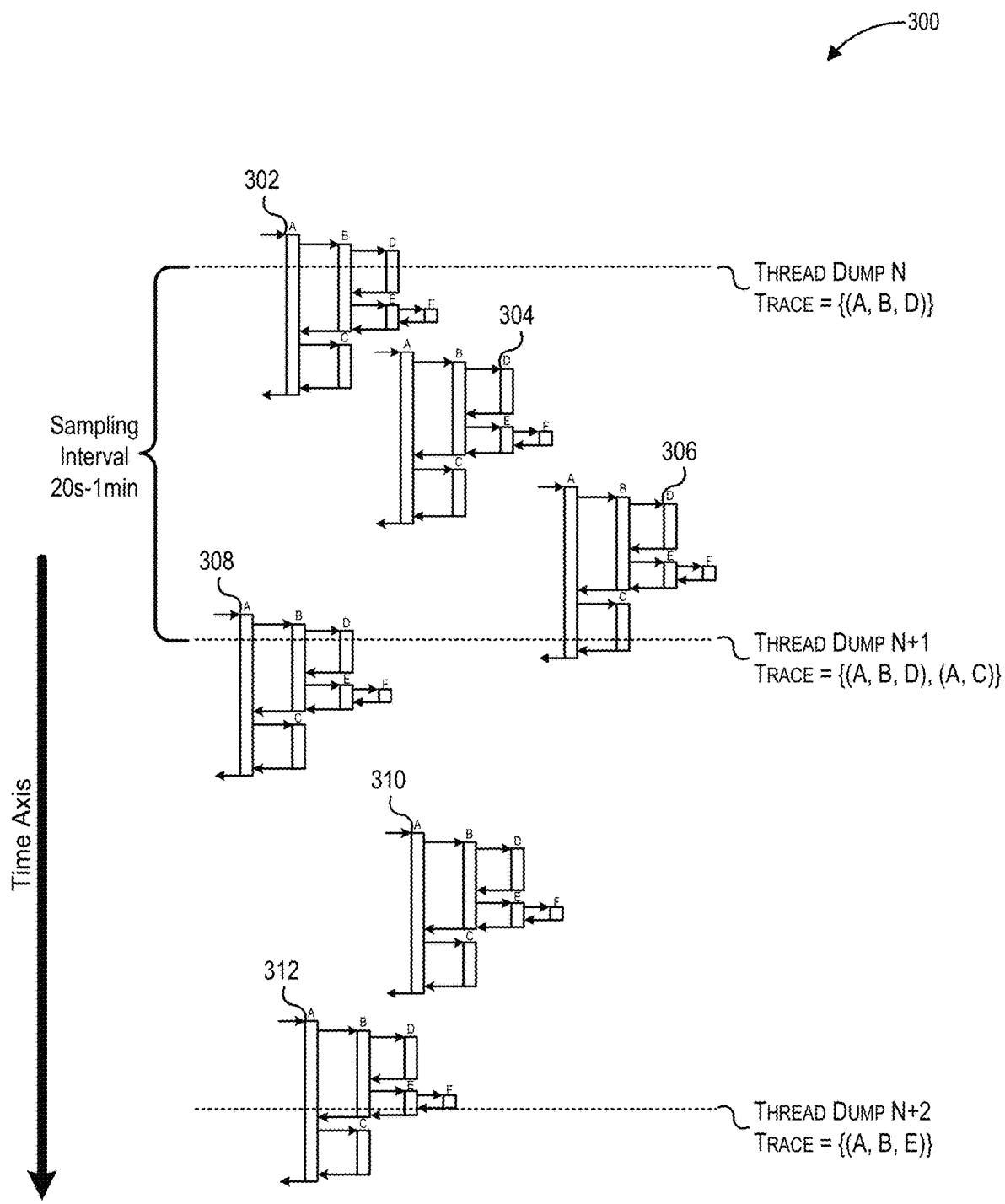
FIG. 3 depicts exemplary thread dumps of a virtual machine over a period of time, according to some embodiments.

FIG. 3 depicts exemplary thread dumps of a virtual machine 300 over a period of time, according to some embodiments. In contrast with the 100 ms to one second sampling interval runtime profiling in FIG. 1, the sampling interval employed by the control system in FIG. 3 may be longer (e.g., between 20 seconds and one minute) to reduce sampling overhead. As shown in FIG. 3, within two to three sampling intervals, processes executing within the virtual machine 300 spawn the threads 302, 304, 306, 308, 310, and 312. Each of the threads 302-312 are associated with a separate call stack while executing and can thus produce a stack trace when a thread dump is taken. FIG. 3 depicts a total of three thread dumps being taken: thread dump N, thread dump N+1, and thread dump N+2.

FIG. 3 shows three different types of stack traces being observed in the order (A, B, D), (A, B, D), (A, C), and (A, B, E) in three consecutive thread dumps. The stack trace (A, B, D) is observed twice. Before thread dump N is taken, the thread 302 is spawned and begins executing. When thread dump N is taken, a stack trace (A, B, D) observed for the thread 302. It should be noted that even though stack segment A, stack segment B, and stack segment D have yet to be identified, for ease of explanation, the names of the stack segments will be used throughout the example depicted in FIG. 3. As a sampling interval elapses after thread dump N is taken, the thread 302 finishes, the thread 304 is spawned and finishes without ever being sampled while the threads 306 and 308 are spawned. When thread dump N+1 is taken, the thread 308 yields a stack trace (A, B, D) while the thread 310 yields stack trace (A, C). As another sampling interval elapses after thread dump N+1 is taken, the threads 306 and 308 finish, the thread 310 is spawned and finishes without ever being sampled, and the thread 312 is spawned. When thread dump N+2 is taken, thread 312 yields stack trace (A, B, E). As can be seen in FIG. 3, the (A, B, D) thread type is the first type of thread to be observed and the (A, B, D) thread type has a higher intensity than the (A, C) or (A, B, E) thread types.

After thread dump N, the control system can register the single SegmentInfo(A, B, D) node as the classification signature for the stack trace (A, B, D). The control system may then associate a SeasonalTrendInfo(A, B, D) object with the SegmentInfo(A, B, D) node and update the state encapsulated by the node:

SegmentInfo(A, B, D)·numOfOccur=1.
SegmentInfo(A, B, D)·totalNumOfOccur=1.

Figure 4:
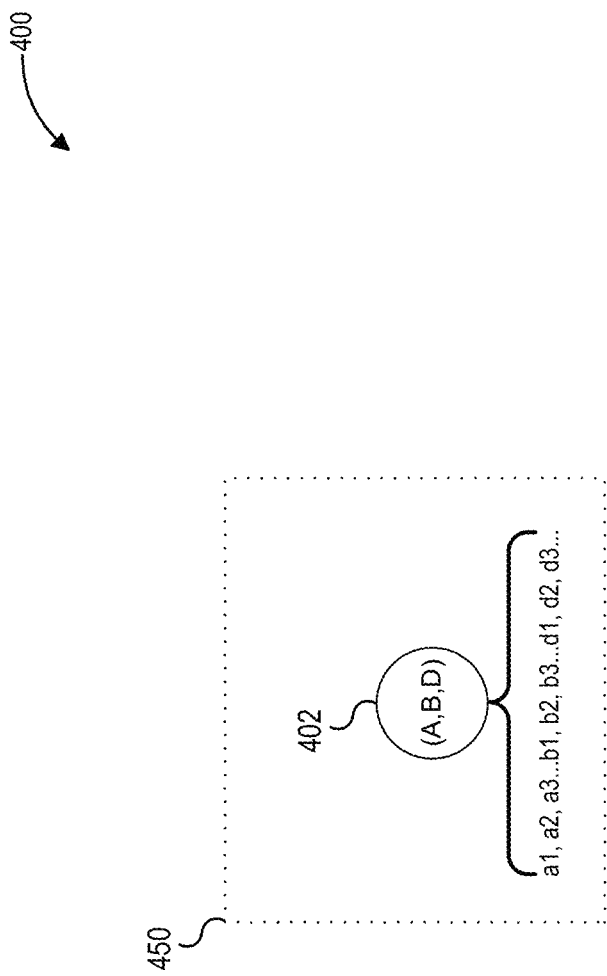
FIGS. 4-6 depict exemplary thread classification signatures, according to some embodiments.

FIG. 4 depicts a set of classification signatures 400 including a single classification signature 450 that has been registered in response to the stack trace (A, B, D). As can be seen in FIG. 4, the classification signature 450 includes a single node 402 that corresponds to SegmentInfo(A, B, D), where SegmentInfo(A, B, D) is shown to be the coalescing node of all stack frames a1-d3 of the stack trace.

When stack trace (A, B, D) is observed again in thread dump N+1, the control system may update the SegmentInfo (A, B, D) node as follows:

SegmentInfo(A, B, D)·numOfOccur=1.
SegmentInfo(A, B, D)·totalNumOfOccur=2.

When stack trace (A, C) is observed for the first time in thread dump N+1, the control system determines that the entire set of stack frames within the stack segment (A, B, D) are no longer linearly connected. A branch point now exists between the last stack frame (e.g., going from top to bottom of the stack trace) of the set of stack frames represented by 'A' and the first stack frame of the set of stack frames represented by 'B, D' because, in any given stack trace, the next stack frame that follows the last stack frame could be (1) the first stack frame of (B, D) or (2) the first stack frame of the set of stack frames represented by 'C'. Thus, the control system may split the stack segment (A, B, D) into stack segment (A) and stack segment (B, D) by creating the nodes SegmentInfo(A) and SegmentInfo(B, D) and assigning the two nodes to be children of SegmentInfo(A, B, D). For stack trace (A, C), the control system may initialize stack segment (C) by creating the node SegmentInfo(C) and register an ordered tuple including SegmentInfo(A) and SegmentInfo(C) as the classification signature for the stack trace (A, C).

In some embodiments, the control system may clone the SeasonalTrendInfo(A, B, D) object into SeasonalTrendInfo (A) and SeasonalTrendInfo(B, D) objects for the nodes SegmentInfo(A) and SegmentInfo(B, D), respectively, and create a new SeasonalTrendInfo(C) for SegmentInfo(C) as follows:

SeasonalTrendInfo(A)←SeasonalTrendInfo(A, B, D)
SeasonalTrendInfo(B, D)←SeasonalTrendInfo(A, B, D)
SeasonalTrendInfo(C)←new SeasonalTrendInfo The control system may also update the above SegmentInfo nodes as follows:

SegmentInfo(A)·numOfOccur=2
SegmentInfo(A)·totalNumOfOccur=3
SegmentInfo(C)·numOfOccur=1
SegmentInfo(C)·totalNumOfOccur=1

Figure 5:
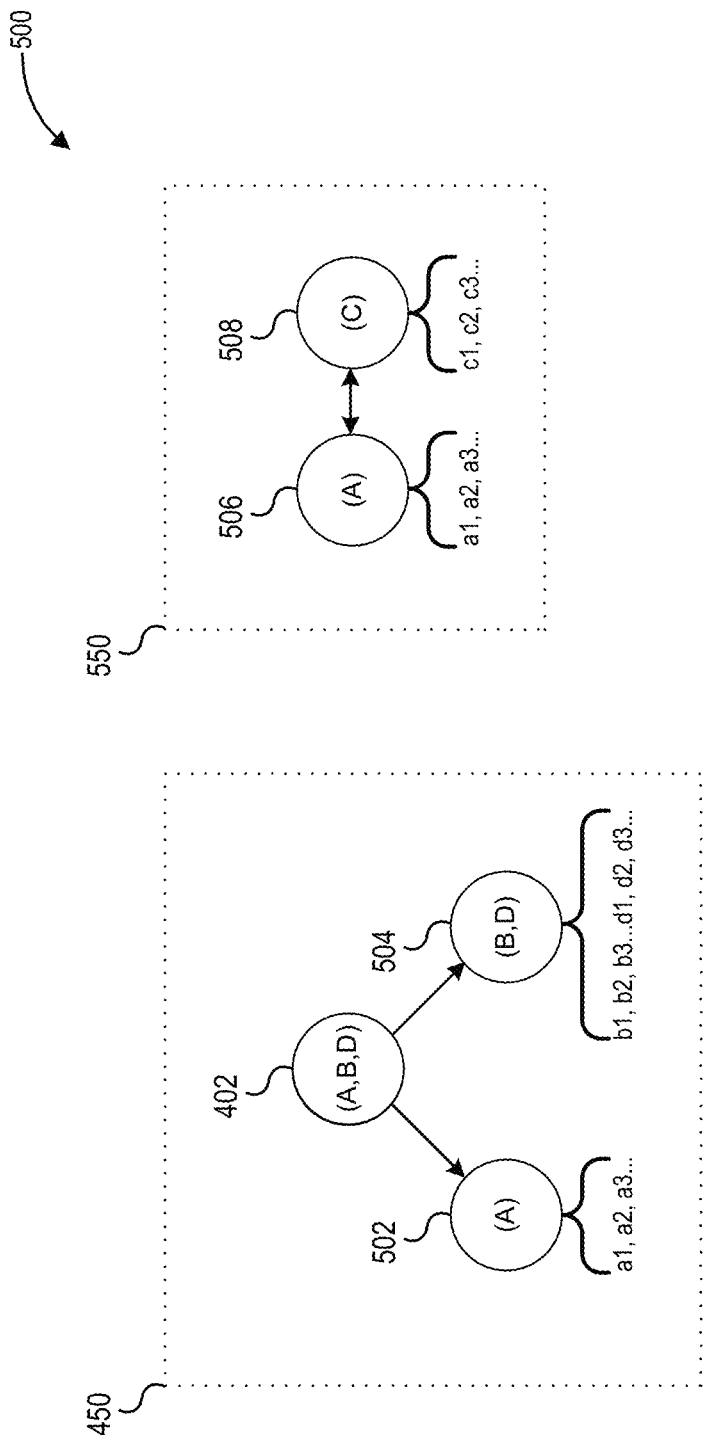

FIG. 5 depicts a set of classification signatures 500 including the classification signature 450 and a new classification signature 550 that was generated in response to observing stack trace (A, C) for the first time. As can be seen in FIG. 5, the classification signature 450 now includes three nodes: node 402, nodes 502, and node 504. Node 402 corresponds to SegmentInfo(A, B, D), which is the coalescing node of node 502 and node 504. Node 502 corresponds to SegmentInfo(A), which coalesces stack frames a1-a3. Node 504 corresponds to SegmentInfo(B, D), which coalesces stack frames b1-d3. The classification signature 550 includes two nodes: node 506, which corresponds to SegmentInfo(A) shown to coalesce stack frames a1-a3, and node 508, which corresponds to SegmentInfo(C) shown to coalesce stack frames c1-c3.

When stack trace (A, B, E) is observed for the first time in thread dump N+2, the control system determines that the entire set of stack frames within the stack segment (B, D) are no longer linearly connected. A branch point now exists between the last stack frame of the set of stack frames represented by 'B' and the first stack frame of the set of stack frames represented by 'D' because, in any given stack trace, the next stack frame that follows the last stack frame could be (1) the first stack frame of (D) or (2) the first stack frame of the set of stack frames represented by 'E'. Thus, the control system may split the stack segment (B, D) into stack segment (B) and stack segment (D) by creating the nodes SegmentInfo(B) and SegmentInfo(D) and assigning the two nodes to be children of SegmentInfo(B, D). For stack trace (A, B, E), the control system may initialize stack segment 'E' by creating the node SegmentInfo(E) and register an ordered tuple including SegmentInfo(A), SegmentInfo(B), and SegmentInfo(E) as the classification signature for the stack trace (A, B, E).

In some embodiments, the control system can clone the SeasonalTrendInfo(B, D) object into SeasonalTrendInfo(B) and SeasonalTrendInfo(D) objects for the nodes SegmentInfo(B) and SegmentInfo(D), respectively, and create a new SeasonalTrendInfo(E) for SegmentInfo(E) as follows:

SeasonalTrendInfo(B)←SeasonalTrendInfo(B, D)
SeasonalTrendInfo(D)←SeasonalTrendInfo(B, D)
SeasonalTrendInfo(E)←new SeasonalTrendInfo The control system may also update the above SegmentInfo nodes as follows:

SegmentInfo(A)·numOfOccur=1
SegmentInfo(A)·totalNumOfOccur=4
SegmentInfo(B)·numOfOccur=1
SegmentInfo(B)·totalNumOfOccur=3
SegmentInfo(E)·numOfOccur=1
SegmentInfo(E)·totalNumOfOccur=1

Figure 6:
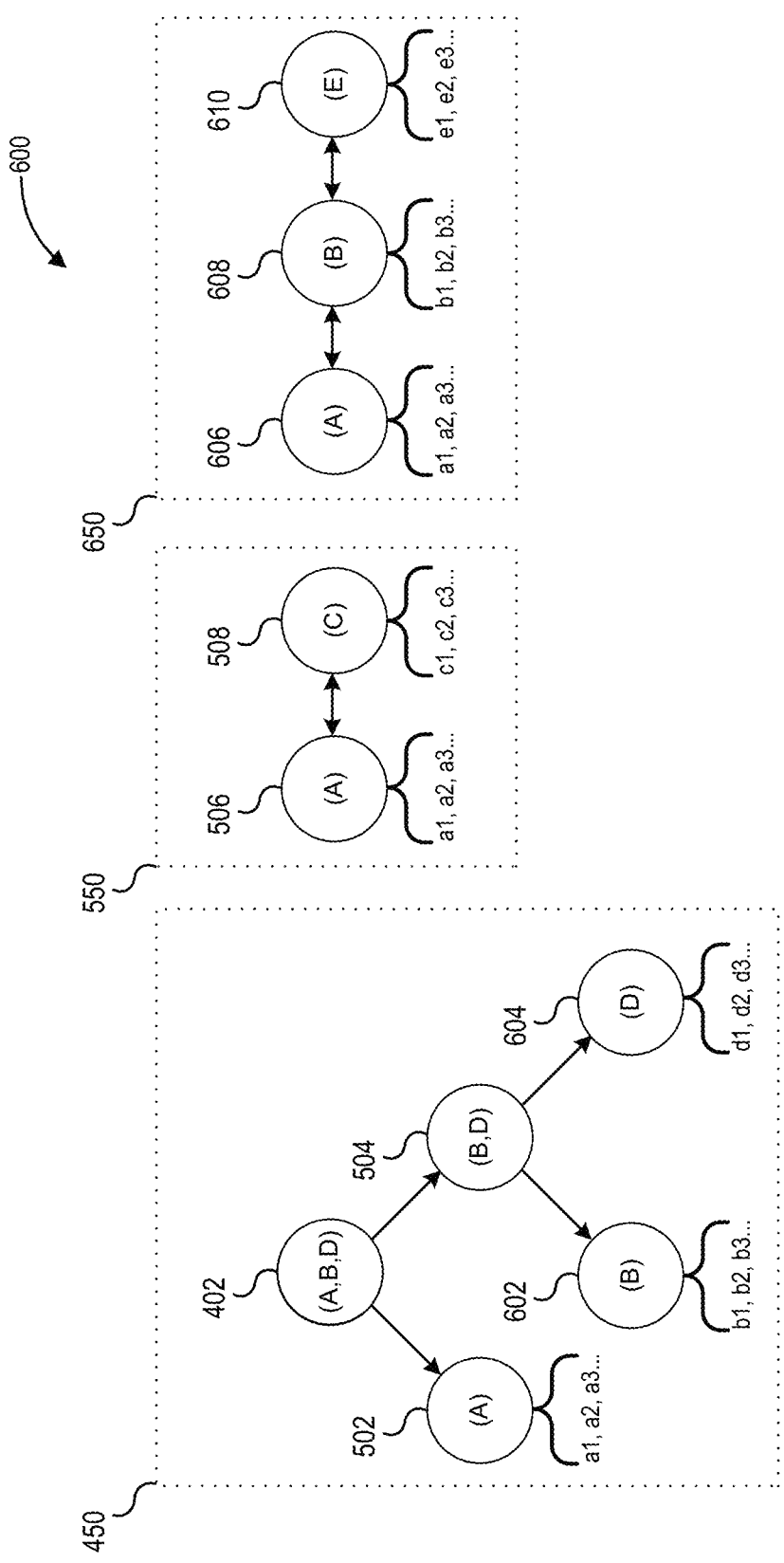

FIG. 6 depicts a set of classification signatures 600 including the classification signatures 450 and 550 and a new classification signature 650 that was generated in response to the stack trace (A, B, E). As can be seen in FIG. 6, the classification signature 450 now includes five nodes: node 402, node 502, node 504, node 602, and node 604. Node 504 corresponds to SegmentInfo(B, D), which is the coalescing node for node 602 and node 604. Node 602 corresponds to SegmentInfo(B), which coalesces stack frames b1-b3. Node 604 corresponds to SegmentInfo(D), which is the coalescing node for stack frames d1-d3. The classification signature 550 has not changed. The classification signature 650 includes three nodes: node 606, which corresponds to SegmentInfo(A) shown to coalesce stack frames a1-a3, node 608, which corresponds to SegmentInfo (B) shown to coalesce stack frames b1-b3, and node 610, which corresponds to SegmentInfo(E) shown to coalesce stack frames e1-e3.

As shown in FIG. 6, the classification signature for the stack trace (A, B, D) can be comprised of a single SegmentInfo node at the root of the classification signature 450. In other words, stack trace (A, B, D), which is the highest intensity stack trace, has the most compact representation. Meanwhile, stack trace (A, C) is assigned the second shortest classification signature with the two ordered nodes (A) and (C). Stack trace (A, B, E), which was detected last, is assigned the third shortest classification signature with the three ordered nodes (A), (B), and (E). As shown in FIGS. 4-6, a ThreadClassificationInfo object may correspond to a tuple of SegmentInfo nodes and a SegmentInfo node may refer to binary trees (or sub-trees that are binary) of other SegmentInfo nodes and/or sets of StackFrameInfo objects. Together, the ThreadClassificationInfo objects, SegmentInfo nodes, and the StackFrameInfo objects may constitute the production grammar:

Thread1→(A, B, D)
Thread2→(A)(C)
Thread3→(A)(B)(E)
(A, B, D)→(A)(B, D)
(B, D)→(B)(D)
A→a1,a2,a3
B→b1,b2,b3
C→c1,c2,c3
D→d1,d2,d3
E→e1,e2,e3

As can be seen above, the individual stack frames ai, bi, ci, di, ei are terminals while the SegmentInfo nodes are non-terminals of the grammar. Some embodiments can parse the stack frames of a stack trace from the bottom of the stack trace to the top of the stack trace (oriented as left to right in the following notation).

| | |
|---|---|
| a1, a2, a3, b1, b2, b3, d1, d2, d3 | |
| (A), b1, b2, b3, d1, d2, d3 | use production (A) -> a1, a2, a3 |
| (A), (B), d1, d2, d3 | use production (B) -> b1, b2, b3 |
| (A), (B), (D) | use production (D) -> d1, d2, d3 |
| (A), (B, D) | use production (B, D) -> (B)(D) |
| (A, B, D) | use production (A, B, D) -> (A), (B, D) |
| Thread1 | use production Thread1 -> (A, B, D) |

As can be seen above, some embodiments can analyze the stack frames via bottom-up syntax analysis, which may be similar to shift-reduce parsing or left to right "LR" parsing. The analysis can involve shifting and reducing the stack frames and SegmentInfo nodes to construct a parse tree for the stack trace by working from the leaves to the root of the tree. Some embodiments can synthesize the parse tree for an earlier occurrence of the stack traces of a thread and analyze the stack traces of another occurrence of the thread by reducing (i.e., shift-reduce parsing, left to right "LR" parsing) to the same parse tree. Each node of the classification tree can be a compact label for a class of stack traces and the root of the classification tree can be a compact label for a class of threads.

Figure 7:
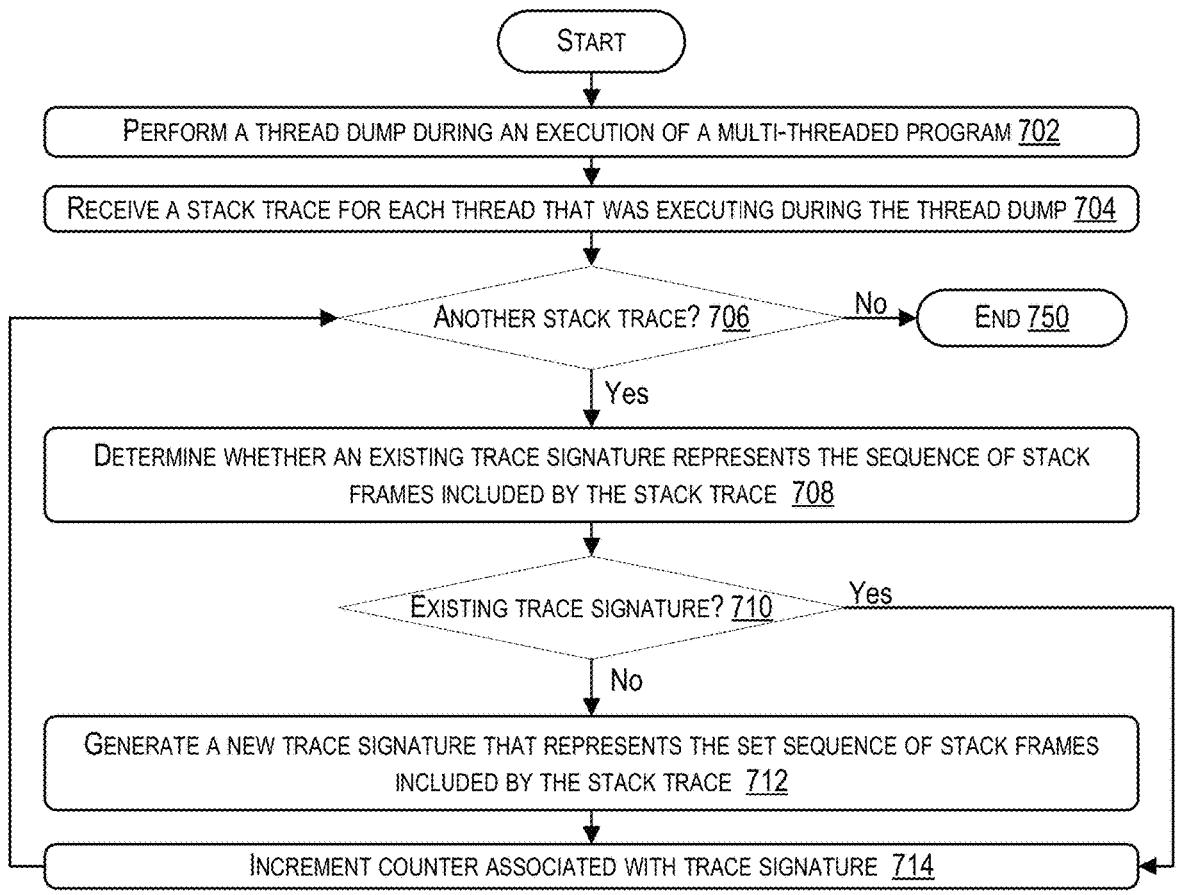
FIG. 7 shows a simplified flowchart that depicts the generation and/or modification of one or more thread classification signatures in response to a thread dump according to some embodiments.

FIG. 7 illustrates a flowchart 700 of a process for generating and/or modifying one or more thread classification signatures in response to a thread dump according to some embodiments. In some embodiments, the process depicted in flowchart 700 may be implemented by a computer system with one or more processors (e.g., computer system 1700 of FIG. 17) where the one or more processors can execute the steps based on computer code stored in a computer-readable medium. The steps described in FIG. 7 can be performed in any order and with or without any of the other steps.

Flowchart 700 begins at step 702, where embodiments perform a thread dump during an execution of a multi-threaded program. In particular, some embodiments may correspond to one or more monitoring processes that monitor a software execution environment in which the multi-threaded program executes. The software execution environment may support a plurality of multi-threaded processes that include the multi-threaded program. In some cases, the software execution environment may be a virtual machine that supports the taking of thread dumps. In some embodiments, one or more monitoring processes may execute within the virtual machine alongside the multi-threaded program. In some embodiments, the one or more monitoring processes may execute separately from the virtual machine on the same set of machines or on a different set of machines. The one or more monitoring processes may periodically initiate a thread dump of the virtual machine. For a particular thread dump, stack traces may be obtained for each thread that is executing on behalf of the (e.g., spawned by) the multi-threaded program at the time the particular thread dump is taken.

At step 704, embodiments receive a stack trace for each thread that was executing during the thread dump. The stack trace for a particular thread may correspond to one or more lines of text that describe the thread's call stack. Each line within the stack trace corresponds to a particular stack frame on the thread's call stack and may describe the code block associated with the stack frame. In some embodiments, the stack frame may include a source code file and line number that points to the code block and a class name and/or method name associated with the code block.

At decision 706, embodiments determine whether another stack trace needs to be analyzed. If not, the flowchart ends at step 716. In particular, once all of the stack traces of a thread dump have been analyzed by the one or more monitoring processes, some embodiments may update intensity statistics encapsulated by one or more objects in memory. For example, member variables of one or more SeasonalTrendInfo objects (e.g., rawMeasure, raw-DeseasonalizedMeasure, smoothedWeekdaySeasonalFactor, and/or smoothedWeekendSeasonalFactor) may be updated based on what sort of stack traces are obtained from the thread dump.

Otherwise, at step 708, embodiments determine whether an existing trace signature represents the sequence of stack frames included by the stack trace. In particular, some embodiments may use, as a production grammar, an existing set of classification signatures that have been built up based on the stack frames received from previous thread dumps to determine whether the sequence of stack frames can be represented by one of the existing signatures. This may involve one or more shift-reduce operations where portions of the stack trace are collapsed into leaf SegmentInfo nodes and the SegmentInfo nodes themselves are collapsed into coalescing nodes. If the shift-reduce operations results in an ordered-tuple that is registered as a classification signature, that classification signature represents the sequence of stack frames included by the stack trace.

At decision 710, if such a trace (i.e., classification) signature exists, the flowchart proceeds to step 714. Otherwise, at step 712, embodiments generate a new trace signature that represents the sequence of stack frames included by the stack trace. In other words, a branch point within a set of stack frames that were thought to be linearly connected has been discovered. Some embodiments may then generate one or more SegmentInfo nodes, modify one or more binary trees, and/or modify one or more ordered tuples to generate a new classification signature that represents the set of (formerly) linearly connected stack frames included by the stack trace. The technique of generating the new classification signature is described in further detail below with respect to FIG. 8.

At step 714, embodiments increment a counter associated with the trace signature before returning to decision 706. In particular certain counters that are members of ThreadClassificationInfo objects, SegmentInfo objects, and/or StackFrameInfo objects (e.g., numOfOccur and/or totalNumOfOccur) may be incremented to track the number of stack traces, stack segments, and stack frames by type as they are received and discovered.

Figure 8:
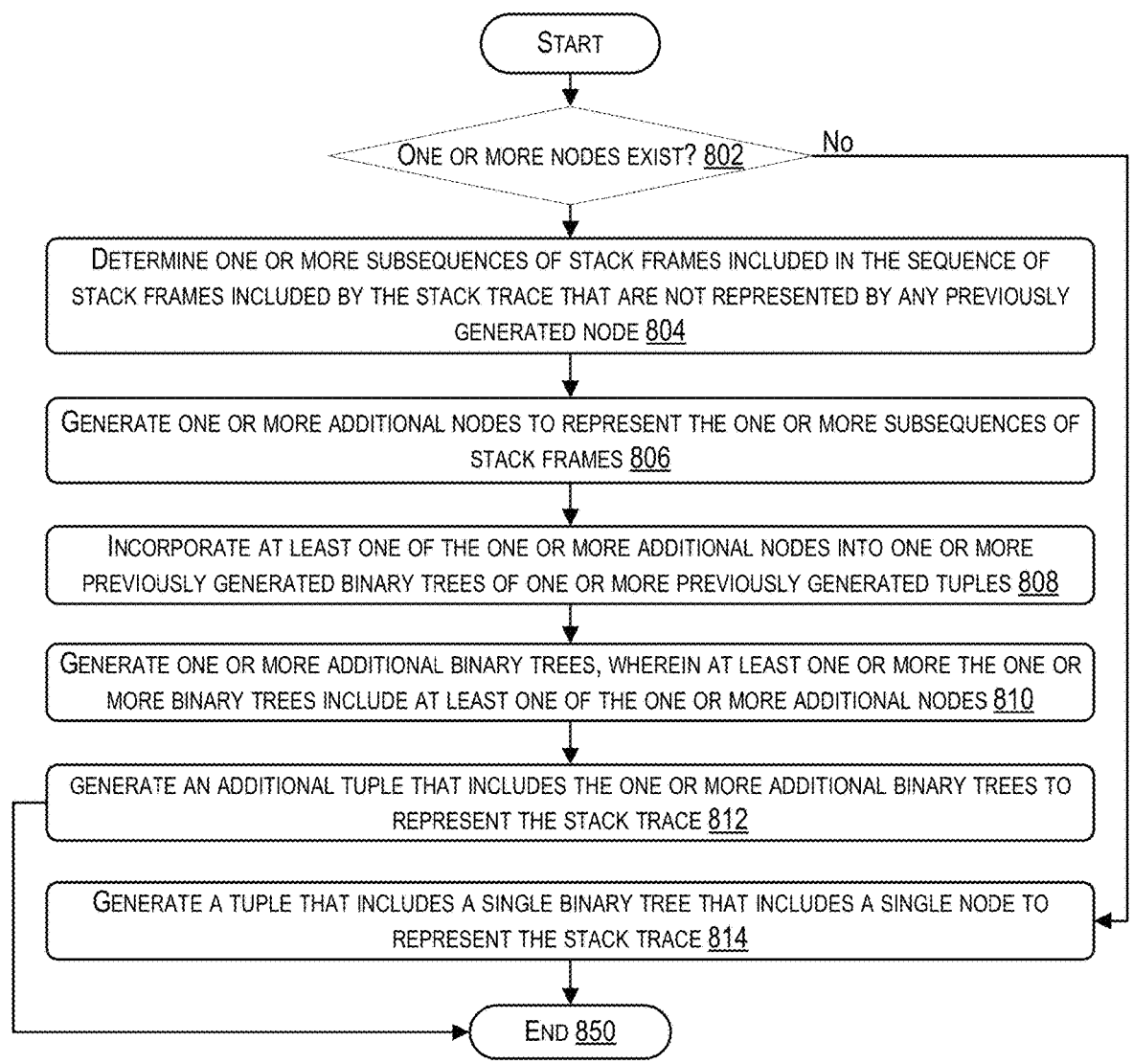
FIG. 8 shows a simplified flowchart that depicts the generation or modification of a thread classification signature in response to detecting a branch point.

FIG. 8 illustrates a flowchart 800 of a process for generating or modifying a thread classification signature in response to detecting a branch point according to some embodiments. In some embodiments, the process depicted in flowchart 800 may be implemented by a computer system with one or more processors (e.g., computer system 1700 of FIG. 17) where the one or more processors can execute the steps based on computer code stored in a computer-readable medium. The steps described in FIG. 8 can be performed in any order and with or without any of the other steps.

Flowchart 800 begins at step 802, where embodiments determine whether one or more SegmentInfo nodes have been previously generated. If so, the flow chart proceeds to step 804. Otherwise, the flowchart proceeds to step 814. Unless the stack trace currently being analyzed is the first stack trace received for the data set, the set of classification signatures will likely contain one or more classification signatures previously generated for prior stack traces, where the classification signatures include SegmentInfo nodes. Because types of stack traces received from the same process are likely to share stack segments with each other, any type of stack trace received for the first time will likely result in the discovery of branch points.

At step 804, embodiments determine one or more subsequences of stack frames included in the sequence of stack frames included by the stack trace that are not represented by any previously generated node. In particular, some embodiments may consult existing classification signatures and SegmentInfo nodes while attempting to compress the sequence of stack frames contained by the stack trace through a series of shift-reduce operations. Any subsequences of stack frames of the sequence that cannot be reduced may be determined to be a new type of stack segment. In this case, some embodiments may determine that a SegmentInfo node that represents the new type of stack segment needs to be generated.

At step 806, embodiments generate one or more additional nodes to represent the one or more subsequences of stack frames. In particular, a new StackFrameInfo object may be generated for each stack frame included in the new type of stack segment. A new SegmentInfo node that corresponds to the new type of stack segment may be generated, where the new SegmentInfo node refers to each of the new StackFrameInfo objects.

At step 808, embodiments incorporate at least one of the one or more additional nodes into one or more previously generated binary trees of one or more previously generated tuples. One or more binary trees of one or more existing classification signatures may be modified and/or expanded to account for the newly discovered branch point. In cases where a stack segment represented by a leaf SegmentInfo node of an existing binary tree is split by the new branch point, that leaf node may become the coalescing node of two new leaf SegmentInfo nodes.

At step 810, embodiments generate one or more additional binary trees, wherein at least one or more the one or more binary trees include at least one of the one or more additional nodes. In many cases, the one or more additional binary trees may be single level trees having a single node. One of the newly generated binary trees may include the new SegmentInfo node generated in step 806.

At step 812, embodiments generate an additional tuple that includes the one or more additional binary trees to represent the stack trace. The additional tuple may correspond to the classification signature that represents the newly discovered type of stack trace. Some tuples may be ordered sets of single-level binary trees that each contain a single node and may look similar to a list of nodes. Other tuples may correspond to a single multi-level binary tree. Still yet other tuples may include single-level binary trees and multi-level binary trees in combination. In general, as more and more types of stack traces are discovered, each subsequent classification signature that is generated may correspond to longer and longer ordered tuples. However, because common types of stack traces are more likely to be encountered first, the longer classification signatures are more likely to represent stack traces that occur less often. This may ensure that a higher percentage of stack traces are compressed into shorter classification signatures. After step 812, the flowchart ends at step 820.

At step 814, embodiments generate a tuple that includes a single binary tree that includes a single node to represent the stack trace. Because no SegmentInfo nodes have been found, the currently analyzed stack trace is likely to be the first. As a result, some embodiments may generate a classification signature that corresponds to a single binary tree with only one SegmentInfo node. After step 814, the flowchart ends at step 820. As different types of stack traces as encountered in the future, the binary tree may be expanded with new SegmentInfo nodes to represent newly encountered branch points.

IV. Heap Usage Measurements at Irregular Time Intervals

Some embodiments may have the control system monitor the time series data for heap allocation (i.e., heap usage) to estimate trends and to forecast future memory usage within a virtual machine. By detecting seasonal trends and forecasting the memory capacity requirements, some embodiments can dynamically reallocate shared system memory among virtual machines, thereby enabling elasticity in resource allocation. Forecasting of capacity requirements may involve the estimation of the heap's growth rate. To ensure sample accuracy, heap allocation measurements may be taken during full garbage collection (GC) cycles, which occur at irregular time intervals. Estimation of heap growth rate may involve division by random time intervals which is complicated by the irregular time intervals that intermittently get arbitrarily close to zero. The noise in growth rate measurement is a ratio of two Gaussian distributions yielding a Cauchy distribution, which can be hard to filter. The mean and standard deviation of the Cauchy distribution are undefined in the sense that a large number of data points do not yield more accurate estimate of the mean and standard deviation than does a single data point. Increasing the pool of samples can increase the likelihood of encountering sample points with a large absolute value corresponding to division by a time close interval.

It should be noted that, unlike heap size measurements whose sampling intervals are irregular due to the irregularity of full GC cycles, the thread intensity measurements can be sampled at regular intervals to avoid time-close intervals. Even so, the same techniques described herein for trending of heap allocation can be applied to seasonal trending and forecasting of thread and stack segment intensity measurements. In some embodiments, the techniques can adjust for variable latencies due to the CPU scheduling of the threads and the interference of the full GC cycles. The techniques can also adjust for the variable sampling intervals due to the variable computation time required to classify the stack segments. In situations where a particular thread or stack segment has not been observed in a thread dump, some embodiments may leave the numOfOccur member variable of the associated ThreadClassificationInfo object or the associated SegmentInfo object as zero, which may indicate that no measurement for the particular thread or stack segment is available. Such embodiments may not update the rawMeasure variable of a SeasonalTrendInfo object. Such embodiments may update the rawMeasure member variable of a SeasonalTrendInfo object only when the numOfOccur member variable of the associated ThreadClassificationInfo object or the associated SegmentInfo object is not zero. Such embodiments may track the number of thread dumps 'N' since the last update of the rawMeasure. The thread intensity measurements may correspond to a series with irregular time intervals.

A Holt-Winter triple exponential filter, published in 1957 and 1960, can be used for seasonal trending and forecasting. C. C. Holt, "Forecasting Trends and Seasonal by Exponentially Weighted Averages," Office of Naval Research Memorandum, no. 52 (1957) is incorporated by reference herein. P. R. Winters, "Forecasting Sales by Exponentially Weighted Moving Averages," Management Science, vol. 6, no. 3, p. 324-342 (1960) is incorporated by reference herein. Wright extended the Holt-Winter formulae in 1986 to support irregular time intervals. D. J. Wright, "Forecasting data published at irregular time intervals using an extension of Holt's method," Management Science, vol. 32, no. 4, pp. 499-510 (1986) is incorporated by reference herein. In 2008, Hanzak proposed an adjustment factor for time-close intervals. T. Hanzak, "Improved Holt Method for Irregular Time Series," WDS'08 Proceedings Part I, pp. 62-67 (2008) is incorporated by reference herein.

The adjustment factor for time close intervals, which is meant to compensate for higher relative intensity of noise due to a random time-close interval in the rate estimate, can inadvertently dampen the rate of change estimates if the time interval decreases monotonically during a congestion caused by memory leaks or deadlocks. Non-linear or polynomial time complexity of full GC algorithms can result in decreasing thread runtime intervals as congestion worsens. In case of memory leaks, as the time interval decreases, the run time can decrease but the measurement time can increase because the virtual machine can be frozen longer due to full GCs being performed more often. If the virtual machine is frozen during a full GC, new requests can be queued up outside the virtual machine. The backlog can accelerate the rate of change of the heap usage during the subsequent run time. In some embodiments, Hanzak's adjustment for time-close intervals is used for trending and forecasting of heap allocation and to track the accelerating heap growth rate.

In an embodiment of the invention, Holt-Winter triple exponential filter can be applied for seasonal trending and forecasting of heap usage to efficiently achieve elasticity in memory allocation. The standard Holt-Winter triple exponential filter, which can be applied to demand forecasting from regular time series, can be specially adjusted to work for the random time intervals with irregular time-close intervals. Embodiments of the invention can apply the Wright formula for irregular time intervals and Hanzak's adjustment for time-close intervals for trending and forecasting of heap allocation. A non-trivial selection of a structure of the filters suitable for the irregular time intervals resulting from full GCs can be performed. The structure of the Holt-Winter-Wright-Hanzak filters can be derived from first principles to systematically devise the adaptations to match the time series generated by full GC cycles.

In some embodiments, formulae for exponential moving averages are applied to smooth out time-series data, locally linear trend, seasonal trend, error residual of forecast, and absolute deviation of forecast for monitoring and forecasting of resource utilization measures such as heap memory usage and thread intensity. In some embodiments, the formulae can be based on Brown's exponential filter proposed in 1956, Holt's double exponential filter proposed in 1957, Winters' triple exponential filter proposed in 1960, Wright's extension for irregular time intervals proposed in 1986, Hanzak's adjustment factor for time-close intervals proposed in 2008, and outlier detection and clipping. The following publications are included by reference herein: R. G. Brown, "Exponential Smoothing for Predicting Demand," Cambridge, Arthur D. Little Inc. (1956), p. 15; C. C. Holt, "Forecasting Trends and Seasonal by Exponentially Weighted Averages," Office of Naval Research Memorandum, no. 52, (1957); P. R. Winters, "Forecasting Sales by Exponentially Weighted Moving Averages," Management Science, vol. 6, no. 3, p. 324-342, (1960); D. J. Wright, "Forecasting data published at irregular time intervals using an extension of Holt's method," Management Science, vol. 32, no. 4, pp. 499-510 (1986); T. Hanzak, "Improved Holt Method for Irregular Time Series," WDS'08 Proceedings Part I, pp. 62-67 (2008); and S. Maung, S. W. Butler and S. A. Henck, "Method and Apparatus for process Endpoint Prediction based on Actual Thickness Measurements," U.S. Pat. No. 5,503,707 (1996).

V. Correlating Thread Intensity and Heap Usage

Various embodiments provide techniques for identifying heap-hoarding stack traces (i.e., classes of threads) within multi-threaded applications by correlating trends between intensity statistics of various classes of threads spawned by the application and heap usage statistics. In doing so, some embodiments may identify, based on heap usage statistics, seasons where high heap usage tends to be high (i.e., high heap usage seasons) within a time period during which one or more multi-threaded applications are executing within a software execution environment. As explained above, some embodiments may then identify and collect intensity statistics for multiple classes of threads through the analysis of thread dumps obtained from the software execution environment in the same time period of the high heap usage seasons. Some embodiments may then identify "heap-hoarding" classes of threads (i.e., heap hoarding stack traces) from amongst the identified classes of threads by ranking the classes of threads by the degree of correlation between their intensity statistics and the high heap usage trends.

Some embodiments may refer to such classes of threads as heap-hoarding because there is a high probability that the code being executed by such threads is inefficient in terms of heap memory usage. Stated another way, erroneously written code and/or unoptimized code executed by these threads may cause the threads to hoard a large amount of heap memory, thereby contributing significantly to the high heap usage trend.

It should be noted that such memory hotspots are important from the perspective of operating cloud-based services over long periods of time in a production environment. Accordingly, by enabling the continuous detection and mitigation of such hotspots, some embodiments may directly impact the operational efficiency of the cloud services. It should also be noted that such embodiments may be advantageous over using memory profiler tools to profile such applications because such tools may add too much overhead to the application. Accordingly, memory profiler tools may not be practical for continuously profiling an application that is executing in a production environment.

A. Inefficient Heap Usage in Code

One common cause of inefficient memory usage is due to local variables defined in the stack frames of a thread. In general, when a running thread instantiates an object, that object occupies heap memory until the number of stack frames that refer (directly or indirectly) to the object falls to zero, at which point the heap memory is freed at the next garbage collection. Accordingly, local variables that references large objects from stack frames that remain active over a long period of time may inadvertently contribute significantly to heap memory usage because they don't allow the objects to be garbage collected.

Some embodiments suppose that a fraction 'p' of the total heap usage 'G' bytes can be attributed to a class of threads 'C'. Further, some embodiments may also suppose that the average heap usage among this class of threads 'C' (i.e., heap usage per thread) is 'M' bytes. In this instance, let 'Tc' denote the expected number of threads of the class of threads 'C'. The following relation gives 'Tc', which is defined as the thread intensity in the statistical model:

$$T_C = \frac{pG}{M}$$

In response to identifying heap-hoarding classes of threads, certain embodiments may report (e.g., via a notification or an alert) the classes of threads to developers, performance engineers, and other relevant personnel. As a result, code associated with such types of threads may be subject to detailed code review and code profiling. In some cases, certain associated stack frames may be inspected. For example, an investigation may involve taking a heap dump during the time when the heap usage is near a seasonal peak to inspect the stack frames included in the stack traces of heap-hoarding threads. The stack frames can contain the local variables referencing the objects contributing to the high heap usage (e.g., objects occupying large amounts of heap memory). This kind of code inspection and optimization can be done by visual code review, automatic code review, profiling of the identified threads, just-in-time compiler optimization, dynamic byte-code injection, or combinations of these techniques. In some embodiments, heap-hoarding classes of threads may be reported to other automatic code optimization tools to leverage their code optimization functionalities.

Some embodiments may automatically redesign or rewrite application code to make its usage of memory more efficient. For example, some embodiments can automatically rewrite code so that local variables release large objects as soon as possible without changing the behavior or correctness of the application. In some cases, this may involve deep analysis of the code paths involved in the heap-hoarding threads.

For example, consider the following code:
fileOS.write(buffer.toString( ).getBytes( ));

Some embodiments may determine that the above code is inefficient with respect to memory usage because three objects: buffer, buffer.toString( ), and buffer.toString( ).getBytes( ), are held by local variables in a stack frame of a heap-hoarding thread. In particular, the local variables prevent the three objects from being garbage collected while the thread is blocking in a file system call.

Some embodiments can modify the code as shown below so that at least two objects: buffer and buffer.toString( ), can be garbage collected while the thread is blocking in a file system call:

String temp1=buffer.toString( );
buffer=new StringBuffer( ); // allow garbage collection of the old buffer
byte[ ] temp2=temp1.getBytes( );
temp1=null;// allow garbage collection of the string
fileOS.write(temp2);// this is a blocking call
temp2=null;// allow garbage collection of the bytes array Some embodiments can use non-intrusive ways to inspect the stack frames of the heap-hoarding stack traces.

B. Initializing Seasonal Factors for Weekday and Weekend Periods

To identify the heap-hoarding stack traces, some embodiments may (1) identify the high heap usage seasons by estimating the seasonal trends of heap usage statistics of the execution environment and (2) estimate, for each of one or more classes of threads, the seasonal trends of the thread intensity statistics of the class of threads. Some techniques for determining the seasonal trends of the heap usage statistics and the seasonal trends of the thread intensity statistics, for regular or irregular time intervals, are disclosed in the patent application Ser. Nos. 14/109,578, 14/109,546, and 14/705,304, which are herein incorporated by reference for all purposes.

To determine a seasonal trend of a statistic, the period and intervals to which the seasonal trend is mapped may be defined. In particular, a period can be partitioned into a plurality of non-overlapping intervals. Each interval of the period can be associated with a seasonal index. For example, if the period is a day and the interval is an hour, then there should be 24 seasonal indices to cover the period. As another example, if the period is a year and the interval is a month, there should be 12 seasonal indices.

Some embodiments can model the weekdays, weekends, and holidays as separate periods. If the weekday and weekend periods are separated, then there can be 5 cycles of the weekday periods interleaved with 1 cycle of the weekend period such that after processing 5 consecutive weekday periods, a single weekend period is processed. Accordingly, the frequency of the consecutive weekday periods will be one weekday period every 24 hours while the frequency of the weekend period will be one weekend period every 7 days. In embodiments where the individual holidays (e.g., the Christmas and New Year Holidays) are modeled as separate periods, the frequency of a particular holiday period is once a year.

A seasonal index can be a multiplicative seasonal factor or an additive seasonal term that is applied to the interval associated with the seasonal index. For example, in an embodiment that represents seasonal indices using multiplicative seasonal factors, if the interval '9-10 AM' is associated with a seasonal factor of 1.3, then any measurement sampled during the 9-10 AM interval can be adjusted higher by 30% (i.e., multiplied by 1.3). In embodiments where seasonal indices are represented by additive seasonal terms, the additive seasonal terms are added to measurements.

A season classifies a set of intervals by some criteria. For example, given a period of one year, the 12 intervals January, February, March, April, May, June, July, August, September, October, November, and December can be classified into four northern meteorological seasons as follows:

December, January, and February are classified as the winter season.

March, April, and May are classified as the spring season.

June, July, and August are classified as the summer season.

September, October, and November are classified as the fall season.

Some embodiments may partition weekday periods into 96 15-minute intervals. In this regard, 96 seasonal indices are derived, where each of the 96 weekday seasonal indices (i.e., weekday factors) maps to a different one of the 96 weekday intervals. Similarly, some embodiments may partition weekend periods into 192 15-minute intervals, thereby deriving 192 seasonal indices with each of the 192 weekend seasonal indices (i.e., weekend factors) mapping to a different one of the 192 weekend intervals.

In order to separate out seasonal patterns of the weekday periods and those of the weekend periods, certain embodiments may apply multi-period trending filters to the weekday periods separately from applying such filters to the weekend periods. Some embodiments may then renormalize the weekday factors and the weekend factors so that a seasonal factor of 1 represents a common reference level for both the weekday periods and the weekend periods. As a result, a seasonal factor that is larger than 1 may represent a higher than average heap usage during an interval to which the seasonal factor applies. Meanwhile, another seasonal factor that is smaller than 1 may represent a lower than average heap usage during another interval to which the other seasonal factor applies.

In some embodiments, techniques for multi-period trending can be extended to separate out holidays (e.g., Labor Day, Christmas Day, New Year's Day, etc.) as separate periods, where holidays periods repeat with a frequency of once every 12 months. Meanwhile, the weekday period repeats with a frequency of once every 24 hours and the weekend period repeats with a frequency of once every 7 days. In such embodiments, the seasonal factors for holiday periods, the seasonal factors for the weekday periods, and the seasonal factors for the weekend periods may all be renormalized together so that a seasonal factor of 1 represents a common reference level for weekday periods, weekend periods, and holiday periods.

Given a period (e.g., a weekday period, a weekend period, or a holiday/one-year period, etc.), let P denote the number of cycles of the period covered by a given measurement dataset (e.g., a time series of heap usage measurements spanning a particular period of time) and let K denote the number of intervals within the number of periods covered by the given data set. If L denotes the number of seasonal indices in a period, then K=P*L. For example, if there are at least 3 years of data within the dataset, a period corresponds to a year, and an interval corresponds to a month, then the number of available cycles P of the period is 3 and the number of available monthly intervals is 36.

Some embodiments may calculate the average heap usage for each interval of the period based on data spanning multiple cycles of the period. In particular, some embodiments may enumerate the intervals from 0 to (K−1) and calculate an average heap usage for each of the enumerated intervals $\bar{x}_k$ using the following formula:

$$\bar{x}_k = \frac{1}{N_k} \sum_{i=1}^{N_k} x_{t_i},$$

k=0, 1, . . . , K−1; $N_k$ is the number of samples in the interval k;

and $t_i$ is the time of the sample number i in the interval k

Some embodiments may also calculate the average heap usage of each cycle of the period based on the data spanning multiple cycles of the period. In particular, some embodiments may enumerate the cycles of the period from 0 to (P−1) and calculate an average heap usage for each of the enumerated cycles $D_p$ of the period using the following formula:

$$D_p = \frac{1}{N_p} \sum_{i=1}^{N_p} x_{t_i}, p = 0, 1, \ldots, P-1;$$

$N_p$ is the number of samples in the cycle p of the period; and $t_i$ is the time of the sample number i in the cycle p of the period To initialize the seasonal factors of a period, some embodiments may compute the seasonal factors for each of the seasonal indices $\bar{S}_l$ in the period using the following formula:

$$\bar{S}_l = \frac{1}{P}(\bar{x}_l/D_0 + \bar{x}_{l+L}/D_1 + \bar{x}_{l+2*L}/D_m + \ldots + \bar{x}_{l+(P-1)*L}/D_{P-1}),$$

$$l = 0, 1, \ldots, L-1$$

In particular, a seasonal factor for a particular interval may be equal to the ratio of the average heap usage of that interval across the entire dataset (calculated by averaging the average heap usage of all of the same intervals (e.g., all 9-10 AM intervals) in the entire dataset (e.g., a dataset that spans an entire week) and the average heap usage of the period across the entire dataset.

C. Renormalization

As mentioned above, some embodiments may renormalize the weekday seasonal factors and the weekend seasonal factors so that a seasonal factor of '1' represents a common reference level for both weekday periods and weekend periods.

In general, certain embodiments may perform renormalization by computing a weighted average of seasonal factors across all periods and dividing each of the seasonal factors by the weighted average. Consider the following example involving the seasonal indices of multiple periods of differing lengths, where each period is partitioned into 15 minute intervals:

seasonal indices for a weekday: $D_i$, i=1, 2, . . . 96
seasonal indices for a weekend: $E_i$, i=1, 2, . . . , 192
seasonal indices for 10 individual holidays: $H_{k,i}$, i=1, 2, . . . , 96; k=1, 2, . . . 10

Suppose that in a particular year, there are 253 weekdays (excluding holidays), 50.5 weekends, and 10 holidays, where 253+50.5*2+10=364 days. In this example, some embodiments may use the following formula to calculate the weighted average 'A' of the seasonal factors, where the weights are proportional to the number of cycles of each period (e.g., the weekday period, the weekend period, and 10 individual holiday periods) in a year.

$$A = \frac{1}{364}\left(253\sum_{i=1}^{86} D_i + 50.5\sum_{i=1}^{192} E_i + 10\sum_{k=1}^{10}\sum_{i=1}^{86} H_{k,i}\right)$$

Some embodiments can derive the new renormalized seasonal factors for each period by dividing each seasonal factor $D_i$, $E_i$, and $H_{k,i}$ by A.

Returning to the steps for identifying the heap-hoarding stack traces, after initializing the seasonal indices $\bar{S}_l$ using the above formulae, some embodiments can renormalize the weekday and weekend factors by dividing each weekend factor $\bar{B}_k$ and each weekday factor $\bar{C}_l$ by a normalization factor as follows:

$$\frac{1}{K+5L}\left(\sum_{k=0}^{K-1} \bar{B}_k + 5\sum_{l=0}^{L-1} \bar{C}_l\right)$$

After renormalization of the weekday and weekend seasonal factors, a seasonal factor of 1 should represent a common reference level for both weekday factors and weekend factors.

D. Smooth-Spline Fitting

As mentioned above, some embodiments may fit a smooth-spline across multiple periods to provide smooth transitions between the cycles of a period (e.g., between two weekday periods) or between the cycles of two adjacent periods (e.g., between a weekday period and a weekend). In particular, fitting a spline can involve concatenating the seasonal indices of one or more periods to smooth transitions between the periods.

In general, when certain embodiments (e.g., a filter) reach the end of the cycle of a period $A_i$ and begin a new cycle of the period $A_i$, such as when repeating the weekday cycles at the transition from a Monday to a Tuesday, a Tuesday to a Wednesday, a Wednesday to a Thursday, and a Thursday to a Friday, such embodiments can concatenate three sequences of the seasonal indices $A_i$ and fit the smooth-spline across the whole sequence. Some embodiments may then take the middle segment of the smoothed sequence to represent the new smoothed seasonal indices $A_i$.

When certain embodiments (e.g., a filter) reach the end of the cycle of a period $A_i$ and begin a new cycle of an adjacent period $B_i$, such as when transitioning from a Friday to a Saturday, some embodiments may concatenate one sequence of the seasonal indices $A_i$, one sequence of the seasonal indices $B_i$, and one sequence of the seasonal indices $C_i$ of a period that follows the period $B_i$, and fit the smooth-spline across the whole sequence. Some embodiments may then take the middle segment of the smoothed sequence to represent the new smoothed seasonal indices $B_i$. Some embodiments may also take the first segment of the smoothed sequence to represent the smoothed seasonal indices $A_i$.

When certain embodiments (e.g., a filter) reach the end of the cycle of a period $B_i$ and begin a new cycle of an adjacent period $C_i$, such as when transitioning from a Sunday to a Monday, some embodiments can concatenate one sequence of the seasonal indices $A_i$ of a period that precedes the period $B_i$, one sequence of the seasonal indices $B_i$, and one sequence of the seasonal indices $C_i$, and fit the smooth-spline across the whole sequence. Some embodiments may then take the middle segment of the smoothed sequence to represent the new smoothed seasonal indices $B_i$. Some embodiments may also take the third segment of the smoothed sequence to represent the new smoothed seasonal indices $C_i$.

With regards to cloud services, load cycles during weekends and holidays are often different from those during weekdays. Conventional seasonal trending solutions may typically represent only one period of seasonal indices. In order to separate the seasonal indices of weekends from the seasonal indices of regular weekdays, such conventional solutions may depend on the range of a period being extended to an entire week or an entire month. Additionally, such conventional solutions may handle holidays separately.

Returning to the steps for identifying the heap-hoarding stack traces, to smooth the weekday seasonal factors, some embodiments can compose an array of seasonal factors by concatenating three sequences of the weekday factors. For example, some embodiments may generate the array by executing the following code in the R programming language:

factors←c(smoothedWeekdaySeasonalFactor,
    smoothedWeekdaySeasonalFactor,
    smoothedWeekdaySeasonalFactor)

Next, some embodiments may apply a spline to smooth out the array of the weekday factors. For example, some embodiments may invoke the R smooth.spline function with a smoothing parameter of 0.3 to smooth out the factors:

extendedWeekdayIndices←1:(3*96)
    f←smooth.spline(extendedWeekdayIndices, factors, spar=0.3)

Some embodiments may then designate the middle sequence (i.e., the middle 96 weekday factors) within the array as the smoothed weekday factors. For example, some embodiments may obtain the smoothed weekday factors by executing the following code in the R programming language:

sandwichWeekdayIndices←(96+1):(96*2)
    smoothedWeekdaySeasonalFactor←predict(f, sandwichWeekdayIndices)$y In a fashion similar to smoothing the weekday factors, some embodiments may apply a spline to smooth the weekend factors. In particular, some embodiments may compose an array of seasonal factors by concatenating a sequence of weekend factors between two sequences of weekday factors. For example, some embodiments may generate the array by executing the following code in the R programming language:

factors←c(smoothedWeekdaySeasonalFactor,
    smoothedWeekendSeasonalFactor,
    smoothedWeekdaySeasonalFactor)

Next, some embodiments may apply a spline to smooth out the array of the weekday and weekend factors. For example, some embodiments may invoke the R smooth.spline function with a smoothing parameter of 0.3 to smooth out the factors:

extendedWeekendIndices←1:(2*96+192)
    f←smooth.spline(extendedWeekendIndices, factors, spar=0.3)

Some embodiments may then designate the middle sequence (i.e., the middle 192 seasonal factors within the array, which are weekend factors) within the array as the smoothed weekend factors. For example, some embodiments may obtain the smoothed weekend factors by executing the following code in the R programming language:

sandwichWeekendIndices←(96+1) (96+192)
    smoothedWeekendSeasonalFactor←predict(f, sandwichWeekendIndices)$y It should be noted that some embodiments may represent the 96 weekday seasonal indices and 192 weekend seasonal indices separately in order to separate seasonal patterns observed during weekdays from those observed during weekends. In some embodiments, sequentially filtering time-series of heap usage statistics can involve five sets of exponential filters, including one for heap usage measurements, one for seasonal factors, one for the linear trend, one for the acceleration trend, and one for the residual.

As mentioned above, to ensure sample accuracy, heap allocation measurements may be taken during full garbage collection (GC) cycles that occur at irregular time intervals. In situations where heap usage is especially high, sampling intervals may become arbitrarily close to zero due to constant garbage collecting. Because forecasting involves estimation of the rate of change, if the irregular time intervals get arbitrarily close to zero, the rate of change may become a random variable of Cauchy distribution, whose mean and standard deviation are undefined. Thus, some embodiments may employ the adaptations of Holt's double exponential filter, Winters' triple exponential filter, Wright's extension for irregular time intervals, Hanzak's adjustment factor for time-close intervals, and outlier detection and clipping with adaptive scaling of outlier cutoff to overcome the Cauchy distribution problem for determining the seasonal trends of statistics determined in association with full GCs. In some embodiments, the five sets of exponential filters can be sequentially applied to the times-series to estimate the weekday factors and weekend factors.

When certain embodiments (e.g., a filter) reach the end of a processing cycle for the weekday and weekend period, before processing the next cycle of the period or transitioning to a different period (e.g., transition from a weekday period to a weekend period), such embodiments can divide each weekend factor $\overline{B}_k$ and weekday factor $\overline{C}_l$ by the normalization factor as follows:

$$\frac{1}{K+5L}\left(\sum_{k=0}^{K-1}\overline{B}_k + 5\sum_{l=0}^{L-1}\overline{C}_l\right)$$

After the end of each period, some embodiments may apply a spline to smooth the seasonal factors. For instance, when reaching the end of a weekday period that precedes another weekday period (i.e., when transitioning from a Monday to a Tuesday, a Tuesday to a Wednesday, a Wednesday to a Thursday, or a Thursday to a Friday), some embodiments can compose an array of seasonal factors by concatenating three sequences of the weekday factors. For example, some embodiments may generate the array by executing the following code in the R programming language:

factors←c(smoothedWeekdaySeasonalFactor,
    smoothedWeekdaySeasonalFactor,
    smoothedWeekdaySeasonalFactor)

Next, some embodiments may apply a spline to smooth out the array of the weekday factors. For example, some embodiments may invoke the R smooth.spline function with a smoothing parameter of 0.3 to smooth out the factors:

extendedWeekdayIndices←1:(3*96)
    f←smooth.spline(extendedWeekdayIndices, factors, spar=0.3)

Some embodiments may then designate the middle sequence (i.e., the middle 96 weekday factors) within the array as the smoothed weekday factors. For example, some embodiments may obtain the smoothed weekday factors by executing the following code in the R programming language:

sandwichWeekdayIndices←(96+1):(96*2)
    smoothedWeekdaySeasonalFactor←predict(f, sandwichWeekdayIndices)$y In a different instance, when reaching the end of a weekday period that precedes a weekend period (i.e. when transitioning from a Friday to a Saturday), some embodiments can compose an array of seasonal factors by concatenating a sequence of weekend seasonal factors between two sequences of weekday seasonal factors. For example, some embodiments may generate the array by executing the following code in the R programming language:

factors←c(smoothedWeekdaySeasonalFactor,
    smoothedWeekendSeasonalFactor,
    smoothedWeekdaySeasonalFactor)

Next, some embodiments may apply a spline to smooth out the array of the weekday and weekend factors. For example, some embodiments may invoke the R smooth.spline function with a smoothing parameter of 0.3 to smooth out the factors:

extendedWeekendIndices←1:(2*96+192)
    f←smooth.spline(extendedWeekendIndices, factors, spar=0.3)

Some embodiments may then designate the left sequence (i.e., the first 96 seasonal factors within the array, which are weekday factors) within the array as the smoothed weekday factors. For example, some embodiments may obtain the smoothed weekday factors by executing the following code in the R programming language:

leftsideWeekendIndices←1:96
    smoothedWeekdaySeasonalFactor←predict(f, leftsideWeekendIndices)$y In a different instance, when reaching the end of a weekend period (i.e., transitioning from a Sunday to a Monday), some embodiments can compose an array of seasonal factors by concatenating a sequence of weekend seasonal factors between two sequences of weekday seasonal factors. For example, some embodiments may generate the array by executing the following code in the R programming language:

factors←c(smoothedWeekdaySeasonalFactor,
    smoothedWeekendSeasonalFactor,
    smoothedWeekdaySeasonalFactor)

Next, some embodiments may apply a spline to smooth out the array of the weekday and weekend factors. For example, some embodiments may invoke the R smooth.spline function with a smoothing parameter of 0.3 to smooth out the factors:

extendedWeekendIndices←1:(2*96+192)
    f←smooth.spline(extendedWeekendIndices, factors, spar=0.3)

Some embodiments may then designate the middle sequence (i.e., the middle 192 seasonal factors within the array, which are weekend factors) within the array as the smoothed weekend factors. For example, some embodiments may obtain the smoothed weekend factors by executing the following code in the R programming language:

sandwichWeekendIndices←(96+1):(96+192)
    smoothedWeekendSeasonalFactor←predict(f, sandwichWeekendIndices)$y Some embodiments may also designate the right sequence (i.e., the last 96 seasonal factors within the array, which are weekday factors) within the array as the smoothed weekday factors. For example, some embodiments may obtain the smoothed weekday factors by executing the following code in the R programming language:

rightsideWeekendIndices←(96+192+1):(2*96+192)
    smoothedWeekdaySeasonalFactor←predict(f, rightsideWeekendIndices)$y It should be noted that, some embodiments may execute the renormalization and the smooth-spline fitting described above each time the sequential filters reach either (1) the end of a cycle of a period and begin a new cycle of the same period (e.g., the sequential filters reach the end of a Monday) or (2) the end of a cycle of a period and begin a new cycle of an adjacent period (e.g., the sequential filters reach the end of a Friday).

E. Testing for Seasonal Cycles

Some embodiments can test the existence of seasonal cycles for one or more candidate period of a data set to determine whether a separate sequence of seasonal indices for the period should be represented. In general, to determine whether a data set exhibits a seasonal cycle of a particular period, some embodiments may perform the following steps.

Let Q denote the number of seasonal indices in a period, P denote the number of available cycles of a period, and K denote the number of available intervals across the cycles of a period, where K=P*Q.

Some embodiments can calculate the average measure in each interval of the cycles of a period. To do so, some embodiments may enumerate the intervals from 0 to (K−1) and calculate an average measure of each interval of the period using the formula below:

$$\bar{x}_k = \frac{1}{N_k} \sum_{i=1}^{N_k} x_{t_i},$$

k=0, 1, . . . , K−1; $N_k$ is the number of samples in the interval k;

and $t_i$ is the time of the sample number i in the interval k

Some embodiments can then calculate the average measure of each cycle of the period. To do so, some embodiments may enumerate the cycles of the period from 0 to (P-1) and calculate an average measure of each cycle of the period using the formula below:

$$D_p = \frac{1}{N_p} \sum_{i=1}^{N_p} x_{t_i}, p = 0, 1, \ldots, P-1;$$

$N_p$ is the number of samples in the cycle p of the period; and $t_i$ is the time of the sample number i in the cycle p of the period Some embodiments can then compute the sequence $\overline{Y}_p = \langle \overline{Y}_{p,0}, \overline{Y}_{p,1}, \ldots, \overline{Y}_{p,Q-1} \rangle$ of seasonal indices for each cycle p of the period using the formula below:

$$\overline{Y}_{p,j} = \frac{\overline{x}_j}{D_p}, j = k \text{ modulo } Q; k = 0, 1, \ldots, K-1$$

$$p = 0, 1, \ldots, P-1$$

Some embodiments can then apply null hypothesis testing to detect whether there are seasonal cycles in the period. In this regard, the null hypothesis that is to be tested may correspond to the assumption that the correlation coefficient $r_{u,v}$ between the seasonal indices of a most recent cycle 'u' and the seasonal indices of a preceding cycle 'v' is zero. In particular, some embodiments may determine the correlation coefficient $r_{u,v}$ using the following formulae below:

$$\text{Mean}(\overline{Y}_p) = \frac{1}{Q} \sum_{j=0}^{Q-1} \overline{Y}_{p,j}$$

$$\text{Variance}(\overline{Y}_p) = \frac{1}{11} \sum_{j=0}^{Q-1} (\overline{Y}_{p,j} - \text{Mean}(\overline{Y}_p))^2$$

$$r_{u,v} = \frac{\sum_{j=0}^{Q-1} (\overline{Y}_{u,j} - \text{Mean}(\overline{Y}_u))(\overline{Y}_{v,j} - \text{Mean}(\overline{Y}_v))}{11 \sqrt{\text{Variacle}(\overline{Y}_u)\text{Variacle}(\overline{Y}_v)}}$$

Some embodiments may employ various techniques to determine whether the correlation coefficient $r_{u,v}$ is large enough to indicate, above a level of significance, that there is a common seasonal cycle between the cycles 'u' and 'v'. For example, some embodiments may employ the Student-t test, the permutation test, or the Fisher transformation.

To test the hypothesis, some embodiments may define one or more test statistics, which may be a function of the parameter. In this case, the correlation coefficient $r_{u,v}$ is to be tested. The following test statistics t has Student's t-distribution, with 'n-2' degrees of freedom and is a function of $r_{u,v}$. Some embodiments define the null hypothesis, $r_{u,v}=0$, which assumes that the seasonal indices are not correlated between the cycles of a period. Some embodiments may search for evidence to reject the null hypothesis (i.e., $r_{u,v}=0$) by accepting an alternative hypothesis.

$$t = r_{u,v} \sqrt{\frac{n-2}{1-r_{u,v}^2}}$$

Let F(t) denote the probability distribution. Given the level of significance of 0.1, let $t_{0.9, (n-2)}$ denote the value of the random variable t such that F(t)=0.9. The alternative hypothesis is the one-sided condition:

$$r_{u,v} \sqrt{\frac{n-2}{1-r_{u,v}^2}} > t_{0.9,(n-2)}$$

If this condition is true, the alternative hypothesis is accepted, which indicates that there is a common seasonal cycle between cycles years 'u' and V. If there are common seasonal cycles between the most recent cycle and the preceding cycles, then some embodiments may proceed to compute the seasonal factors for each of the seasonal indices of the cycle. Some embodiments apply the above formula to detect the existence of an annual seasonal cycle of the heap usage by the software execution environment, as described below.

F. Detecting Annual Seasonal Cycle for Heap Usage

When analyzing multiple years of heap usage statistics of a software execution environment, some embodiments may detect more than one seasonal trend at different time scales. For example, such embodiments may detect, a multi-year time-series of heap usage statistics, a yearly seasonal trend and a daily seasonal trend, which are both superimposed onto a multi-seasonal trend. Thus, some embodiments may adopt an appropriate time scale to analyze the yearly seasonal trend, where the time scale has a period correspond to 1 year and an interval correspond to 1 month. As such, the year-long period may be partitioned into 12 month-long intervals.

To determine whether the data set exhibits an annual seasonal cycle, some embodiments may first determine multiplicative factors for the monthly indices in the data set.

In a particular instance, let P denote the number of available years (i.e., the number of cycles of the one-year period) in the data set. Additionally, let Q denote the number of available months (i.e., the number of intervals within the number of cycles) in the data set. Accordingly, Q=12*P. Let K denote the number of available weekdays or weekends in the data set. Let the index k range from 0 to (K-1) to represent an enumeration of the available weekdays or weekends. Let $N_k$ denote the number of samples in the $k^{th}$ weekday or weekend. Using the following formula, some embodiments can apply the following formula to calculate the average heap usage of each weekday or weekend in the dataset:

$$\overline{x}_k = \frac{1}{N_k} \sum_{i=1}^{N_k} x_{t_i},$$

k=0, 1, . . . , K-1 and $N_k$ is the number of samples in the day k

Some embodiments can define a function H, H:(Year× Integer)→Index, which maps an ordered pair including the index of the year and an integer that corresponds to the index of a weekday or weekend within that year. Using the following formula, some embodiments may then calculate the average heap usage of each year from the average heap usage of the weekdays or weekends within that year:

$$\overline{Z}_p = \frac{1}{N_p} \sum_{i=1}^{N_p} \overline{x}_{H(p,i)}, \, p = 0, 1, \ldots, P-1;$$

$N_p$ is the number of weekdays in the cycle p of the one year period;

and H(p,i) is the index of the $i^{th}$ weekday in the cycle p of the one year period.

Some embodiments define a function G, G:(Month× Integer)→Index, which maps an ordered pair including the index of the month and an integer that corresponds to the index of a weekday or a weekend within that month. Using the following formula, some embodiments may calculate the average heap usage of each monthly interval of the period from the average heap usage of the weekdays or weekends within that month:

$$\overline{Y}_{p,m} = \frac{1}{M_m \overline{Z}_p} \sum_{i=1}^{M_m} \overline{x}_{G(m,i)}, \, m = 0, 1, \ldots, Q-1;$$

$M_m$ is the number of weekdays in the month m;
G(m,i) is the index of the $i^{th}$ weekday in the month m;
and p is the index of the cycle of the year period.

In particular, the above formula produces $\overline{Y}_p = <\overline{Y}_{p,0}, \overline{Y}_{p,1}, \ldots \overline{Y}_{p,Q}>$, which correspond to 12 monthly averages for each cycle of the year-long period p. The average heap usage for a month can be divided by the yearly average heap usage to obtain a multiplicative factor for the monthly indice that corresponds to that month. In such embodiments, if the multiplicative factor for a particular month is determined to be greater than 1, then the heap usage in that month is above average. On the other hand, if the multiplicative factor for a particular month is determined to be less than 1, then the heap usage in that month is below average.

After determining the multiplicative factors for the monthly indices, some embodiments can apply null hypothesis testing to detect whether there are annual seasonal cycles. In this regard, the null hypothesis that is to be tested may correspond to the assumption that the correlation coefficient $r_{u,v}$ between the monthly indices of the most recent year 'u' and the monthly indices of a preceding year 'v' is zero. In particular, some embodiments may determine the correlation coefficient $r_{u,v}$ using the following formulae below:

$$\text{Mean}(\overline{Y}_p) = \frac{1}{12} \sum_{j=1}^{12} \overline{Y}_{p,j}$$

$$\text{Variance}(\overline{Y}_p) = \frac{1}{11} \sum_{j=1}^{12} (\overline{Y}_{p,j} - \text{Mean}(\overline{Y}_p))^2$$

$$r_{u,v} = \frac{\sum_{j=1}^{12} (\overline{Y}_{u,j} - \text{Mean}(\overline{Y}_u))(\overline{Y}_{v,j} - \text{Mean}(\overline{Y}_v))}{11 \sqrt{\text{Variacle}(\overline{Y}_u) \text{Variacle}(\overline{Y}_v)}}$$

Some embodiments may employ various techniques to determine whether the correlation coefficient $r_{u,v}$ is large enough to indicate, above a level of significance, that there is a common seasonal cycle between the years 'u' and 'v'.

For example, some embodiments may employ the Student-t test, the permutation test, or the Fisher transformation.

The following test statistics t has Student's t-distribution, with 'n−2' degrees of freedom, if the null hypothesis is true (i.e., $r_{u,v}=0$).

$$t = r_{u,v} \sqrt{\frac{n-2}{1-r_{u,v}^2}}$$

Let F(t) denote the probability distribution. Given the level of significance of 0.1, let $t_{0.9, (n-2)}$ denote the value of the random variable t such that F(t)=0.9. The alternative hypothesis is the one-sided condition:

$$r_{u,v} \sqrt{\frac{n-2}{1-r_{u,v}^2}} > t_{0.9,(n-2)}$$

The condition that accepts the alternative hypothesis indicates that there is a common seasonal cycle between the years 'u' and 'v'.

G. Determining Annual High Heap Usage Season

If it is determined that there are common seasonal cycles between the most recent year and preceding years, some embodiments can compute the seasonal factors for each month enumerated by the monthly seasonal index 0 to 11 by employing the following formula:

$$\overline{S}_n = \frac{1}{P}(\overline{Y}_n + \overline{Y}_{n+12} + \overline{Y}_{n+2*12} + \ldots + \overline{Y}_{n+(P-1)*12}), \, n = 0, 1, \ldots, 11$$

In an alternative embodiment, the monthly indices $\overline{Y}_p$ of the most recent year (i.e., cycle) can be used as the monthly seasonal indices, as indicated by the following formula:

$$\overline{S}_n = \overline{Y}_{p,n}, \, n=0,1,\ldots,11$$

To classify the annual high heap usage season, some embodiments can identify the seasonal index N corresponding to the month that has the largest seasonal factor in the year-long period. Such embodiments can then use the index N as a seed. Starting from N, such embodiments can scan the seasonal indices less than or greater than N (i.e., seasonal indices 0, 1, 2 … N−1, N+1, N+2) that have seasonal factors greater than a threshold T. In some embodiments, T is greater than 1. Some embodiments may classify more than one disjoint high heap usage season if there is more than one N such that $\hat{S}_N = \text{MAX}(\overline{S}_n)$. The function MAX($\overline{S}_n$, s) selects the $s^{th}$ element of a sequence of indices N, $\overline{S}_N = \text{MAX}(\overline{S}_n)$. The parameter s is used to break the tie in case there is more than one N such that $\overline{S}_N = \text{MAX}(\overline{S}_n)$. Some embodiments may classify each disjoint high heap usage season and repeat the correlation analysis for each season. In some embodiments, a method to classify the set of monthly seasonal indices for a high heap usage season is defined by the following recursion:

$$V_0 = \{N \mid \overline{S}_n = \text{MAX}(\overline{S}_n, s)_{n=0,\ldots,(P-1)}\}$$

$$V_{W+1} = V_W \cup \{J \mid \overline{S}_J > T \text{ and}$$

$$[[J = (K+1) \bmod P, K = \text{MAX}(V_W)] \text{ or}$$

-continued $$[J = (L - 1 + P) \bmod P, L = \text{MIN}(V_W)]$$

$$V = \bigcup_{W=0 \ldots (P-1)} V_W$$

It should be noted that the above recursion involves an unbound variable s that can be used to break a tie. In some embodiments, s=1 by default.

In certain embodiments, the closure V of the seasonal indices classifies an annual high heap usage season. The threshold T can be set to a percentage, such as 85 percent of the range of the seasonal factors. For example, suppose the seasonal factors for the 12 monthly seasonal indices in one year-long period are as given in the following table.

| January | February | March | April | May | June | July | August | September | October | November | December |
|---------|----------|-------|-------|------|------|------|--------|-----------|---------|----------|----------|
| 0.76    | 0.82     | 1.0   | 1.2   | 1.29 | 1.34 | 1.26 | 1.12   | 1.01      | 0.99    | 0.95     | 0.9      |

The range of the multiplicative seasonal factors is (1.34-0.76), which is 0.58. Accordingly, 85 percent of the range of the seasonal factors is (0.76+0.85*0.58), which is 1.253. Given the 85 percent threshold T, T=1.25. As a result, such embodiments may classify May, June, and July as the annual high heap usage season.

Some embodiments can select a segment of the dataset that spans the most recent cycle of the year-long period. For example, among the cycles: 2013, 2014, 2015, and 2016, such embodiments may select the segment of data covering 2015 to 2016. The selected data segment can span 2 or more weeks of heap usage statistics that are inside the annual high heap usage season. For example, if the seasonal factors are as given in the following table, the data segment can be selected from November 2015, December 2015, and January 2016.

| January | February | March | April | May  | June | July | August | September | October | November | December |
|---------|----------|-------|-------|------|------|------|--------|-----------|---------|----------|----------|
| 1.26    | 1.12     | 1.01  | 0.99  | 0.95 | 0.9  | 0.76 | 0.82   | 1.0       | 1.2     | 1.29     | 1.34     |

H. Regression for Filter Constants and Time Zone Offset

Some embodiments can incorporate an estimate of a time zone offset. If a time zone offset is not available, some embodiments can perform a non-linear regression for a segment of the data set to estimate the time zone offset and use it for filtering the data. By providing an estimation of the time zone offset, some embodiments can improve the estimation of the seasonal indices in the transitions between the periods.

In particular, some embodiments can perform a non-linear regression with the filter constants (i.e., regression parameters, which are independent variables): measureFilterConstant α, rateFilterConstant β, accelerationFilterConstant κ, seasonalFactorFilterConstant γ, errorResidualFilterConstant δ, and timeZoneOffset tz to minimize the mean square error (MSE) and/or the mean absolute deviation (MAD) of the residual of the 1-step forecasts. In some embodiments, the time stamps may be shifted by the time zone offset tz in the regression. Some embodiments may apply a non-linear multivariate regression using an optimization routine (e.g., the optimum routine provided by the R programming language). Some embodiments may derive the weekday and weekend seasonal factors using the optimal values of α, β, κ, γ, δ, and tz, as indicated in the following formulae employed by such embodiments:

$$MSE = f(\alpha, \beta, \kappa, \gamma, \delta, tz, x_t) = \left(\frac{1}{N}\sum_{n=1}^{N} (e_{h,t_n})^2\right)^{1/2}$$

$$MAD = f(\alpha, \beta, \kappa, \gamma, \delta, tz, x_t) = \frac{1}{N}\sum_{n=1}^{N} |e_{h,t_n}|$$

Some embodiments include the time zone offset as a regression parameter so that the transitions between cycles of a period or between two adjacent periods can be as accurate as possible.

I. Ranking Classes of Threads by Degree of Correlation

Once the annual high heap usage season has been determined, some embodiments may calculate and/or obtain weekday/weekend factors that represent daily/weekly seasonal cycles covered by a recent (e.g., most recent) annual high heap usage season. It should be noted that the daily/weekly seasonal cycles in this segment of the data set (i.e., during an annual high heap usage season) may be more pronounced than at other times (i.e., outside the annual high heap usage season). Thus, the determination of degrees of correlation between seasonal trends in heap usage and seasonal trends in the intensity statistics of one or more classes of threads may be based on this segment of the data set. Stated another way, for correlation analysis, some embodiments can derive the seasonal trends of various classes of threads using the same time intervals as the time intervals covered by the most recent annual high heap usage season.

It should be noted that to determine seasonal trends for the intensity statistics of a particular class of threads, some embodiments may employ techniques that were used for determining seasonal trends in heap usage, as described above. In other words, seasonal trending of thread intensity statistics and heap usage statistics may both involve using the same number of seasonal indices for the weekday and weekend periods (e.g., 96 seasonal indices for a weekday period and 192 seasonal indices for a weekend period).

Upon determining the seasonal trends for heap usage and the seasonal trends of intensity statistics for one or more classes of threads, some embodiments may then compute, for each of the one or more classes of threads, the degree of correlation between the seasonal trends for heap usage and the seasonal trends for the intensity statistics of the class of threads. In particular, the degree of correlation may be computed for the sequences of the 96 seasonal factors or the 192 seasonal factors. It should be noted that computing the degree of correlation between seasonal trends may be more efficient than computing a degree of correlation between a sequence of heap usage measures and a sequence of thread intensity measures because sequences of measures may be much longer.

Let H denote a sequence of N seasonal factors for heap usage. Let T denote a sequence of N seasonal factors for the thread intensity of a class of threads. The correlation coefficient of the two sequences of seasonal factors is given by CorrelationCoefficient(H, T), as defined below:

$$\text{Mean}(H) = \frac{1}{N}\sum_{j=1}^{N} H_j$$

$$\text{Mean}(T) = \frac{1}{N}\sum_{j=1}^{N} T_j$$

$$\text{Variance}(H) = \frac{1}{N-1}\sum_{i=1}^{N} (H_i - \text{Mean}(H))^2$$

$$\text{Variance}(T) = \frac{1}{N-1}\sum_{i=1}^{N} (T_i - \text{Mean}(T))^2$$

$$\text{CorrelationCoefficient}(H, T) = \frac{\sum_{i=1}^{N}(H_i - \text{Mean}(H))(T_i - \text{Mean}(T))}{(N-1)\sqrt{\frac{\text{Variacle}(H)}{\text{Variacle}(T)}}}$$

Some embodiments may derive weekday and weekend seasonal factors for heap usage by taking a regression of the heap usage statistics included in the most recent annual high heap usage season. Let's denote the time interval of this segment of the data set by (t1, t2). To analyze the correlation between the seasonal factors for the intensity statistics of a class of threads with the seasonal factors for the heap usage, some embodiments can take the seasonal factors from the same time interval (t1, t2) in the seasonal factor time-series in the SeasonalTrendInfo associated with the class of threads. In particular, the seasonal factor time-series can be stored in the smoothedWeekdaySeasonalFactor member variable and the smoothedWeekendSeasonalFactor member variable in the associated SeasonalTrendingInfo object.

Some embodiments can iterate over the ThreadClassificationInfo objects of all of the classes of threads and recursively traverse the SegmentInfo objects in each of the ThreadClassificationInfo object to collect SeasonalTrendInfo objects contained within the ThreadClassificationInfo objects and the SegmentInfo objects. In computing a CorrelationCoefficient(H, T) between the heap usage and each of the classes of threads using the formulae identified above, some embodiments can retrieve the weekday factors or the weekend factors in each of the SeasonalTrendInfo objects. Once a degree of correlation has been calculated for each class of thread, some embodiments may rank the classes of the threads by their degrees of correlation with heap usage seasonal trends. The top ranking classes of threads may then be classified as heap-hoarding classes of threads. Some embodiments may then analyze stack traces and code associated with the heap-hoarding classes of threads to identify inefficient memory usage that can be rectified and/or improved, either manually or automatically.

It should be noted that some embodiments can be extended to determine correlation coefficients based on periods other than weekday and weekend periods (e.g., end-of-quarter periods).

Figure 9:
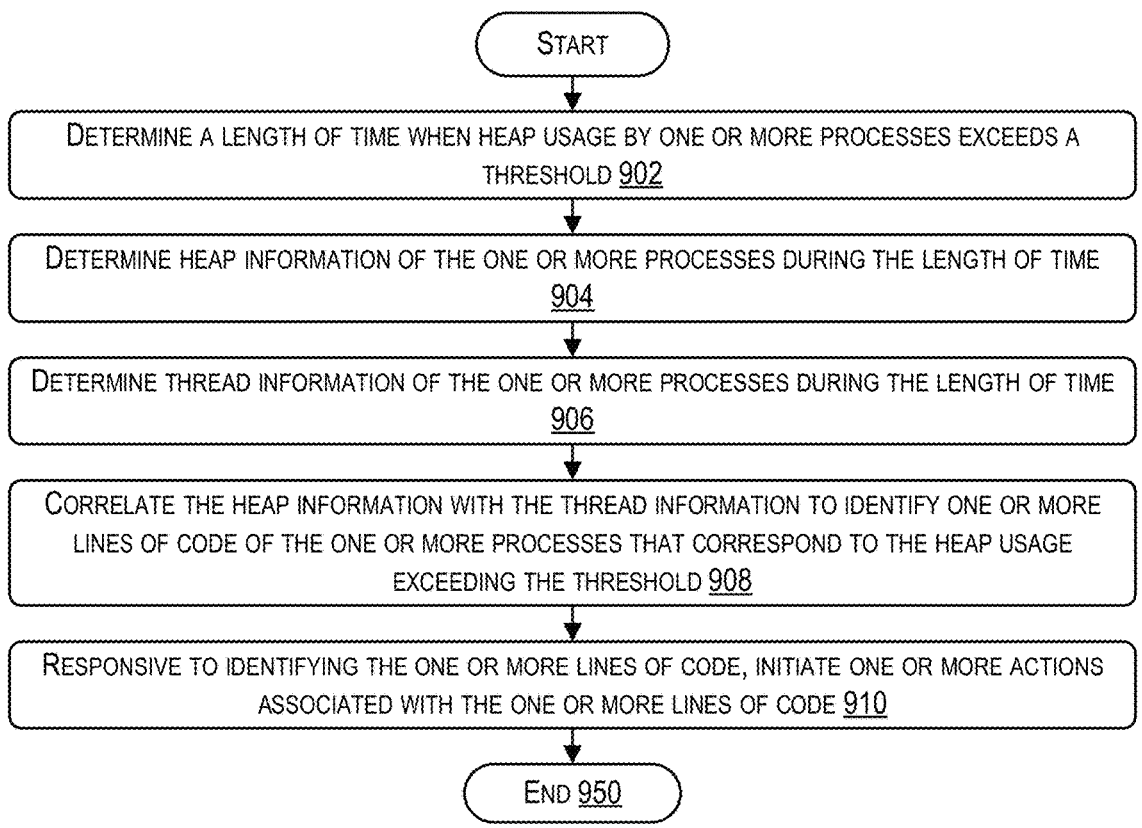
FIG. 9 shows a simplified flowchart that depicts the identification of code that corresponds to high heap usage according to some embodiments.

FIG. 9 illustrates a flowchart 900 of a process for identifying code that is likely to be contributing to high heap usage within a software execution environment according to some embodiments. In some embodiments, the process depicted in flowchart 900 may be implemented by a computer system with one or more processors (e.g., computer system 1700 of FIG. 17) where the one or more processors can execute the steps based on computer code stored in a computer-readable medium. The steps described in FIG. 9 can be performed in any order and with or without any of the other steps.

Flow chart 900 begins at step 902, where embodiments determine a length of time when heap usage by one or more processes exceeds a threshold. The length of time may correspond to the annual high heap usage season while the threshold may correspond to a percentage of the range of seasonal factors assigned to intervals (e.g., 15 minute intervals) across one or more periods (e.g., the weekday period and the weekend period). In some embodiments, the threshold may be set by choosing a percentage. Once the percentage is chosen, the threshold may be given by the sum of the smallest seasonal factor and the product of the range of seasonal factors and the percentage. For example, if the chosen percentage is 85 percent, the smallest seasonal factor is 0.76, and the largest seasonal factor is 1.34, the threshold may be given by (0.76+0.85*(1.34-0.76)), which 1.253. As a result, any interval with a multiplicative seasonal factor that exceeds 1.25 may be determined to be part of the length of time when heap usage exceeds the threshold.

At step 904, embodiments determine heap information of the one or more processes during the length of time. The heap information may correspond to the amount of heap memory being used by the one or more processes within a software execution environment at different points during the length of time. For example, the heap information may be based on heap usage measurements obtained from the software execution environment at irregular intervals (e.g., during full GCs). Additionally, the software execution environment may correspond to a production environment that comprises one or more virtual machines (e.g., JVMs) and the one or more processes may support one or more cloud services.

At step 906, embodiments determine thread information of the one or more processes during the length of time. In some embodiments, the thread information may comprise, for each of one or more classes of threads determined from analyzed thread dumps, a thread intensity seasonal factor for each of the plurality of intervals.

In some embodiments, the heap information may include a heap usage seasonal factor for each of the plurality of intervals. In particular, the length of time may span one or more cycles of a first period having a first length (e.g., the weekday period) and one or more cycles of a second period having a second length (e.g., the weekend period). Each period may be split into a plurality of intervals. For example, the weekday period may be split into 96 15 minute intervals while the weekend period may be split into 192 15 minute intervals.

It should be noted that each of the plurality of intervals may be mapped to a particular season (i.e., seasonal indice) of one of the periods. For each seasonal indice, some embodiments may determine a heap usage seasonal factor and, for each class of thread that is determined, a thread intensity seasonal factor, which may result in each interval being associated with a heap usage seasonal factor and a plurality of thread intensity seasonal factors (one for each class of threads). For example, assuming three different classes of threads are discovered, the weekday period may have 96 heap usage seasonal factors and 288 thread intensity seasonal factors (96 thread intensity seasonal factors for each of the three classes of threads) while the weekend period may have 192 heap usage seasonal factors and 576 thread intensity seasonal factors.

At step 908, embodiments correlate the heap information with the thread information to identify one or more lines of code of the one or more processes that correspond to the heap usage exceeding the threshold. The steps of correlating the heap information with the thread information are discussed in further detail below with respect to FIG. 10.

At step 910, responsive to identifying the one or more lines of code, embodiments initiate one or more actions associated with the one or more lines of code. For example, embodiments may generate an alert associated with the one or more lines of code that is sent to relevant personnel or a code optimization tool. In response, the identified lines of code may be investigated and/or optimized. Alternatively, some embodiments may optimize the one or more lines of code to use heap memory in a more efficient fashion.

Figure 10:
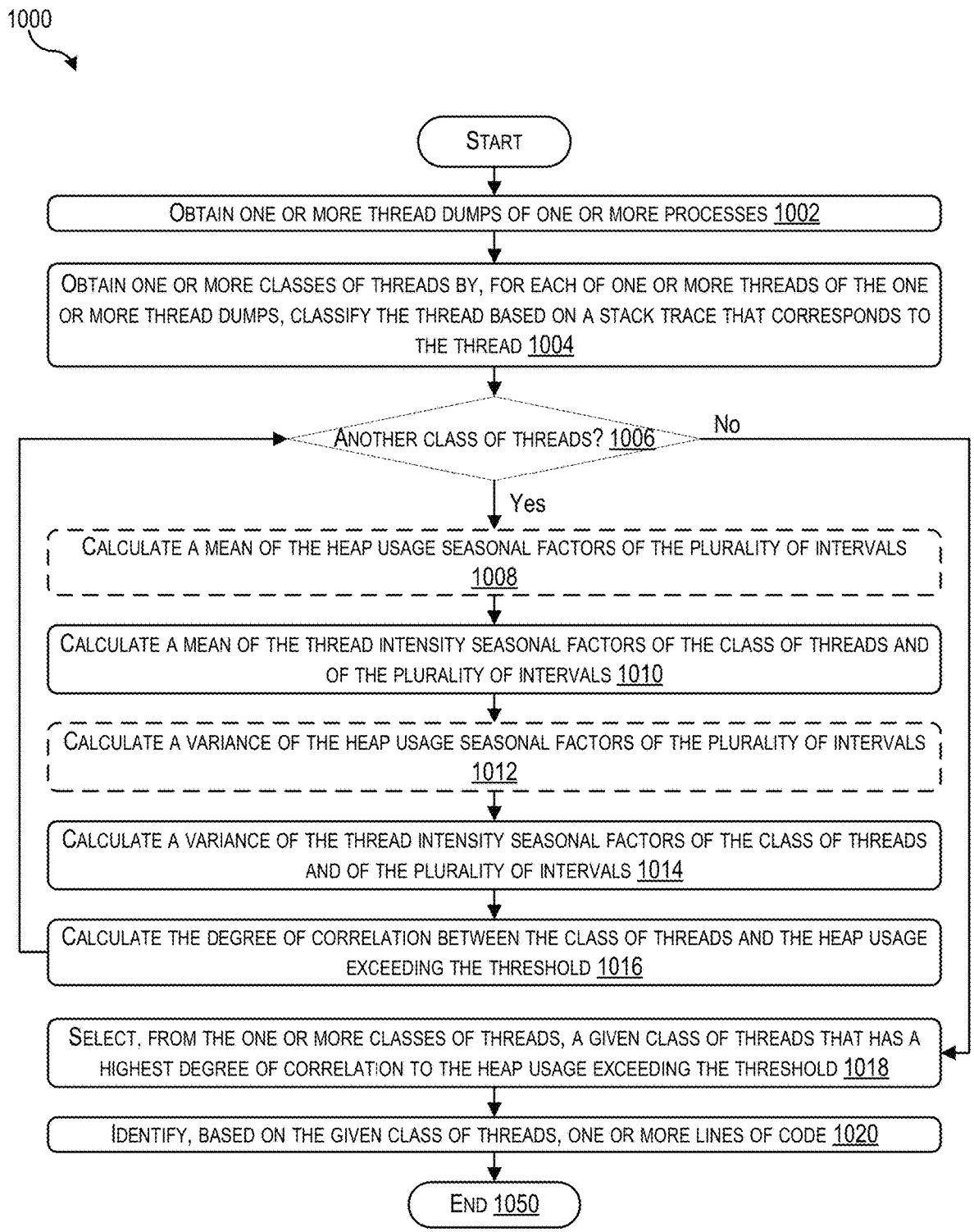
FIG. 10 shows a simplified flowchart that depicts the calculation of degrees of correlation between various classes of threads and high heap usage according to some embodiments.

FIG. 10 illustrates a flowchart 1000 of a process for calculating of degrees of correlation between various classes of threads and high heap usage according to some embodiments. In some embodiments, the process depicted in flowchart 1000 may be implemented by a computer system with one or more processors (e.g., computer system 1700 of FIG. 17) where the one or more processors can execute the steps based on computer code stored in a computer-readable medium. The steps described in FIG. 10 can be performed in any order and with or without any of the other steps.

Flowchart 1000 begins at step 1002, where embodiments obtain one or more thread dumps of one or more processes. As mentioned above, a control system may periodically cause the software execution environment to take thread dumps, where each thread dump comprises one or more stack traces of threads spawned by one or more processes executing within the software execution environment.

At step 1004, embodiments obtain one or more classes of threads by receiving one or more threads from one or more thread dumps and classifying each of the received threads based on a stack trace that corresponds to the received thread. Once all of the thread dumps have been received and processed, embodiments may analyze each of the one or more classes of threads to determine a degree of correlation between each of the classes of threads and high heap usage in steps 1006-1016.

At decision 1006, embodiments determine whether there is another class of threads of the one or more classes of threads to determine a degree of correlation with high heap usage. If so, embodiments may proceed to step 1008. Otherwise, embodiments may proceed to step 1018.

At optional step 1008, embodiments calculate a mean of the heap usage seasonal factors of the plurality of intervals. At step 1010, embodiments calculate a mean of the thread intensity seasonal factors of the class of threads and of the plurality of intervals. At optional step 1012, embodiments calculate a variance of the heap usage seasonal factors of the plurality of intervals. At step 1014, embodiments calculate a variance of the thread intensity seasonal factors of the class of threads and of the plurality of intervals. At step 1016, embodiments calculate the degree of correlation between the class of threads and the heap usage exceeding the threshold.

At step 1018, embodiments select, from the one or more classes of threads, a given class of threads that has a highest degree of correlation to the heap usage exceeding the threshold. In particular, once a degree of correlation has been calculated for each class of thread, some embodiments may rank the classes of the threads by their degrees of correlation with heap usage seasonal trends. The top ranking class of threads may then be selected as the given class of threads.

At step 1020, embodiments identify, based on the given class of threads, one or more lines of code that are likely to be contributing significantly to high heap usage. In particular, some embodiments may then analyze file names and lines specified by stack traces to locate lines of code associated with the heap-hoarding classes of threads. It should be noted that each thread of the one or more processes that belongs to the given class of threads executes the one or more lines of code.

VI. Overcoming Weak-Exogeneity and Heteroscedasticity in Forecasting

As mentioned above, to ensure sample accuracy, heap allocation measurements may be taken during full garbage collection (GC) cycles that occur at irregular time intervals. In situations where heap usage is especially high, sampling intervals may become arbitrarily close to zero due to constant garbage collecting. As a result, time-series data based on the heap allocation measurements may exhibit weak-exogeneity, where the process of generating the residual is somewhat dependent on the process of generating the time-intervals of full GC samples, and heteroscedasticity, where the variance of the residual is not constant over time.

Conventionally, generating an ordinary least-squares regression of a linear trend assumes that the predictor variable and the response variable are generated by a process that is both exogenous and homoscedastic. However, with regards to a data set based on measurements taken during full GCs, the predictor variable (i.e., the irregular time intervals) and the response variable (i.e., the heap usage measurements taken during a full GC) are not independent because the frequency at which full GCs are taken may increase when heap usage increases. Some embodiments may use robust and resistant regression methods to overcome the weak-exogeneity and heteroscedasticity of the data set.

Certain embodiments may utilize robust least-squares regression to overcome the weak-exogeneity and heteroscedasticity exhibited in such data sets. In particular, some embodiments may (1) decompose a time-series of measurements into a de-seasonalized measure component (i.e., a de-seasonalized component) and a seasonal factor component (i.e., a seasonal effector), (2) apply a robust linear regression to the de-seasonalized measure component, (3) apply a smooth-spline filter to the seasonal factor component, and (4) reconstitute the linear regression line and the smoothed seasonal factors into a seasonal and linear trend model.

The least-trimmed squares (LTS) estimator is a robust regression technique that is resistant to the influence of outliers. Given a set of N samples, the LTS estimator minimizes the sum of the smallest 50% of squared residuals by trimming out 50% of samples corresponding to the largest squared residuals as outliers. The LTS estimator runs one iteration of ordinary least-square regression of all N samples to sort the residuals to select the smallest N/2 residuals (i.e., trimmed samples). The LTS estimator then iteratively reruns the regressions by updating the trimmed samples to reduce the mean of the squared residuals. In comparison with certain embodiments described below, however, the time-complexity of the LTS algorithm may be relatively high.

The generalized weighted least-squares (WLS) estimator is a robust regression technique that multiplies the squared error residual of each sample by a weight that is inversely proportional to the variance of the sample. Employing the WLS estimator may depend on the weights being determined by prior knowledge of the data. For example, the prior knowledge may specify (1) the accuracy of the different instruments used to measure different sample points, (2) the variance among the redundant measurements corresponding to the same time instant, or (3) the variance among the nearest neighbor group of measurements. If the weights cannot be determined by prior knowledge, the WLS estimator may run one iteration of the ordinary least-squares regression to estimate the residuals and use the inverse of the residuals as the weights to iteratively rerun the regression to produce a stable estimate of the linear model. In comparison with certain embodiments described below, however, the time-complexity of the WLS algorithm is relatively high.

In the patent application Ser. No. 14/109,546, which is incorporated by reference herein for all purposes, a set of equations to filter the rate of change $r_{t_n}$ of the measure is disclosed. This filter monitors the trend of the measure:

$$r_{t_n} = \frac{x_{t_n} - x_{t_{n-1}}}{t_n - t'_{n-1}}$$

$$\overline{R}_{t_n} = v_{t_n} r_{t_n} + (1 - v_{t_n}) \overline{G}_{t_n}$$

Since the rate of change $$r_{t_n} = \frac{x_{t_n} - x_{t_{n-1}}}{t_n - t'_{n-1}}$$

involves a division by the length of time interval $(t_n - t_{n-1}')$, some embodiments may adjust the filter parameter to give a relatively small weight to a sample when the length of time interval $t_n - t_{n-1}'$ is relatively short.

The filter parameter $v_{t_n}$ is adjusted by the adjustment factors $\sigma_n^{n-1}$ in the following equations:

$$v_{t_n} = \frac{v_{t_{n-1}}}{v_{t_{n-1}} + \sigma_n^{n-1} b_n}$$

$$b_n = (1 - \beta)^{(t_n - t_{n-1})}$$

$$\sigma_n^{n-1} = \left( \frac{t_{n-1} - t'_{n-2}}{t_n - t'_{n-1}} \right)$$

The rate filter parameter is used to filter the smoothed rate of change as follows. If seasonal trending is not employed, some embodiments may use the value $r_{t_n}'$ to update the average, as shown in the formula below:

$$\overline{R}_{t_n} = v_{t_n} r_{t_n}' + (1 - v_{t_n}) \overline{G}_{t_n}$$

On the other hand, if seasonal trending is employed, some embodiments may use one of the following formulae depending on whether the times fall in a weekend or on a weekday period, where and $\overline{B}_{\tau_n}$ and $\overline{C}_{\tau_n}$ are the seasonal factors of weekend and weekday periods, respectively.

$$\Delta x'_{t_n} = \begin{cases} \frac{x'_{t_n}}{\overline{B}_{\tau_n}} - \frac{x_{t_{n-1}}}{\overline{B}_{\tau_{n-1}}}, & t_{n-1} \text{ and } t_n \text{ fall in the weekend season} \\ \frac{x'_{t_n}}{\overline{C}_{\tau_n}} - \frac{x_{t_{n-1}}}{\overline{C}_{\tau_{n-1}}}, & t_{n-1} \text{ and } t_n \text{ fall in the weekday season} \\ \frac{x'_{t_n}}{\overline{B}_{\tau_n}} - \frac{x_{t_{n-1}}}{\overline{C}_{\tau_{n-1}}}, & t_{n-1} \text{ falls on a weekday and } t_n \text{ falls in a weekend} \\ \frac{x'_{t_n}}{\overline{C}_{\tau_n}} - \frac{x_{t_{n-1}}}{\overline{B}_{\tau_{n-1}}}, & t_n \text{ falls in a weekend and } t_n \text{ falls on a weekday} \end{cases}$$

Next, some embodiments may determine the deseasonalized raw growth rate using the following formula:

$$r'_{t_n} = \frac{\Delta x'_{t_n}}{t_n - t'_{n-1}}$$

Some embodiments may then update the moving average using the formula:

$$\overline{R}_{t_n} = v_{t_n} r'_{t_n} + (1 - v_{t_n}) \overline{G}_{t_n}$$

Figure 11:
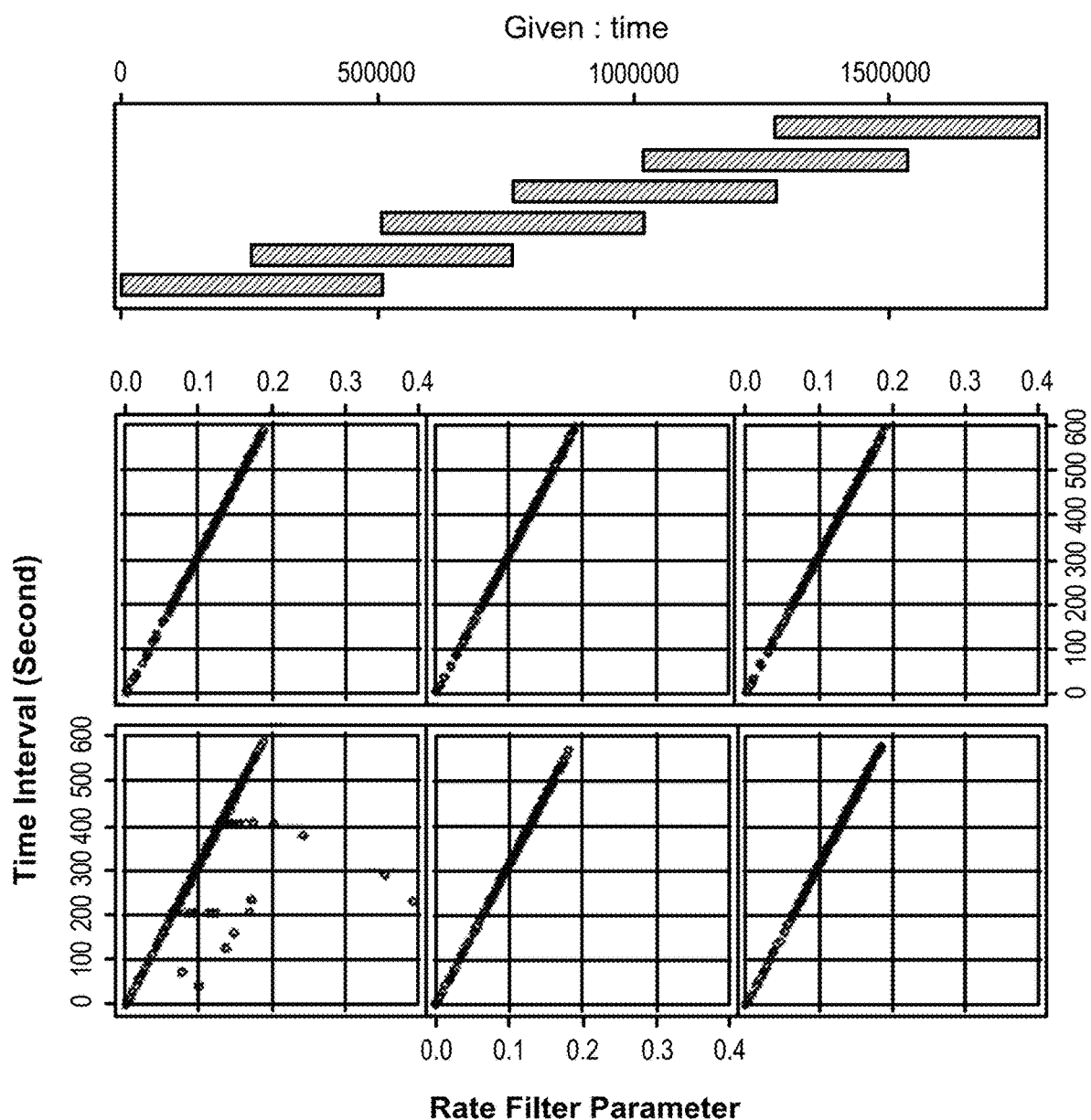
FIG. 11 depicts an example graph where the weight assigned to a sample measurement is plotted against the sampling time interval associated with the sample measurement across a time range of an example data set.

In particular, a rate filter parameter $v_{t_n}$ generated by the above equations represents a weight that is based on the length of the time interval that occurred in between the particular sample and another sample immediately previous to the particular sample. There is a one-to-one correspondence between the rate filter parameter and the measurement data in the time series. FIG. 11 depicts a graph that plots the filter parameter $v_{t_n}$ against the sampling time interval across the whole time range for an example data set. While the time range is divided into 6 overlapping sub-ranges, the graph in each sub-range shows that there is a linear relation between the sample time interval and the filter parameter. As can be seen in the graph, the filter parameter (i.e., the weight for the sample) is small when the sample time interval is small. This adjustment dynamically reduces the weight of the samples in the filter depending on the density of the sample points around the current sample point.

Some embodiments use the rate filter parameter to trim the data points. Trimming the data points can help to even out the density of the sample points across the whole time range and thus improve the robustness of the linear regression algorithm. With regards to the data points that represent the measurements of heap usage in a software execution environment during full GC cycles, data points that are close together may correspond to a period of higher heap usage (e.g., during load spikes) where full GCs are performed more often.

Some embodiments compare a rate filter parameter against a threshold and exclude (i.e., trim) the corresponding data point from the robust linear regression if the rate filter parameter is smaller than the threshold. Some embodiments can use the median or mean of the rate filter parameters as a threshold. In particular, some embodiments can trim the data points that are close together as such data points may represent the load surges or outliers. As a result, some embodiments may alleviate the weak-exogeneity condition by evening out the density of the data points along the time axis, which reduces the correlation between the irregular time-intervals and the residuals.

The time series $\overline{D}_{t_n}$ for the forecast error residual and $\overline{F}_{t_n}$ for the forecasted measure generated by the following equations are disclosed in the patent application Ser. No. 14/109,546, which is incorporated by reference herein for all purposes.

$$\overline{F}_{t_n} = \begin{cases} \overline{X}_{t_{n-1}} + \overline{M}_{t_{n-1}}(t_n - t_{n-1}) \\ [\overline{X}_{t_{n-1}} + \overline{M}_{t_{n-1}}(t_n - t_{n-1})]\overline{C}_{\tau_n - L} \\ x_{t_{n-1}} + \overline{R}_{t_{n-1}}(t_n - t_{n-1}) \end{cases}$$

The following example code (written in the R programming language) shows how a trimmed subset of the samples and the weights of the samples can be computed. As shown in the example code below, some embodiments may use the R function "rlm", which enables certain embodiments to specify the trimmed subset of the samples and the weights of the samples for generating a weighted least-squares regression. It should be noted that the rateFilterParameter, seasonalFactor, absoluteErrorResidual, measure, and time vectors in the example code are time-series with the same time range.

```
trimmingParameter <- c(rateFilterParameter, which(normSeasonalFactor < 1.0))
threshold1 <- median(trimmingParameter, na.rm = TRUE)
threshold2 <- median(rateFilterParameter, na.rm = TRUE)
threshold3 <- mean(rateFilterParameter, na.rm = TRUE)
trimmingThreshold <- max(threshold1, threshold2, threshold3)
lengthOfTrimmingParameter <- length(trimmingParameter)
# can set up a list of graduated thresholds to give less weight to older data
listOfTrimmingThresholds <- c(trimmingThreshold * 1.1, trimmingThreshold * 1.05,
        trimmingThreshold,
        trimmingThreshold * 0.95, trimmingThreshold * 0.9)
numberOfTrimmingThresholds <- length(listOfTrimmingThresholds)
# select the exclusion set of the data points which are time close together
# may use graduated thresholds to give less weight to older data for what is
# known as discounted least-squares regression
prevSplitPoint <- 0
for (num in 1:numberOfTrimmingThresholds) {
    splitPoint <- trunc(lengthOfTrimmingParameter * num / numberOfTrimmingThresholds)
    excludeIndices <- c(excludeIndices,
        which(rateFilterParameter[(prevSplitPoint + 1):splitPoint] <
            listOfTrimmingThresholds[num]) + prevSplitPoint)
    prevSplitPoint <- splitPoint
}
includeIndices <- 1:length(rateFilterParameter)
includeIndices <- includeIndices[-excludeIndices]
# use the inverse absolute error residual for weights
minErrorResidual <- min(absoluteErrorResidual)
if (minErrorResidual == 0) {
    absoluteErrorResidual[absoluteErrorResidual == 0] <- 1.0
    minErrorResidual <- 1.0
}
weights <- (minErrorResidual / absoluteErrorResidual)
# use regression methods robust to heteroscedasticity and weak-exogeneity
# use trimmed indices "includeIndices" to compensate for the weak-exogeneity
# use weights to compensate for the heteroscedasticity
# in generalized weighted least-squares
linear <- tryCatch(rlm(measure ~ time, weights = weights,
        method = "M", subset = includeIndices),
        error = function(e) return(null))
```

Some embodiments may generate the error residual of the forecasted measure using the following formula:

$$e_{t_n} = \overline{F}_{t_n} - x_{t_n}$$

$$\overline{E}_{t_n} = \psi_{t_n} e_{t_n} + (1 - \psi_{t_n})\overline{E}_{t_{n-1}}$$

$$\overline{D}_{t_n} = \psi_{t_n}|e_{t_n}| + (1 - \psi_{t_n})\overline{D}_{t_{n-1}}$$

Because there is a correlation between the smoothed absolute error residual $\overline{D}_{t_n}$ generated by the filter and the variance of the residual of the least-squares regression, some embodiments may use the inverse of the smoothed absolute error residual $1/\overline{D}_{t_n}$ as the weight for the generalized weighted least-squares regression. In doing so, some embodiments may alleviate the heteroscedasticity condition by giving a relatively small weight to a sample value that has a relatively large deviation from the expected value. The expected value can represent a convolution of the near-neighbor group of samples.

The rate filter parameter is given as a time-series of values denoted by $v_{t_n}$ for each timestamp $t_n$ corresponding to the timestamp of the data point. If $v_{t_n} < z$, where z is a threshold, then the corresponding data point $x_{t_n}$ is excluded from the linear regression. Generally, some embodiments can use any value at the N-percentile (e.g., the median, which is the 50-percentile) of the rate filter parameters as the threshold z.

In some embodiments, the absolute error residual is given as a time-series $\overline{D}_{t_n}$ for each timestamp $t_n$ corresponding to the timestamp of the data point. The weight $W_{t_n}$ of the sample at timestamp $t_n$ can be inversely proportional to $\overline{D}_{t_n}$. Some embodiments can compensate for the variance changes among the data points that represent the short-term load surges or outliers.

To decrease the influence of outliers and short-term surges in heap usage on the linear regression, some embodiments may combine the technique of evening out the density of data points with the technique of assign smaller weights to deviating samples values. In doing so, some embodiments may increase the robustness of the linear regression, which may facilitate the capturing of long-term trends (e.g., in heap usage). It should be noted that using the two techniques together may provide a better fit of the linear regression line to the data and may be more efficient than using conventional an LTS estimator or an WLS estimator, which generally involves several iterations of regression.

To further improve the robustness of the regression, some embodiments may additionally identify the transient states and remove the sample points that fall in the transient states and remove run-to-run segments that are outliers (e.g., data segments that correspond to the software execution environment experiencing a memory leak, an out of memory event, or a very high growth rate)

Figure 12:
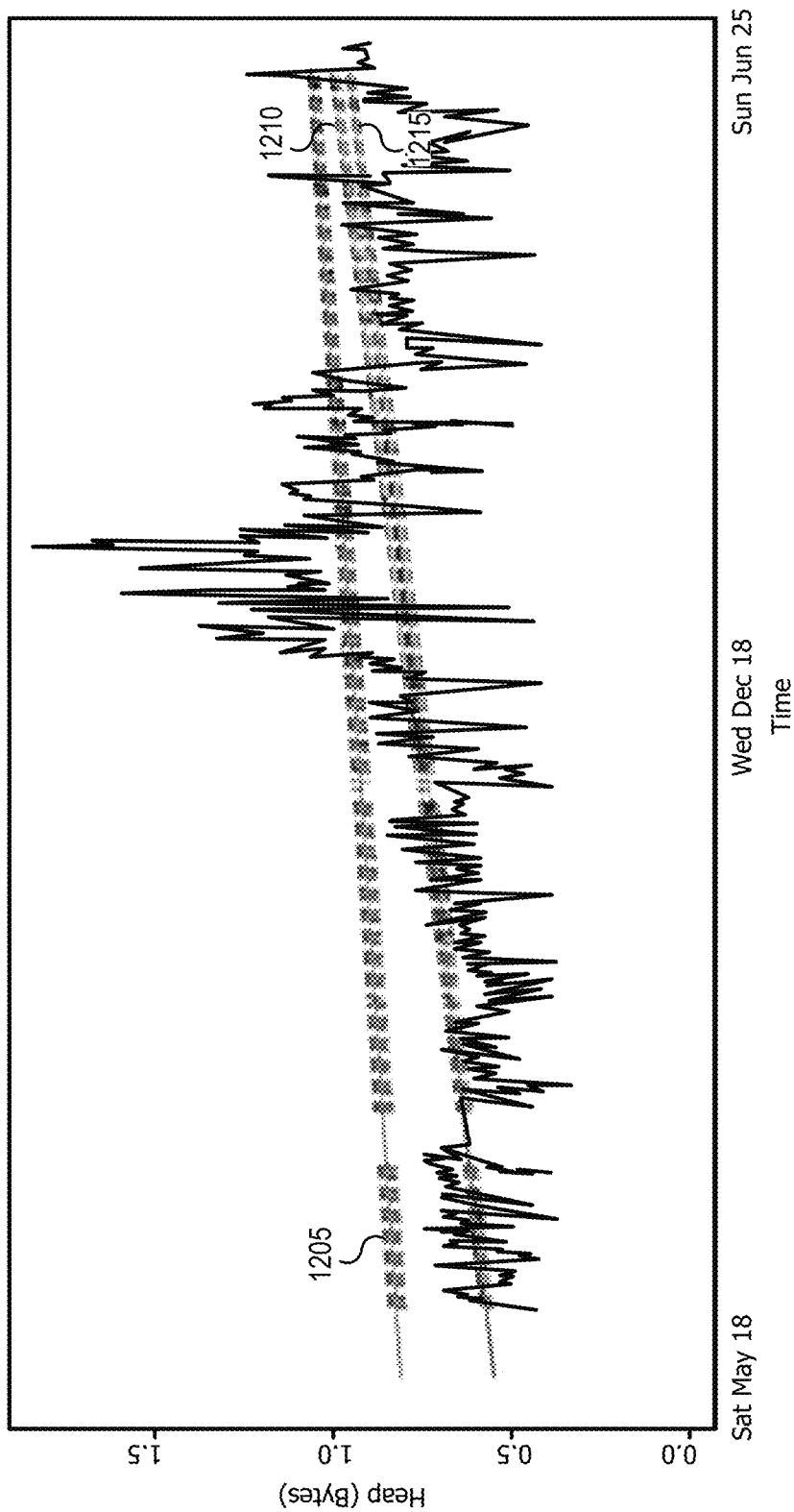
FIG. 12 depicts an example chart showing trend graphs derived by different linear regression techniques for the heap usage in a production environment.

FIG. 12 displays three trend graphs each derived by a different linear regression technique for the heap usage in a production environment. The blue color trend line 1205 can be derived by standard linear regression algorithm that assigns equal weights to each sample point. The brown color trend line 1210 can be derived by a conventional robust regression algorithm. The red color line 1215 represents a regression provided by a present embodiment described above, which lies close to the brown color trend line.

Figure 13:
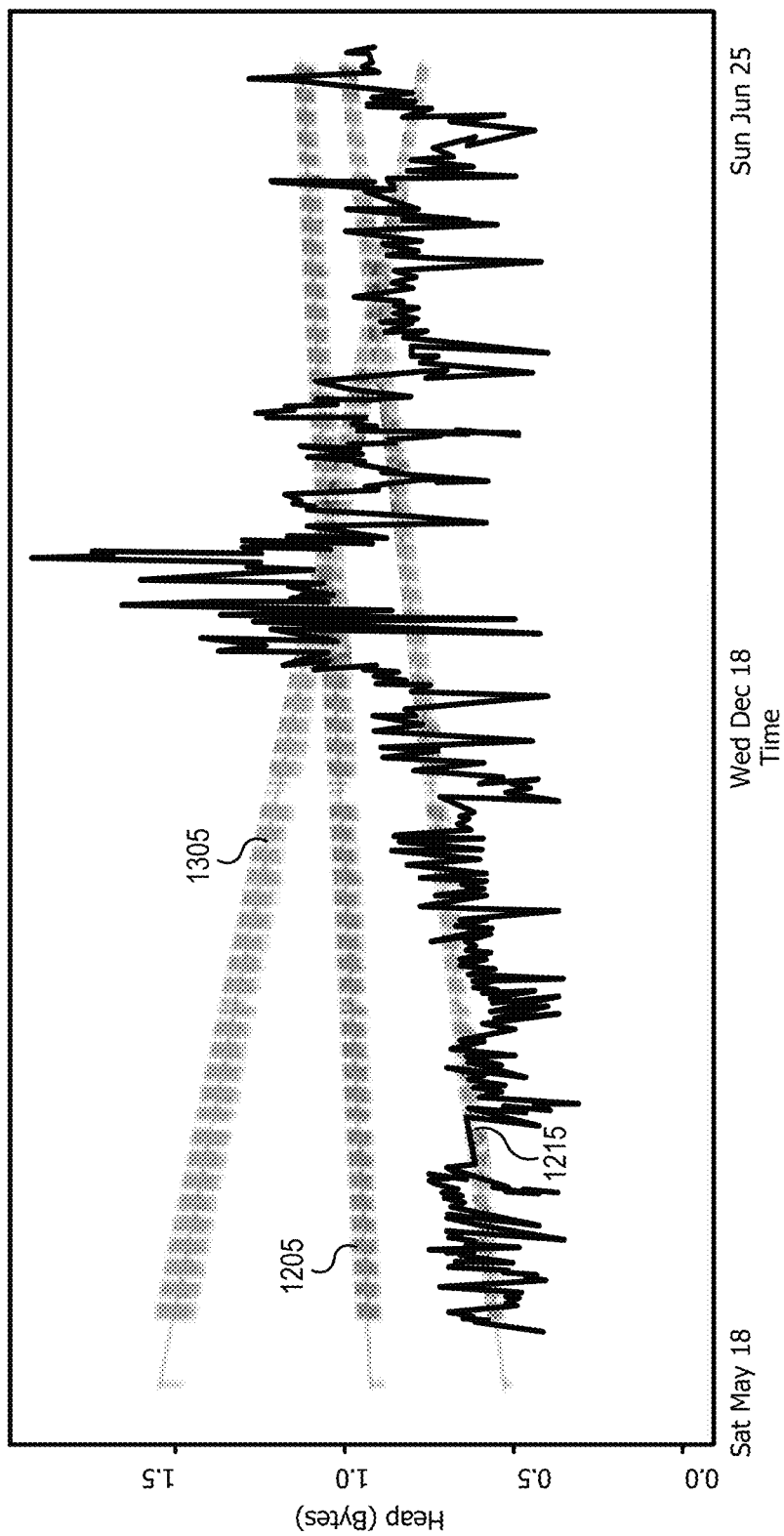
FIG. 13 depicts an example chart showing an additional trend graph that illustrates incorrect results given by standard robust regression techniques.

FIG. 13 displays an additional graph that illustrate how a conventional regression technique may provide incorrect results. As shown in the graph, the brown color trend line 1305, which represents a conventional regression technique, fits closely to the two clusters of high density sample points. In contrast, the red color line 1215 correctly traces the trend in the sample points to provide a long term projection of the heap usage in the software execution environment.

Figure 14:
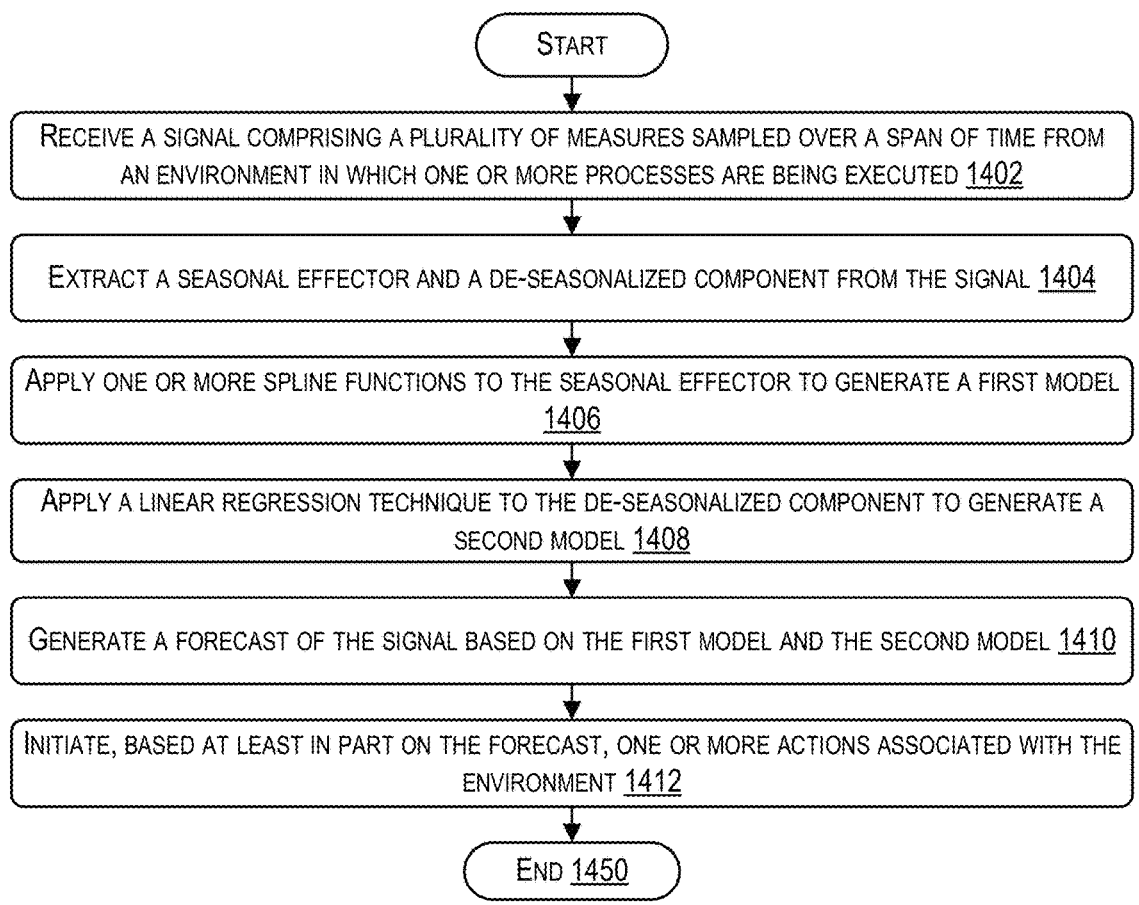
FIG. 14 shows a simplified flowchart that depicts the generation of a forecast of a signal according to some embodiments.

FIG. 14 illustrates a flowchart 1400 of a process for generating of a forecast of a signal according to some embodiments. In some embodiments, the process depicted in flowchart 1400 may be implemented by a computer system with one or more processors (e.g., computer system 1700 of FIG. 17) where the one or more processors can execute the steps based on computer code stored in a computer-readable medium. The steps described in FIG. 14 can be performed in any order and with or without any of the other steps.

Flowchart 1400 begins at step 1402, where embodiments receive a signal comprising a plurality of measures sampled over a span of time from an environment in which one or more processes are being executed. In some embodiments, the plurality of measures may be heap usage measurements taken by a control system that is monitoring heap usage within a software execution environment (e.g., a production environment), where the software execution environment includes one or more executing processes.

At step 1404, embodiments extract a seasonal effector and a de-seasonalized component from the signal 1404. In some embodiments, the seasonal effector may correspond to the seasonal factors determined for each interval of the period assigned to the data set. In some embodiments, the de-seasonalized component may be obtained by applying the seasonal factors to the signal.

At step 1406, embodiments apply one or more spline functions to the seasonal effector to generate a first model. In this regard, some embodiments may give relatively small weights to sample values that deviate drastically from the expected value, where the expected value represents a convolution of the near-neighbor group of samples.

At step 1408, embodiments apply a linear regression technique to the de-seasonalized component to generate a second model. In particular, to compensate for relatively short time intervals experienced during high heap usage, some embodiments may adjust a filter parameter to give a relatively small weight to a sample taken during a short interval. Some embodiments may use a rate filter parameter to trim the data points included in the data set. Trimming the data points can help to even out the density of the sample points across the whole time range and thus improve the robustness of the linear regression algorithm.

At step 1410, embodiments generate a forecast of the signal based on the first model and the second model. In some embodiments, the forecast of the signal may correspond to a regression line that is generated using the techniques described in steps 1406 and 1408. In particular, the generated forecast may have a better fit to the signal.

At step 1412, embodiments initiate, based at least in part on the forecast, one or more actions associated with the environment. For example, if the forecast indicates that heap usage will increase in the future, some embodiments may allocate additional resources (e.g., memory, RAM) to the software execution environment.

Figure 15:
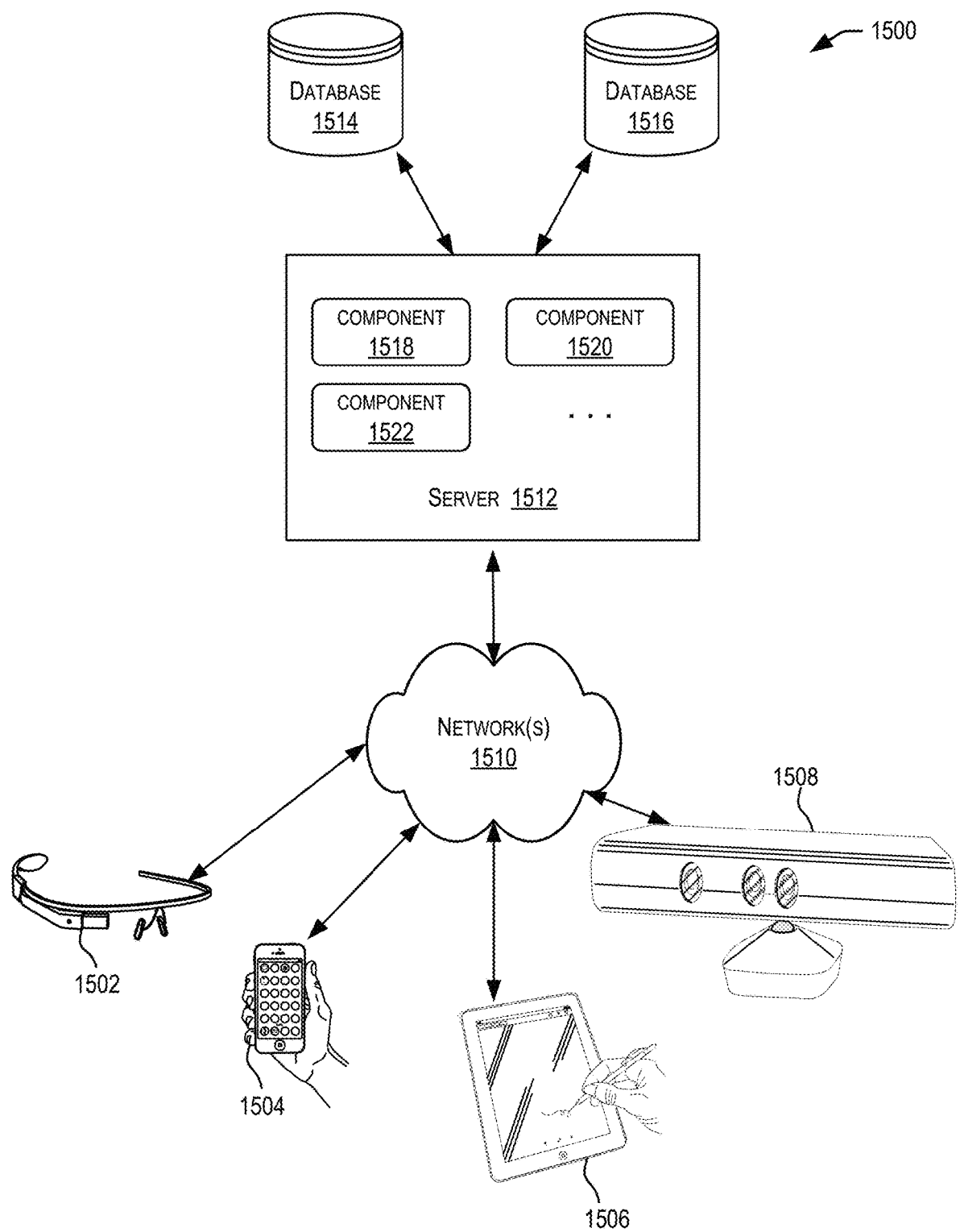
FIG. 15 depicts a simplified diagram of a distributed system for implementing certain embodiments.

FIG. 15 depicts a simplified diagram of a distributed system 1500 for implementing an embodiment. In the illustrated embodiment, distributed system 1500 includes one or more client computing devices 1502, 1504, 1506, and 1508, which are configured to execute and operate a client application such as a web browser, proprietary client (e.g., Oracle Forms), or the like over one or more network(s) 1510. Server 1512 may be communicatively coupled with remote client computing devices 1502, 1504, 1506, and 1508 via network 1510.

In various embodiments, server 1512 may be adapted to run one or more services or software applications. In certain embodiments, server 1512 may also provide other services or software applications can include non-virtual and virtual environments. In some embodiments, these services may be offered as web-based or cloud services or under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in FIG. 15, software components 1518, 1520 and 1522 of system 1500 are shown as being implemented on server 1512. In other embodiments, one or more of the components of system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The embodiment shown in FIG. 15 is thus one example of a distributed system for implementing an embodiment system and is not intended to be limiting.

Client computing devices 1502, 1504, 1506, and/or 1508 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1510.

Although distributed system 1500 in FIG. 15 is shown with four client computing devices, any number of client computing devices may be supported. Other devices, such as devices with sensors, etc., may interact with server 1512.

Network(s) 1510 in distributed system 1500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1512 can include one or more virtual machines running virtual operating systems, or other computing architectures involving virtualization. One or more flexible pools of logical storage devices can be virtualized to maintain virtual storage devices for the server. Virtual networks can be controlled by server 1512 using software defined networking. In various embodiments, server 1512 may be adapted to run one or more services or software applications described in the foregoing disclosure. For example, server 1512 may correspond to a server for performing processing as described above according to an embodiment of the present disclosure.

Server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1512 may include one or more applications to analyze and consolidate data feeds and/or event updates received from users of client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1512 may also include one or more applications to display the data feeds and/or real-time events via one or more display devices of client computing devices 1502, 1504, 1506, and 1508.

Distributed system 1500 may also include one or more databases 1514 and 1516. These databases may provide a mechanism for storing information such as user interactions information, usage patterns information, adaptation rules information, and other information used by embodiments of the present disclosure. Databases 1514 and 1516 may reside in a variety of locations. By way of example, one or more of databases 1514 and 1516 may reside on a non-transitory storage medium local to (and/or resident in) server 1512. Alternatively, databases 1514 and 1516 may be remote from server 1512 and in communication with server 1512 via a network-based or dedicated connection. In one set of embodiments, databases 1514 and 1516 may reside in a storage-area network (SAN). Similarly, any necessary files for performing the functions attributed to server 1512 may be stored locally on server 1512 and/or remotely, as appropriate. In one set of embodiments, databases 1514 and 1516 may include relational databases, such as databases provided by Oracle that are adapted to store, update, and retrieve data in response to SQL-formatted commands.

Figure 16:
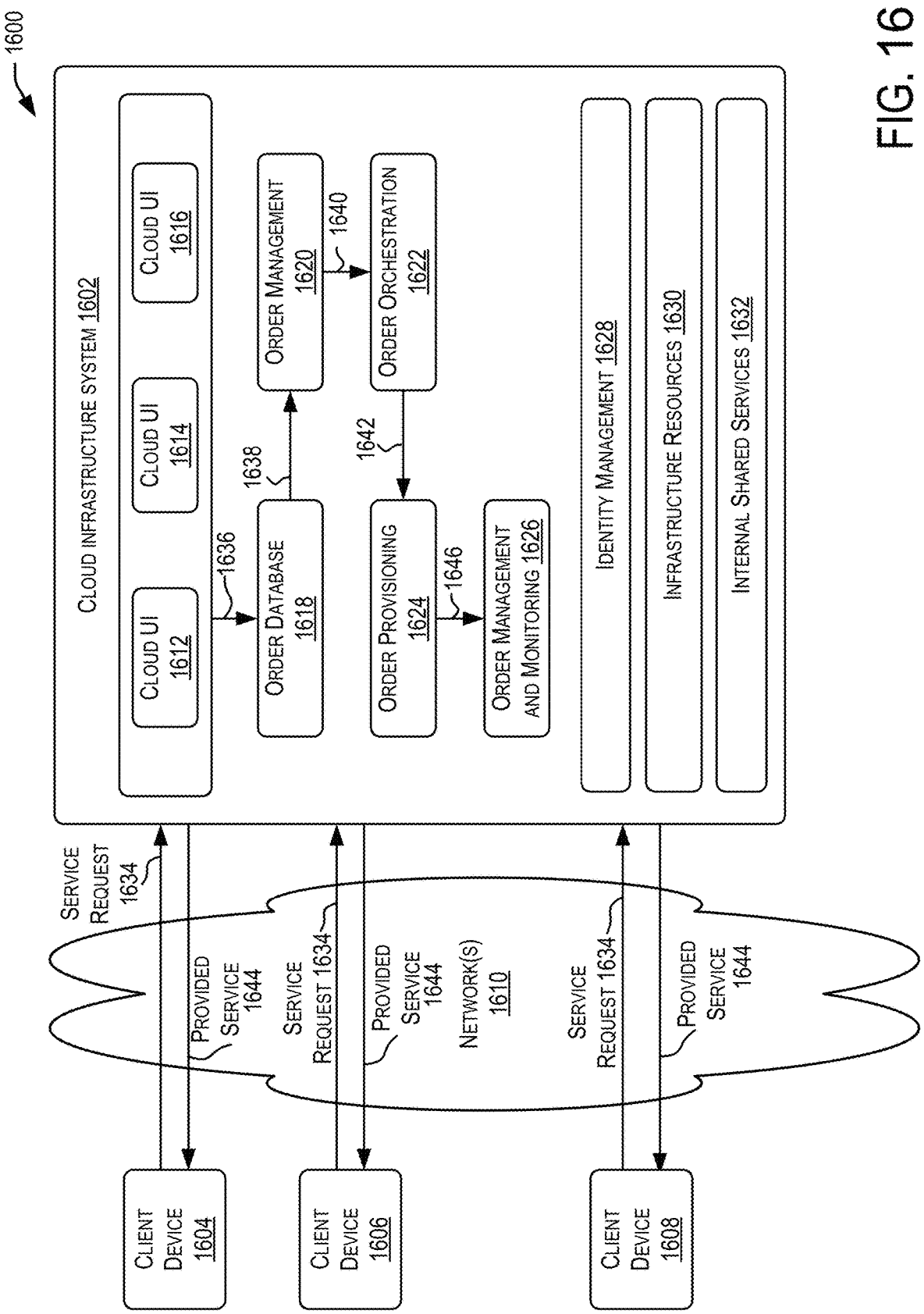
FIG. 16 depicts a simplified block diagram of one or more components of a system environment in which services may be offered as cloud services, in accordance with some embodiments.

In some embodiments, a cloud environment may provide one or more services. FIG. 16 is a simplified block diagram of one or more components of a system environment 1600 in which services may be offered as cloud services, in accordance with an embodiment of the present disclosure. In the illustrated embodiment in FIG. 16, system environment 1600 includes one or more client computing devices 1604, 1606, and 1608 that may be used by users to interact with a cloud infrastructure system 1602 that provides cloud services. Cloud infrastructure system 1602 may comprise one or more computers and/or servers that may include those described above for server 1612.

It should be appreciated that cloud infrastructure system 1602 depicted in FIG. 16 may have other components than those depicted. Further, the embodiment shown in FIG. 16 is only one example of a cloud infrastructure system that may incorporate an embodiment of the present disclosure. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above. Client computing devices 1604, 1606, and 1608 may be configured to operate a client application such as a web browser, a proprietary client application (e.g., Oracle Forms), or some other application, which may be used by a user of the client computing device to interact with cloud infrastructure system 1602 to use services provided by cloud infrastructure system 1602. Although exemplary system environment 1600 is shown with three client computing devices, any number of client computing devices may be supported. Other devices such as devices with sensors, etc. may interact with cloud infrastructure system 1602.

Network(s) 1610 may facilitate communications and exchange of data between client computing devices 1604, 1606, and 1608 and cloud infrastructure system 1602. Each network may be any type of network familiar to those skilled in the art that can support data communications using any of a variety of commercially-available protocols, including those described above for network(s) 1610.

In certain embodiments, services provided by cloud infrastructure system 1602 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1602 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1602 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services (e.g., owned by Oracle Corporation) and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform, and other resources.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 to enable provision of services by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in FIG. 16, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In an exemplary operation, at step 1634, a customer using a client device, such as client computing devices 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI) such as cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

At step 1636, the order information received from the customer may be stored in an order database 1618. If this is a new order, a new record may be created for the order. In one embodiment, order database 1618 can be one of several databases operated by cloud infrastructure system 1618 and operated in conjunction with other system elements.

At step 1638, the order information may be forwarded to an order management module 1620 that may be configured to perform billing and accounting functions related to the order, such as verifying the order, and upon verification, booking the order.

At step 1640, information regarding the order may be communicated to an order orchestration module 1622 that is configured to orchestrate the provisioning of services and resources for the order placed by the customer. In some instances, order orchestration module 1622 may use the services of order provisioning module 1624 for the provisioning. In certain embodiments, order orchestration module 1622 enables the management of business processes associated with each order and applies business logic to determine whether an order should proceed to provisioning.

As shown in the embodiment depicted in FIG. 16, at step 1642, upon receiving an order for a new subscription, order orchestration module 1622 sends a request to order provisioning module 1624 to allocate resources and configure resources needed to fulfill the subscription order. Order provisioning module 1624 enables the allocation of resources for the services ordered by the customer. Order provisioning module 1624 provides a level of abstraction between the cloud services provided by cloud infrastructure system 1600 and the physical implementation layer that is used to provision the resources for providing the requested services. This enables order orchestration module 1622 to be isolated from implementation details, such as whether or not services and resources are actually provisioned on the fly or pre-provisioned and only allocated/assigned upon request.

At step 1644, once the services and resources are provisioned, a notification may be sent to the subscribing customers indicating that the requested service is now ready for use. In some instance, information (e.g. a link) may be sent to the customer that enables the customer to start using the requested services.

At step 1646, a customer's subscription order may be managed and tracked by an order management and monitoring module 1626. In some instances, order management and monitoring module 1626 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1600 may include an identity management module 1628 that is configured to provide identity services, such as access management and authorization services in cloud infrastructure system 1600. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

Figure 17:
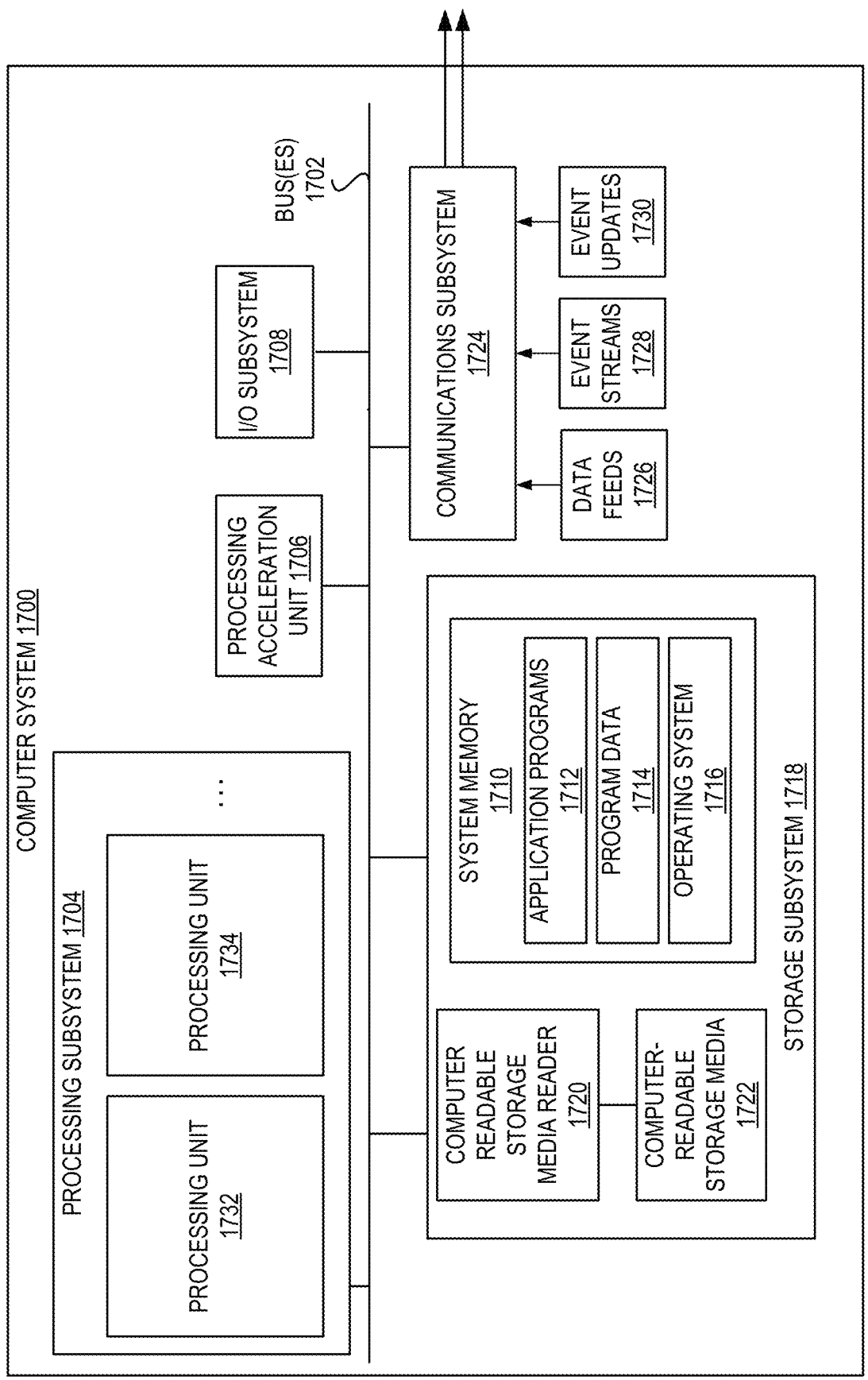
FIG. 17 depicts an exemplary computer system that may be used to implement certain embodiments.

FIG. 17 illustrates an exemplary computer system 1700 that may be used to implement an embodiment of the present disclosure. In some embodiments, computer system 1700 may be used to implement any of the various servers and computer systems described above. As shown in FIG. 17, computer system 1700 includes various subsystems including a processing unit 1704 that communicates with a number of peripheral subsystems via a bus subsystem 1702. These peripheral subsystems may include a processing acceleration unit 1706, a I/O subsystem 1708, a storage subsystem 1718 and a communications subsystem 1724. Storage subsystem 1718 may include tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1704 controls the operation of computer system 1700 and may comprise one or more processing units 1732, 1734, etc. A processing unit may include be one or more processors, including single core or multicore processors, one or more cores of processors, or combinations thereof. In some embodiments, processing subsystem 1704 can include one or more special purpose co-processors such as graphics processors, digital signal processors (DSPs), or the like. In some embodiments, some or all of the processing units of processing subsystem 1704 can be implemented using customized circuits, such as application specific integrated circuits (ASICs), or field programmable gate arrays (FPGAs).

In some embodiments, the processing units in processing subsystem 1704 can execute instructions stored in system memory 1710 or on computer readable storage media 1722. In various embodiments, the processing units can execute a variety of programs or code instructions and can maintain multiple concurrently executing programs or processes. At any given time, some or all of the program code to be executed can be resident in system memory 1710 and/or on computer-readable storage media 1722 including potentially on one or more storage devices. Through suitable programming, processing subsystem 1704 can provide various functionalities.

In certain embodiments, a processing acceleration unit 1706 may be provided for performing customized processing or for off-loading some of the processing performed by processing subsystem 1704 so as to accelerate the overall processing performed by computer system 1700.

I/O subsystem 1708 may include devices and mechanisms for inputting information to computer system 1700 and/or for outputting information from or via computer system 1700. In general, use of the term "input device" is intended to include all possible types of devices and mechanisms for inputting information to computer system 1700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1718 provides a repository or data store for storing information that is used by computer system 1700. Storage subsystem 1718 provides a tangible non-transitory computer-readable storage medium for storing the basic programming and data constructs that provide the functionality of some embodiments. Software (programs, code modules, instructions) that when executed by processing subsystem 1704 provide the functionality described above may be stored in storage subsystem 1718. The software may be executed by one or more processing units of processing subsystem 1704. Storage subsystem 1718 may also provide a repository for storing data used in accordance with the present disclosure.

Storage subsystem 1718 may include one or more non-transitory memory devices, including volatile and non-volatile memory devices. As shown in FIG. 17, storage subsystem 1718 includes a system memory 1710 and a computer-readable storage media 1722. System memory 1710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1700, such as during start-up, may typically be stored in the ROM. The RAM typically contains data and/or program modules that are presently being operated and executed by processing subsystem 1704. In some implementations, system memory 1710 may include multiple different types of memory, such as static random access memory (SRAM) or dynamic random access memory (DRAM).

By way of example, and not limitation, as depicted in FIG. 17, system memory 1710 may store application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, Black-Berry® 10 OS, and Palm® OS operating systems.

Computer-readable storage media 1722 may store programming and data constructs that provide the functionality of some embodiments. Software (programs, code modules, instructions) that when executed by processing subsystem 1704 a processor provide the functionality described above may be stored in storage subsystem 1718. By way of example, computer-readable storage media 1722 may include non-volatile memory such as a hard disk drive, a magnetic disk drive, an optical disk drive such as a CD ROM, DVD, a Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1722 may provide storage of computer-readable instructions, data structures, program modules, and other data for computer system 1700.

In certain embodiments, storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for storing computer-readable information.

In certain embodiments, computer system 1700 may provide support for executing one or more virtual machines. Computer system 1700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1700. Accordingly, multiple operating systems may potentially be run concurrently by computer system 1700. Each virtual machine generally runs independently of the other virtual machines.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to establish a communication channel to one or more client computing devices via the Internet for receiving and sending information from and to the client computing devices.

Communication subsystem 1724 may support both wired and/or wireless communication protocols. For example, in certain embodiments, communications subsystem 1724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

Communication subsystem 1724 can receive and transmit data in various forms. For example, in some embodiments, communications subsystem 1724 may receive input communication in the form of structured and/or unstructured data feeds 1726, event streams 1728, event updates 1730, and the like. For example, communications subsystem 1724 may be configured to receive (or send) data feeds 1726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1724 may be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1700 depicted in FIG. 17 is intended only as a specific example. Many other configurations having more or fewer components than the system depicted in FIG. 17 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
receiving, by a computer, a first stack trace including a first sequence of stack frames;
generating, based at least in part on the first sequence of stack frames, a first trace signature that represents the first sequence of stack frames;
receiving, by the computer, one or more subsequent stack traces; and
for at least one of the one or more subsequent stack traces:
determining, from at least one of the one or more subsequent stack traces, a second stack trace including a second sequence of stack frames;
determining that the first sequence of stack frames and the second sequence of stack frames share a matching subsequence of stack frames;
generating a second trace signature based at least in part on the matching subsequence of stack frames; and
generating, based at least in part on the second trace signature, a subsequent trace signature to represent a subsequent sequence of stack frames.

2. The computer-implemented method of claim 1, wherein generating the second trace signature comprises:
determining that a non-matching subsequence of stack frames included in the first sequence of stack frames differs from a non-matching subsequence of stack frames included in the second sequence of stack frames;
generating a first segment signature that represents the matching subsequence of stack frames;
generating a second segment signature that represents the non-matching subsequence of stack frames included in the second sequence of stack frames; and
generating the second trace signature, wherein the second trace signature includes the first segment signature and the second segment signature.

3. The computer-implemented method of claim 2, wherein generating the second trace signature comprises:
generating a third segment signature that classifies the non-matching subsequence of stack frames included in the first sequence of stack frames; and
modifying the first trace signature to include the first segment signature and the third segment signature.

4. The computer-implemented method of claim 2, the first trace signature is associated with a first counter that is incremented when any stack trace including the first sequence of stack frames is received and the second trace signature is associated with a second counter that is incremented when any stack trace including the second sequence of stack frames is received.

5. The computer-implemented method of claim 4,
wherein the first segment signature is associated with a third counter that is incremented when any stack trace including the matching subsequence of stack frames is received;
wherein the second segment signature is associated with a fourth counter that is incremented when any stack trace including the non-matching subsequence of stack frames included in the second sequence of stack frames is received;
wherein the third counter is copied from the first counter when the first segment signature is generated; and
wherein the fourth counter is copied from the second counter when the second segment signature is generated.

6. The computer-implemented method of claim 1, wherein the first trace signature corresponds to a tuple, wherein the tuple includes a binary tree that includes a node as a root node of the binary tree, wherein the node represents the first sequence of stack frames.

7. The computer-implemented method of claim 6,
further comprising: determining whether a subsequent trace signature has been generated to represent a subsequent sequence of stack frames included by the at least one of the one or more subsequent stack traces,
wherein determining whether the subsequent trace signature has been generated to represent the subsequent sequence of stack frames included by the at least one of the one or more subsequent stack traces comprises determining whether one or more previously generated nodes represents the subsequent sequence of stack frames, the one or more previously generated nodes including the node; and
wherein generating the subsequent trace signature to represent the subsequent sequence of stack frames comprises:
determining one or more subsequences of stack frames included in the subsequent sequence of stack frames that are not represented by the one or more previously generated nodes;
generating one or more additional nodes to represent the one or more subsequences of stack frames included in the subsequent sequence of stack frames;
incorporating at least one of the one or more additional nodes into one or more previously generated binary trees of one or more previously generated tuples, the one or more previously generated binary trees including the binary tree and the one or more previously generated tuples including the tuple;
generating one or more additional binary trees, wherein at least one of the one or more additional binary trees includes at least one of the one or more additional nodes; and
generating an additional tuple that includes the one or more additional binary trees, wherein the subsequent trace signature corresponds to the additional tuple.

8. The computer-implemented method of claim 7, wherein each tuple, each node, and each stack frame is uniquely identified by an integer.

9. The computer-implemented method of claim 6,
wherein the tuple is a first tuple, wherein the binary tree is a first binary tree, and wherein the node is a first node;
wherein generating the second trace signature comprises:
determining that a non-matching subsequence of stack frames included in first sequence of stack frames differs from a non-matching subsequence of stack frames included in the second sequence of stack frames;
generating a second node that represents the matching subsequence of stack frames;
generating a third node that represents the non-matching subsequence of stack frames included in the second sequence of stack frames;
generating a second binary tree that includes the second node and a third binary tree that includes the third node; and
generating a second tuple that includes the second and third binary trees, wherein the second node and the third node are siblings and the second trace signature corresponds to the second tuple.

10. The computer-implemented method of claim 9, wherein generating the second trace signature further comprises:
generating a fourth node that represents the matching subsequence of stack frames;
generating a fifth node that represents the non-matching subsequence of stack frames included in the first sequence of stack frames; and
adding the fourth node and the fifth node to the first binary tree as children of the first node.

11. A system comprising:
one or more processors; and
a memory accessible to the one or more processors, the memory storing one or more instructions that, upon execution by the one or more processors, causes the one or more processors to:
receive a first stack trace including a first sequence of stack frames;
generate, based at least in part on the first sequence of stack frames, a first trace signature that represents the first sequence of stack frames;
receive one or more subsequent stack traces; and
for at least one of the one or more subsequent stack traces:
determine, from at least one of the one or more subsequent stack traces, a second stack trace including a second sequence of stack frames;
determine that the first sequence of stack frames and the second sequence of stack frames share a matching subsequence of stack frames;
generate a second trace signature based at least in part on the matching subsequence of stack frames; and
generate, based at least in part on the second trace signature, a subsequent trace signature to represent a subsequent sequence of stack frames.

12. The system of claim 11,
wherein generating the second trace signature comprises:
determining that a non-matching subsequence of stack frames included in the first sequence of stack frames differs from a non-matching subsequence of stack frames included in the second sequence of stack frames;
generating a first segment signature that represents the matching subsequence of stack frames;
generating a second segment signature that represents the non-matching subsequence of stack frames included in the second sequence of stack frames; and
generating the second trace signature, wherein the second trace signature includes the first segment signature and the second segment signature.

13. The system of claim 11, wherein determining the second trace signature comprises:
- determining that the first sequence of stack frames and the second sequence of stack frames share a matching subsequence of stack frames; and
- generating the second trace signature based at least in part of the matching subsequence of stack frames.

14. The system of claim 11,
- wherein the memory further stores one or more instructions that, upon execution by the one or more processors, causes the one or more processors to determine whether a subsequent trace signature has been generated to represent a subsequent sequence of stack frames included by the at least one of the one or more subsequent stack traces;
- wherein the first trace signature corresponds to a first tuple, wherein the first tuple includes a first binary tree that includes a first node as a root node of the first binary tree, wherein the first node represents the first sequence of stack frames;
- wherein determining whether the subsequent trace signature has been generated to represent the subsequent sequence of stack traces included by the at least one of the one or more subsequent stack traces comprises determining whether one or more previously generated nodes represents the subsequent sequence of stack frames, the one or more previously generated nodes including the first node; and
- wherein generating the subsequent trace signature to represent the subsequent sequence of stack frames comprises:
  - determining one or more subsequences of stack frames included in the subsequent sequence of stack frames that are not represented by the one or more previously generated nodes;
  - generating one or more additional nodes to represent the one or more subsequences of stack frames included in the subsequent sequence of stack frames;
  - incorporating at least one of the one or more additional nodes into one or more previously generated binary trees of one or more previously generated tuples, the one or more previously generated binary trees including the first binary tree and the one or more previously generated tuples including the first tuple;
  - generating one or more additional binary trees, wherein at least one of the one or more additional binary trees includes at least one of the one or more additional nodes; and
  - generating an additional tuple that includes the one or more additional binary trees, wherein the subsequent trace signature corresponds to the additional tuple.

15. A non-transitory computer-readable medium storing one or more instructions that, upon execution by one or more processors, cause the one or more processors to perform operations comprising:
- receiving a first stack trace including a first sequence of stack frames;
- generating, based at least in part on the first sequence of stack frames, a first trace signature that represents the first sequence of stack frames;
- receiving one or more subsequent stack traces; and
- for at least one of the one or more subsequent stack traces:
  - determining, from at least one of the one or more subsequent stack traces, a second stack trace including a second sequence of stack frames;
  - determining that the first sequence of stack frames and the second sequence of stack frames share a matching subsequence of stack frames;
  - generating a second trace signature based at least in part on the matching subsequence of stack frames; and
  - generating, based at least in part on the second trace signature, a subsequent trace signature to represent a subsequent sequence of stack frames.

16. The non-transitory computer-readable medium of claim 15,
- wherein each of the first stack trace and the one or more subsequent stack traces corresponds to a running thread executing on behalf of a multi-threaded program; and
- wherein the first stack trace and the one or more subsequent stack traces are received in response to one or more thread dumps of the multi-threaded program, the one or more thread dumps being performed at different time points while the multi-threaded program is executing.

17. The non-transitory computer-readable medium of claim 15,
- wherein each of the first stack trace and the one or more subsequent stack traces corresponds to a running thread executing on behalf of a multi-threaded program;
- wherein a plurality of stack traces are obtained from one or more thread dumps of the multi-threaded program, the one or more thread dumps being performed at different time points while the multi-threaded program is executing;
- wherein the plurality of stack traces are duplicated to obtain the first stack trace and the one or more subsequent stack traces, the first stack trace and the one or more subsequent stack traces each including a different sequence of stack frames;
- wherein a probability of occurrence is determined for each of the first stack trace and the one or more subsequent stack traces; and
- wherein the first stack trace and the one or more subsequent stack traces are received in order of probability of occurrence.

18. The non-transitory computer-readable medium of claim 15, wherein the operations further comprise transmitting the first trace signature to a computer, thereby enabling the computer to re-create the first stack trace with the first trace signature.

19. The non-transitory computer-readable medium of claim 15, wherein each stack frame includes a method name of a called method that corresponds to the stack frame and a source file name that comprises code defining the method that was called.

20. The non-transitory computer-readable medium of claim 15, wherein a set of Huffman codes are applied to one or more methods names or one or more source file names included by one or more stack frames included by the first stack trace or the one or more subsequent stack traces to compress the one or more stack frames.

* * * * *